(12) United States Patent
Hong et al.

(10) Patent No.: US 11,189,020 B2
(45) Date of Patent: Nov. 30, 2021

(54) SYSTEMS AND METHODS FOR KEYPOINT DETECTION

(71) Applicants: Thanh Phuoc Hong, Toronto (CA); Ling Guan, Toronto (CA)

(72) Inventors: Thanh Phuoc Hong, Toronto (CA); Ling Guan, Toronto (CA)

(*) Notice: Subject to any disclaimer, the term of this patent is extended or adjusted under 35 U.S.C. 154(b) by 12 days.

(21) Appl. No.: 16/783,934

(22) Filed: Feb. 6, 2020

(65) Prior Publication Data
US 2020/0250807 A1   Aug. 6, 2020

Related U.S. Application Data

(60) Provisional application No. 62/802,097, filed on Feb. 6, 2019.

(51) Int. Cl.
*G06T 7/00* (2017.01)
*G06T 7/11* (2017.01)
(Continued)

(52) U.S. Cl.
CPC .............. *G06T 7/0002* (2013.01); *G06T 3/40* (2013.01); *G06T 5/002* (2013.01); *G06T 7/11* (2017.01);
(Continued)

(58) Field of Classification Search
CPC .. G06K 9/4642; G06K 9/4671; G06K 9/6211; G06T 2207/10024;
(Continued)

(56) References Cited

U.S. PATENT DOCUMENTS 8,897,572 B2   11/2014 Hamsici et al.
9,530,073 B2   12/2016 Hamsici et al.
(Continued)

FOREIGN PATENT DOCUMENTS

CA    3032983 A1    8/2020
WO    2015/011470 A1   1/2015

OTHER PUBLICATIONS

T. Hong-Phuoc, Y. He and L. Guan, "SCK: A Sparse Coding Based Key-Point Detector," 2018 25th IEEE International Conference on Image Processing (ICIP), Athens, Greece, 2018, pp. 3768-3772, doi: 10.1109/ICIP.2018.8451829.*
(Continued)

*Primary Examiner* — Li Liu
(74) *Attorney, Agent, or Firm* — Bereskin & Parr LLP/S.E.N.C.R.L., s.r.l.; Tony Orsi; Ahmed Elmallah

(57) ABSTRACT

Systems and method are provided for detecting key-points in at least one image which involves dividing the at least one image into a plurality of image blocks; determining sparse representations of the image blocks using a dictionary D; determining at least one measure for each of the sparse representations of the image block; optionally determining key-points for which the at least one measure for each of the image blocks falls within a specified range; and retaining only the determined key-points with the at least one measure that is a local maxima in a sliding window when performing non-maxima suppression and identifying these retained key-points as detected key-points. In accordance with further teachings provided herein, there is also provided methods and systems for performing scale and/or rotation invariant sparse coding based key-point (SRI-SCK) detection and processing of images.

30 Claims, 33 Drawing Sheets

(51) Int. Cl.
  *G06T 3/40* (2006.01)
  *G06T 5/00* (2006.01)
(52) U.S. Cl.
  CPC .............. *G06T 2207/10024* (2013.01); *G06T 2207/20016* (2013.01); *G06T 2207/20021* (2013.01)
(58) Field of Classification Search
  CPC . G06T 2207/20016; G06T 2207/20021; G06T 5/002
  See application file for complete search history.

(56) References Cited

U.S. PATENT DOCUMENTS

| | | | |
|---|---|---|---|
| 9,613,273 | B2 | 4/2017 | Hong et al. |
| 2009/0238460 | A1 | 9/2009 | Funayama et al. |
| 2017/0213331 | A1* | 7/2017 | Chen ..................... G06T 7/0002 |
| 2017/0243084 | A1 | 8/2017 | Soatto et al. |
| 2017/0330320 | A1* | 11/2017 | Lynch .................... A61B 5/055 |
| 2018/0240219 | A1* | 8/2018 | Mentl ................... G06T 11/008 |

OTHER PUBLICATIONS

Mairal, Julien, et al. "Online learning for matrix factorization and sparse coding." Journal of Machine Learning Research 11.1 (2010).*
Han, Junwei, et al. "An object-oriented visual saliency detection framework based on sparse coding representations." IEEE transactions on circuits and systems for video technology 23.12 (2013): 2009-2021.*
Förstner et al., "A Fast Operator for Detection and Precise Location of Distinct Points, Corners and Centres of Circular Features", Proceedings of the ISPRS Intercommission Conference on Fast Processing of Phonogrammic Data, Interlaken, Jun. 2-4, 1987, pp. 281-305.
Harris et al., "A Combined Corner and Edge Detector", Fourth Alvey Vision Conference, 1988, pp. 147-152.
Lowe, "Distinctive Image Features from Scale-Invariant Keypoints", International Journal of Computer Vision, 2004, 60(2): 91-110.
Bay et al., "SURF: Speeded Up Robust Features", Proceedings of the Ninth European Conference on Computer Vision, May 2006, pp. 1-14.
Matas et al., "Robust wide baseline stereo from maximally stable extremal regions", Image and Vision Computing, 2004, 22: 761-767.
Förstner et al., "Detecting Interpretable and Accurate Scale-Invariant Keypoints", 2009 IEEE 12th International Conference on Computer Vision, Kyoto, 2009, pp. 2256-2263.
Verdie et al., "TILDE: A Temporally Invariant Learned Detector", 2015 IEEE Conference on Computer Vision and Pattern Recognition (CVPR), Boston, MA, 2015, pp. 5279-5288.
Zhang et al., "Learning Discriminative and Transformation Covariant Local Feature Detectors", 2017 IEEE Conference on Computer Vision and Pattern Recognition (CVPR), Honolulu, HI, 2017, pp. 4923-4931.
Kadir et al., "Saliency, Scale and Image Description," International Journal of Computer Vision, 2001, 45(2): 83-105.
Shao et al., "Geometric and photometric invariant distinctive regions detection", Information Science, 2007, 177(4): 1088-1122.
Martins et al., "Context-Aware Keypoint Extraction for Robust Image Representation", BMVC. 2012, pp. 1-12.
Faille, "Adapting Interest Point Detection to Illumination Conditions", in Digital Image Computing: Techniques and Applications (DICTA 2003), Dec. 2003, vol. 1, pp. 499-508.
Faille, "A fast method to improve the stability of interest point detection under illumination changes", Image Processing, 2004, ICIP '04. 2004 International Conference on, 2004, 4: 2673-2676.
Gevrekci et al., "Reliable interest point detection under large illumination variations," 2008 15th IEEE International Conference on Image Processing, San Diego, CA, 2008, pp. 869-872.
Vonikakis et al., "A biologically inspired scale-space for illumination invariant feature detection", Measurement Science and Technology, 2013, 24(7): 074024 (13 pages).
Miao et al., "Interest point detection using rank order LoG filter" Pattern Recognit., 2013, 46(11): 2890-2901.
Miao et al., "Contrast Invariant Interest Point Detection by Zero-Norm LoG Filter", in IEEE Transactions on Image Processing, 2016, 25(1): 331-342.
Zitnick et al., "Edge Foci Interest Points", 2011 International Conference on Computer Vision, Barcelona, 2011, pp. 359-366.
Hauagge et al., "Image Matching using Local Symmetry Features", 2012 IEEE Conference on Computer Vision and Pattern Recognition, Providence, RI, 2012, pp. 206-213.
Mikolajczyk et al., "A Comparison of Affine Region Detectors", International Journal of Computer Vision, 2006, 65 (1/2):43-72.
Mairal et al., "Sparse Modeling for Image and Vision Processing", Foundations and Trends in Computer Graphics and Vision, 2014, 8(2-3): 85-283.
Chau et al., "Robust Panoramic Image Stitching: CS231A Final Report", Department of Aeronautics and Astronautics, Stanford University, 2015 (6 pages).
Lenc et al., VLBenchmarks, 2012 <http://www.vlfeat.org/benchmarks> (4 pages).
Rosten et al., "Machine learning for highspeed corner detection", In European Conference on Computer Vision, 2006, vol. 1, pp. 1-14.
Lenc et al., "Learning Covariant Feature Detectors", European Conference on Computer Vision Workshop on Geometry Meets Deep Learning, 2016, pp. 1-16.
Geng et al., "Face recognition based on the multi-scale local image structures," Pattern Recognition, 2011, 44(10-11): 2565-2575.
Fuentes-Pacheco et al., "Visual simultaneous localization and mapping: a survey," Artificial Intelligence Review, 2015, 43(1):55-81.
Mur-Artal et al., "ORB-SLAM: a Versatile and Accurate Monocular SLAM System", IEEE Transactions on Robotics, 2015, 31(5): 1147-1163.
Pire et al., "S-PTAM: Stereo Parallel Tracking and Mapping," Robotics and Autonomous Systems, 2017, 93: 27-42.
Araújo et al., "Air-SSLAM: A Visual Stereo Indoor SLAM for Aerial Quadrotors," in IEEE Geoscience and Remote Sensing Letters, Sep. 2017, 14(9): 1643-1647.
Maity et al., "Edge SLAM: Edge Points Based Monocular Visual SLAM," 2017 IEEE International Conference on Computer Vision Workshops (ICCVW), Venice, 2017, pp. 2408-2417.
Mikolajczyk et al., "A performance evaluation of local descriptors," in IEEE Transactions on Pattern Analysis and Machine Intelligence, Oct. 2005, 27(10): 1615-1630.
Jain, "Fundamentals of Digital Image Processing, Englewood Cliffs," NJ, Prentice Hall, 1989, pp. 150-153.
Pennebaker et al., "JPEG: Still Image Data Compression Standard," Van Nostrand Reinhold, 1993, pp. 40-41.
Jin et al., "Real-Time feature tracking and outlier rejection with changes in illumination," In IEEE Intl. Conf. on Computer Vision, Jul. 2001, pp. 684-689.
Brandt et al., "Transform coding for fast approximate nearest neighbor search in high dimensions," 2010 IEEE Computer Society Conference on Computer Vision and Pattern Recognition, San Francisco, CA, 2010, pp. 1815-1822.
Bailey, "Subpixel Estimation of Local Extrema", Proceedings Image and Vision Computing New Zealand Conference, 2003, pp. 414-419.
Vedaldi et al., "An Open and Portable Library of Computer Vision Algorithms", 2008 <http://www.vlfeat.org> (1 page).
Mikolajczyk et al., "Scale & affine invariant interest point detectors," International Journal of Computer Vision, 2004, 60(1): 63-86.
Brown, "AutoStitch: a new dimension in automatic image stitching", 2018 <http://matthewalunbrown.com/autostitch/autostitch.html> (3 pages).

\* cited by examiner

450

```
Algorithm

%% Main step 1 starts.
Filter the gray-scale image with a low pass filter.
%% Main step 1 ends.

%% Main step 2, 3 starts.
Let N be the number of expected key-points.
Let R be a specified range of complexity levels.
Let L be a list of key-points' positions.
Let M be a list of key-points' strength.
Lists L and M are initialized as empty lists.

For each block in the filtered image
    Compute the sparse representation of the block.
    Calculate the complexity measure of the block.
    If the complexity measure falls into R
        Add position of the center of the block to list L.
        Calculate the strength measure of the block.
        Add the strength measure of the block to list M.
    End
End (Comment: Blocks are overlapped with stride = 'st' such as 1)
%% Main step 2, 3 ends.

%% Main step 4 starts.
Perform non-maxima suppression.
%% Main step 4 ends.

Sort list L and M in descending order based on the strength measures.
Delete all elements having indices higher than N in list L and M.
```

FIG. 4B

An example of matching images with an SCK detector and SIFT descriptor (visually around 15 correct matches)

An example of matching images with an SIFT detector and SIFT descriptor (visually around 5 correct matches)

An example of matching images with a Harris detector and SIFT descriptor (visually around 7 correct matches)

FIG. 10D An example of matching images with an SFOP detector and SIFT descriptor (visually around 7 correct matches)

An example of matching images with an SCK detector and SIFT descriptor (matched images have drastic changes in illumination)

An example of matching images with an SIFT detector and SIFT descriptor (matched images have drastic changes in illumination)

An example of matching images with an Harris detector and SIFT descriptor (matched images have drastic changes in illumination)

An example of matching images with an SFOP detector and SIFT descriptor (matched images have drastic changes in illumination)

An example of matching images with an SCK detector and SIFT descriptor (matched images have drastic changes in illumination and mild changes in scale)

An example of matching images with an SIFT detector and SIFT descriptor (matched images have drastic changes in illumination and mild changes in scale)

An example of matching images with an Harris detector and SIFT descriptor (matched images have drastic changes in illumination and mild changes in scale)

An example of matching imagea with an SFOP detector and SIFT descriptor (matched images have drastic changes in illumination and mild changes in scale).

FIG. 22A
FIG. 22B

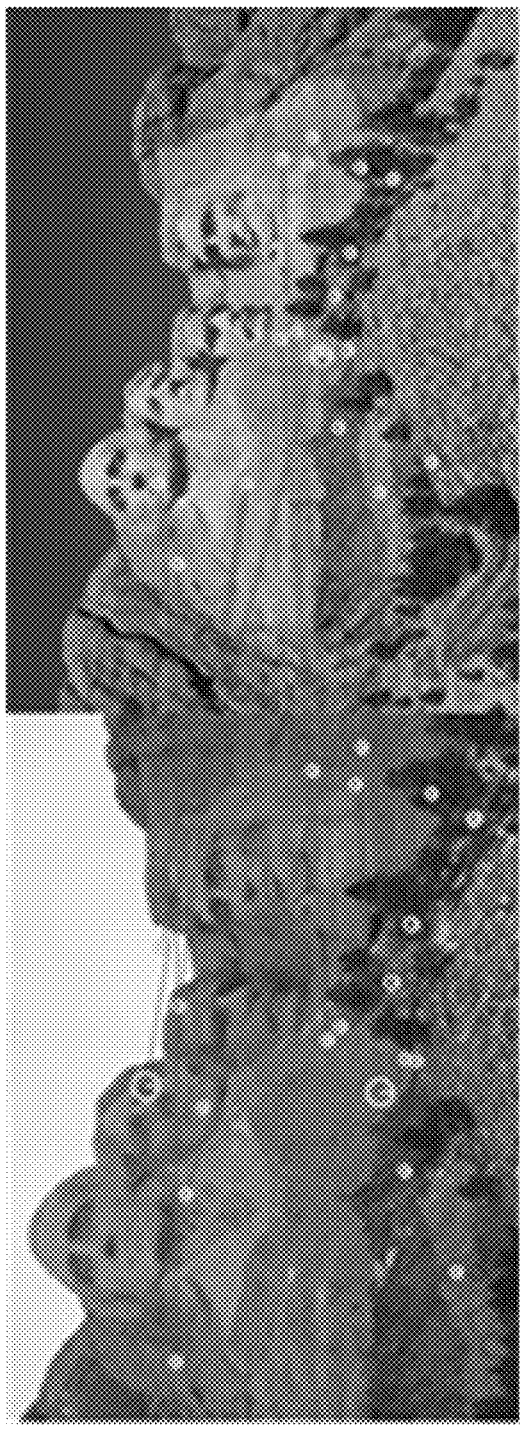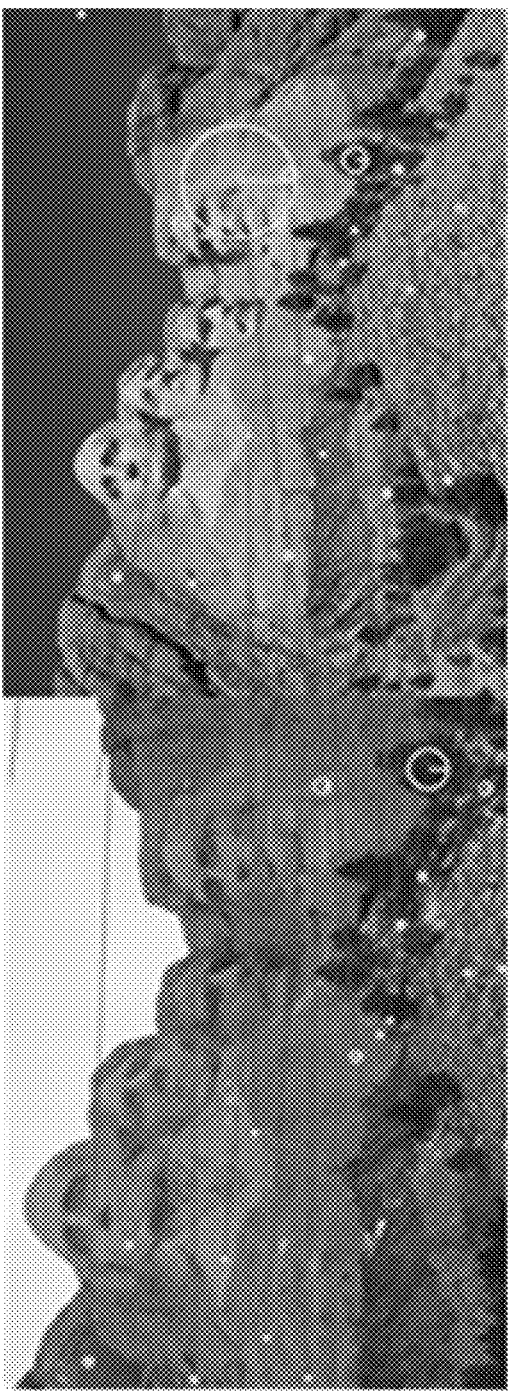

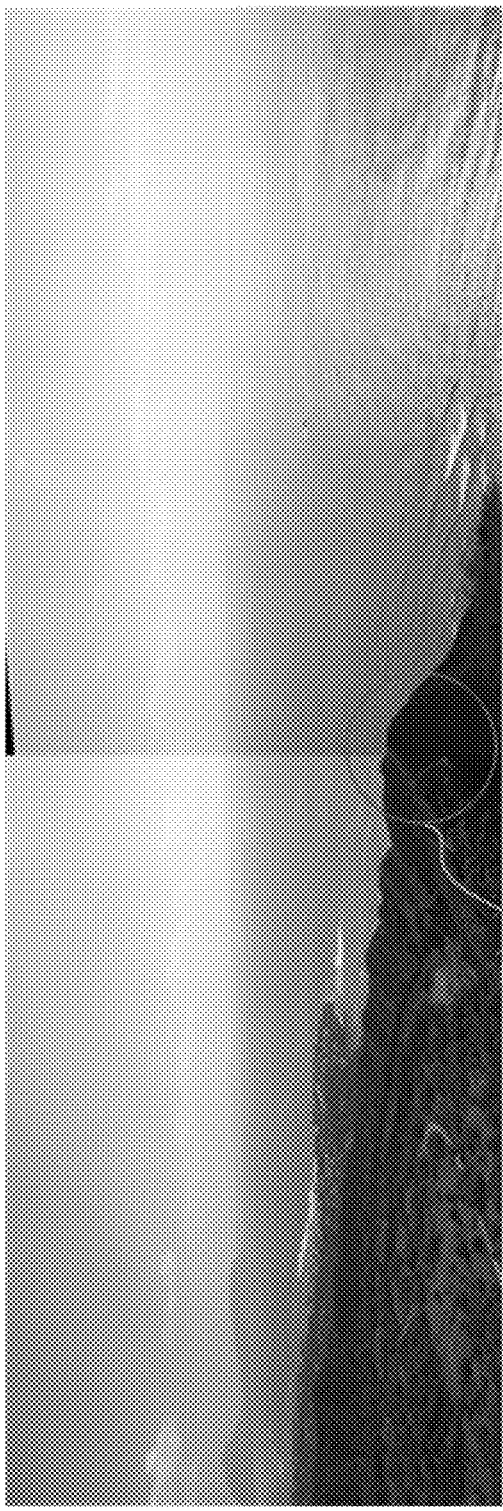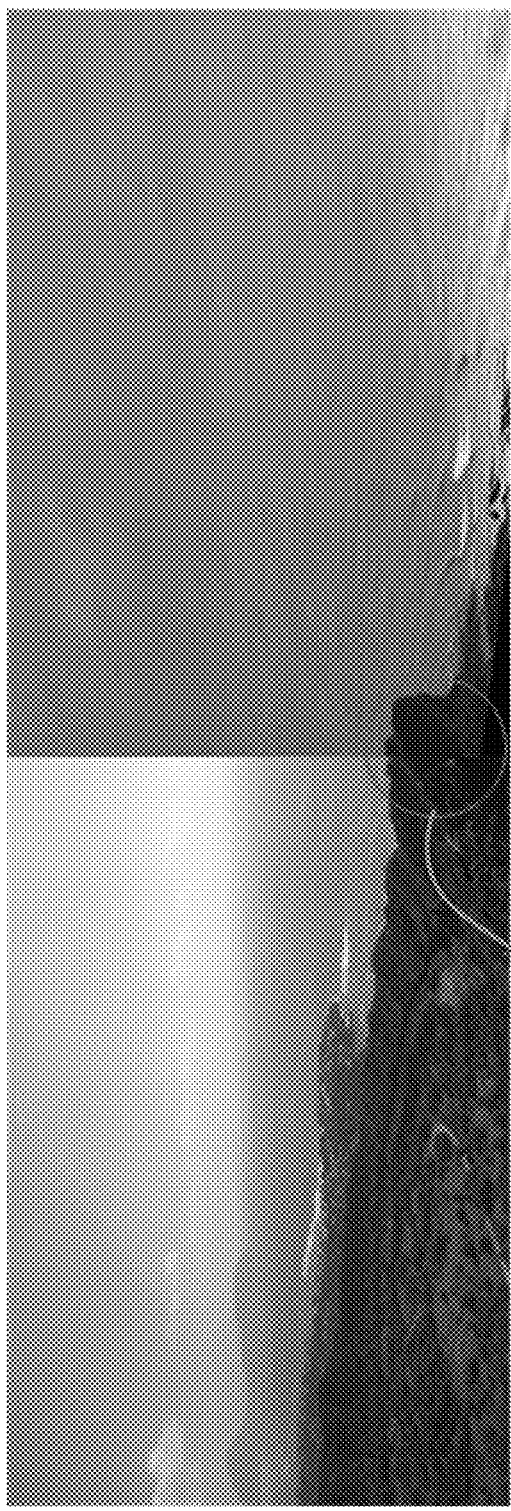

SYSTEMS AND METHODS FOR KEYPOINT DETECTION

CROSS-REFERENCE TO RELATED APPLICATION

This application claims the benefit of U.S. Provisional Patent Application No. 62/802,097 filed Feb. 6, 2019, and the entire contents of U.S. Provisional Patent Application No. 62/802,097 is hereby incorporated by reference.

FIELD

Various embodiments are described herein that generally relate to image and video data processing, and in particular, to hardware devices and systems for processing and extracting distinctive points in image data and performing functions based on the distinctive points.

BACKGROUND

Detection of key-points has been researched for decades, and a large number of successful key-point detectors such as Forstner corner [1], Harris corner [2], SIFT [3], SURF [4], MSER [5], and SFOP [6] have been proposed, which provide a strong foundation for a vast number of applications in computer vision such as image matching, image registration and object recognition.

Although hand-crafted detectors are widely used in many computer vision applications, they are known not to be flexible to different contexts [7, 8]. In fact, hand-crafted detectors are often developed based-on a human designed structure such as a corner, blob, or junction, with some specially predefined characteristics, such that the structures can be easily and stably localized in different images under various transformations. Although a human designed structure may help increase performance metrics such as repeatability in specific situations, at the same time, it restricts the effectiveness of the detectors to these situations only. In other words, when being used in a different context in which there is a lack of high quality key points satisfying the pre-defined structures, the performance of these detectors will degrade.

Another undesirable characteristic of the aforementioned popular detectors is that they are sensitive to non-uniform changes in illumination of the scenes. Taking the Harris corner detector as an example, derivatives of intensity are used in the calculation of its corner-ness, and since derivatives are proportional to the multiplicative effect of illumination, it follows that the corner-ness also varies with illumination. Therefore, with the same threshold for corner-ness, a corner selected in one image may not be selected in another image of the same scene because of changes in illumination. As a direct result, the repeatability of Harris corners decreases with light change. Similar phenomena happen with the SIFT, SURF, MSER, and SFOP key-point detectors.

Although there are some works which have been proposed to address one of the two challenges described above, to the best of the inventors' knowledge, currently there does not exist an effective method to solve both problems simultaneously. For example, to detect key-points without relying on any particular pre-defined structures, there are methods described in [9]-[11]. However, the derivative of a histogram is used in [9] to locate a key-point, so this work is not invariant to affine intensity change. One attempt is described in [10] to improve the performance of the method described in [9], but only for global affine illumination effects. The method described in [11], on the other hand, defines a key-point based on the distinctiveness of the descriptor of the point when being compared with all the descriptors calculated, for all points in the image. However, since this approach requires global information of an image to detect key-points, any non-uniform change in the information can significantly affect its performance.

In the literature, there are some other works striving to improve the robustness of structure specific detectors under affine change in intensity, such as [12]-[14] for the Harris corner detector, [15] for the SIFT detector and [16], [17] for the LoG detector. However, despite improving the corresponding detectors for the non-uniform changes in illumination to certain extents, these works cannot turn a detector of a particular human designed structure into a more flexible one. With the recent development of deep learning, learning based approaches have been proposed to solve the problem of illumination such as TILDE [7] and other work [8]. In fact, TILDE improves the SIFT detector by focusing the learning on patches at the positions that are most repeatedly detected by SIFT (these patches are collected in different images of the same scenes with drastic changes in time and season). Patches in images at those repeatedly detected positions which cannot be detected by SIFT, due to changes in illumination are also utilized to train their learning algorithm, making TILDE more robust to light change than the SIFT detector. However, this way of solving the illumination problem may unintentionally include unstable patches in the training process (e.g. patches with structures that are almost or completely wiped out in images by the intense change of illumination, or structures that are changed by occlusion). Thus, TILDE may have a high repeatability in a wide range of illumination changes but later processes such as calculation of descriptors, and matching will be affected as will be illustrated below. The work in [8] uses the TILDE output to train their algorithm, so it may face the same problem. In fact, the selection of unstable patches may affect any systems based on patch correspondence when being used to train from scratch with real images.

SUMMARY OF VARIOUS EMBODIMENTS

According to one aspect of the present subject matter, in accordance with the teachings herein, there is provided a system for detecting key-points in at least one input image, wherein the system comprises: interface hardware configured to obtain the at least one input image; a memory unit for storing the detected key-points for the at least one input image; a processing unit coupled to the interface hardware and the memory unit, the processing unit being configured to perform a key-point detection method for the at least one input image, wherein the key-point detection method comprises: dividing the at least one input image into a plurality of image blocks; determining sparse representations of the image blocks using a dictionary D; determining at least one measure for the sparse representation of each image block; optionally determining key-points for which the at least one measure for each of the image blocks falls within a specified range; retain only the determined key-points with the at least one measure that is a local maxima in a sliding window when performing non-maxima suppression and identifying these retained key-points as detected key-points; and, storing the detected key-points in the memory unit.

In at least some embodiments, prior to storing the detected key-points, the processing unit is configured to limit the detected key-points to the M retained key-points having a largest Strength Measure.

In at least some embodiments, the at least one measure is a strength measure and the processing unit is configured to determine the at least one measure for each of the sparse representations of the image block by applying a function to coefficients of the sparse representation of each of the image blocks.

In at least some embodiments, the at least one measure includes a complexity measure and a strength measure and the processing unit is configured to determine the at least one measure for the sparse representation of each image block by: determining the complexity measure (CM) of the image block by applying a first function to coefficients of the sparse representation of the image block; detecting a key-point when the image block's complexity measure is within upper and lower limits; and determining the strength measure of the detected key-point by applying a second function to coefficients of the sparse representation of the image block having the detected key-point, wherein the complexity measure CM is determined by applying the first function to the non-zero components of the sparse representation of the image block or vectorized image block to determine the image block having the detected key-point.

In at least some embodiments, the CM is determined according to $CM=\|\alpha\|_{l0}$ where $\|\alpha\|_{l0}$ is the total number of non-zero components in the sparse representation of the given image block.

In at least some embodiments, when the at least one image is a multi-channel image, the processing unit is configured to, for a given image block, calculate a separate measure for each channel of the given image block and then combine the separate measures to obtain a final measure for the given image block, wherein the separate and final measures are one of a complexity measure and a strength measure, and wherein the combination of the separate measures includes a linear combination or a multiplication of the separate measures.

In at least some embodiments, the strength measure SM is determined according to: (a) $SM=\|\alpha\|_{l0}*\|\alpha\|_{l1}$ or $SM=a_1\|\alpha\|_{l0}+a_2\|\alpha\|_{l1}$ where $\|\alpha\|_{l0}$ is the total number of non-zero components in the sparse representation of the given image block and $\|\alpha\|_{l1}$ is norm-1 of the coefficients of the sparse representation of the given image block and $a_1$, $a_2$ are any positive parameters; or (b) a linear combination or multiplication of two or more of norm-0, norm-1 and norm-2 or a higher level norm; or (c) a function of a reconstruction error ($\|X_{norm}'-D\alpha\|_{l2}$), including the reciprocal of the square of the reconstruction error ($1/\|X_{norm}'-D\alpha\|_{l2}^2$); or (d) a corner response metric including a Harris or a Laplacian corner-ness measure.

In at least some embodiments, the processing unit is configured to determine the sparse representation of a given image block by: converting the given image block into a vector; normalizing the vector; and determining the sparse representation of the vector using the dictionary D.

In at least some embodiments, the processing unit is configured to determine the sparse representation of a given image block by: normalizing the given image block; converting the normalized given image block into a vector; and determining the sparse representation of the vector using the dictionary D.

In at least some embodiments, the dictionary D comprises one or more of a Polynomial Dictionary, a Haar Wavelet Dictionary, a Discrete Cosine Transform Dictionary (dct or dct2), a sine Dictionary, a Gabor Filter Dictionary, a cosine Dictionary, and an 'eye' Dictionary.

In at least some embodiments, wherein the processing unit is configured to determine the sparse representation of the given image block according to $\alpha=\mathrm{argmin}(\|X_{norm}'-D\alpha\|_{l2}+\lambda\|\alpha\|_{l0})$, $\alpha=\mathrm{argmin}(\|X_{norm}'-D\alpha\|_{l2}+\lambda\|\alpha\|_{l1})$, $\alpha=\mathrm{argmin}(\|X_{norm}'-D\alpha\|_{l2}+\lambda_1\|\alpha\|_{l1}+\frac{1}{2}\lambda_2\|\alpha\|_{l2}^2)$, $\alpha=\mathrm{argmin}(\frac{1}{2}\|X_{norm}'-D\alpha\|_{l2}^2+\lambda_1\|\alpha\|_{l1}+\frac{1}{2}\lambda_2\|\alpha\|_{l2}^2)$, $\alpha=\mathrm{argmin}(\frac{1}{2}\|X_{norm}'-D\alpha\|_{l2}^2+\lambda\|\alpha\|_{l0})$, or $\alpha=\mathrm{argmin}(\frac{1}{2}\|X_{norm}'-D\alpha\|_{l2}^2+\lambda\|\alpha\|_{l1})$, where $\alpha$ is the sparse representation of the image block, D is a dictionary of sparse coding, $\lambda,\lambda_1,\lambda_2$ are regularization parameters, and $X_{norm}'$ is a normalized vector of the given image block.

In at least some embodiments, the processing unit is configured to normalize the given image block by applying a normalization technique comprising one of zero mean-unit amplitude normalization, zero mean-unit variance normalization, and a min-max normalization.

In at least some embodiments, the processing unit is configured to normalize the dictionary D using the normalization technique prior to determining the sparse representation.

In at least some embodiments, the processing unit is configured to remove the mean of the vector prior to determining the sparse representation.

In at least some embodiments, prior to determining the sparse representation of the image blocks, when the at least one image is a grayscale image the processing unit is configured to filter the grayscale image and determine the sparse representation of the image blocks of the filtered grayscale image.

In at least some embodiments, prior to determining the sparse representations of the image blocks, when the at least one image is a color image with multi-channel data, the processing unit is configured to either: (a) convert the color image into a grayscale image, filter the grayscale image and then determine the sparse representations of the image blocks of the filtered grayscale image or (b) filter each channel of the at least one image, combine the filtered channels into one grayscale image and then determine the sparse representations of the image blocks of the filtered grayscale image.

In at least some embodiments, the processing unit comprises one or more of at least one processor, an Application Specific Integrated Circuit and a Graphics Processing Unit.

In at least some embodiments, wherein after performing non-maxima suppression, the processing unit is further configured to optionally apply sub-pixel estimation of detected key-points, wherein sub-pixel estimation comprises: for a given key-point after performing non-max suppression, determining a row co-ordinate and a column co-ordinate of the key-point; fitting strength measures of the key-point and its row neighbor key-points, determined before non-max suppression, into a first fitting model performed in a local coordinate system of the key-point; estimating the parameters of the first fitting model; determining a sub-pixel row co-ordinate by solving a derivative equation of the first fitting model; converting the determined sub-pixel row co-ordinate into the co-ordinate system of the current pyramid level of the detected key-points; fitting strength measures the key-point and its column neighbor key-points, determined before non-max suppression, into a second fitting model performed in the local co-ordinate system of the key-point; estimating the parameters of the second fitting model; determining a sub-pixel column co-ordinate by solving a derivative equation of the second fitting model; and converting the determined sub-pixel column co-ordinate into the co-ordinate system of the current pyramid level of the detected key-points.

In at least some embodiments, wherein the processor is further configured to generate a plurality of scaled image representations from either the at least one input image or a magnified version of the at least one input image, wherein the plurality of scaled image representations form an image pyramid, and wherein the at least one input image, or the magnified version of the at least one input image, comprises a base image of the image pyramid; and wherein the method of key-point detection is applied separately to each scaled image representation in the plurality of scaled image representations In at least some embodiments, the method of key-point detection is applied separately to each scaled image representation in the plurality of scaled image representations.

In at least some embodiments, when applying the key-point detection method to each scaled image representation, the sparse representation of the image block is determined using an extended dictionary ED, wherein the extended dictionary ED is a combination of the dictionary D and multiple rotated versions of atoms of the dictionary D.

In at least some embodiments, the processing unit is configured to generate the extended dictionary ED by: converting (i) the circularly masked atom blocks and (ii) the rotated versions of the circularly masked atom blocks, into masked atom vectors; optionally, after converting into masked atom vectors, removing elements in the masked atom vectors that are outside the circular mask; applying the normalization technique to elements inside the mask of the masked atom vector, wherein elements outside the mask remain as zeros after applying the normalization technique if the elements outside are not removed; and combining the masked atom vectors to generate the extended dictionary ED.

In at least some embodiments, after converting into masked atom vectors, the processing unit is further configured to remove elements in the masked atom vectors that are outside the circular mask.

In at least some embodiments, after converting into masked atom vectors, the processing unit is further configured to apply the normalization technique to elements inside the mask of the masked atom vector, wherein elements outside the mask remain as zeros after applying the normalization technique.

In at least some embodiments, each circularly masked atom block is rotated by an angle $$i\beta = \frac{i*360}{v},$$

wherein $v$ is a positive integer expressing the number of the rotated versions of the circular masked atom block, $\beta$ is a step angle of rotation, and $i$ is an integer representing the version of rotation, wherein each circularly masked atom blocks is rotated by $i=0$ to $(v-1)$ times to generate $v$ rotated versions of the circularly masked atom block In at least some embodiments, wherein determining the sparse representation of a given image block comprises: applying a circular mask to the image block; converting the given image block into a vector; optionally, removing corresponding elements of the vector outside the mask; normalizing the vector, wherein elements inside the circular mask are normalized and elements outside the circular mask are made zero if not removed; and determining the sparse representation of the vector using the extended dictionary ED.

In at least some embodiments, the processing unit is configured to determine the sparse representation of a given image block according to $$\alpha = \operatorname{argmin}\left(\frac{1}{2}\|Y'_{norm} - ED\alpha\|^2_{l2} + \lambda_1\|\alpha\|_{l1} + \frac{\lambda_2}{2}\|\alpha\|^2_{l2}\right),$$

where $\alpha$ is the sparse representation of the image block, ED is the extended dictionary of sparse coding, $\lambda_1$ is a norm-1 regularization parameter, $\lambda_2$ is a norm-2 regularization parameter and $Y'_{norm}$ is a circularly masked normalized vector of the given image block.

In at least some embodiments, wherein the processing unit is further configured to:
if sub-pixel estimation is applied to each detected key-point in each image scale representation, convert the sub-pixel position of each detected key-point into of the corresponding position in the base image coordinate system, otherwise, if sub-pixel estimation is not applied to detected key points, then convert a position of each detected key-point in the base image coordinate system; and generate a list of detected key-points across all image scale representations, wherein the list of detected key-points is expressed in base image coordinate system; and optionally, identify one or more subsets of key-points, from the list of detected key-points, which have overlap ratios larger than a pre-determined overlap ratio, and suppress key-points, in each of the one or more subsets of key-points, which have strength measures which are not higher compared to strength measures for other key-points in the subsets of key-points In at least some embodiments, the overlap ratio is a ratio of the intersection of two key-point regions and the union of the two-key point regions.

In at least some embodiments, the overlap ratio is a threshold of 0.3.

According to another aspect of the present subject matter, in accordance with the teachings herein, there is provided method for detecting key-points in at least one input image, wherein the method is performed using a processing unit and the method comprises: obtaining at least one input image from interface hardware; dividing the at least one input image into a plurality of image blocks; determining sparse representations of the image blocks using a dictionary D; determining at least one measure for the sparse representation of each image block; optionally determining key-points for which the at least one measure for each of the image blocks falls within a specified range; retaining only the determined key-points with the at least one measure that is a local maxima in a sliding window when performing non-maxima suppression and identifying these retained key-points as detected key-points; and, storing the detected key-points in the memory unit.

In at least some embodiments, prior to storing the detected key-points, the method further comprises limiting the detected key-points to the M retained key-points having a largest Strength Measure.

In at least some embodiments, the at least one measure is a strength measure and the method further comprises determining the at least one measure for each of the sparse representations of the image block by applying a function to coefficients of the sparse representation of each of the image blocks.

In at least some embodiments, wherein the at least one measure includes a complexity measure and a strength measure and the processing unit is configured to determine the at least one measure the sparse representations of each image block by: determining the complexity measure of the image block by applying a first function to coefficients of the sparse representation of the image block; detecting a key-point when the image block's measures is within upper and lower limits; and determining the strength measure of the detected key-point by applying a second function to coefficients of the sparse representation of the image blocks having the detected key-points, and wherein the complexity measure CM is determined by applying the first function to the non-zero components of the sparse representation of the image block or a vectorized image block to determine the image block having the detected key-point.

In at least some embodiments, the CM is determined according to $CM=\|\alpha\|_{l0}$ where $\|\alpha\|_{l0}$ is the total number of non-zero components in the sparse representation of the given image block.

In at least some embodiments, when the at least one image is a multi-channel image, the processing unit is configured to, for a given image block, calculate a separate measure for each channel of the given image block and then combine the separate measures to obtain a final measure for the given image block, wherein the separate and final measures are one of a complexity measure and a strength measure.

In at least some embodiments, the combination of the separate measures includes a linear combination or a multiplication of the separate measures.

In at least some embodiments, wherein the strength measure SM is determined according to: (a) $SM=\|\alpha\|_{l0}*\|\alpha\|_{l1}$ or $SM=a_1\|\alpha\|_{l0}+a_2\|\alpha\|_{l1}$ where $\|\alpha\|_{l0}$ is the total number of non-zero components in the sparse representation of the given image block and $\|\alpha\|_{l1}$ is norm-1 of the coefficients of the sparse representation of the given image block and $a_1$, $a_2$ are any positive parameters; or (b) a linear combination or multiplication of two or more of norm-0, norm-1 and norm-2 or a higher level norm; or (c) a function of a reconstruction error ($\|X_{norm}'-D\alpha\|_{l2}$), including the reciprocal of the square of the reconstruction error ($1/\|X_{norm}'-D\alpha\|_{l2}^2$); or (d) a corner response metric including a Harris or a Laplacian corner-ness measure.

In at least some embodiments, the method further comprises determining the sparse representation of a given image block by: converting the given image block into a vector; normalizing the vector; and determining the sparse representation of the vector using the dictionary D.

In at least some embodiments, the method further comprises determining the sparse representation of a given image block by: normalizing the given image block; converting the normalized given image block into a vector; and determining the sparse representation of the vector using the dictionary D.

In at least some embodiments, the dictionary D comprises one or more of a Polynomial Dictionary, a Haar Wavelet Dictionary, a Discrete Cosine Transform Dictionary (dct or dct2), a sine Dictionary, a Gabor Filter Dictionary, a cosine Dictionary, and an 'eye' Dictionary.

In at least some embodiments, wherein the method further comprises determining the sparse representation of the given image block according to $\alpha=\mathrm{argmin}(\|X_{norm}'-D\alpha\|_{l2}+\lambda\|\alpha\|_{l0})$, $\alpha=\mathrm{argmin}(\|X_{norm}'-D\alpha\|_{l2}+\lambda\|\alpha\|_{l1})$, $\alpha=\mathrm{argmin}(\|X_{norm}'-D\alpha\|_{l2}+\lambda_1\|\alpha\|_{l1}+\frac{1}{2}\lambda_2\|\alpha\|_{l2}^2)$, $\alpha=\mathrm{argmin}(\frac{1}{2}\|X_{norm}'-D\alpha\|_{l2}^2+\lambda_1\|\alpha\|_{l1}+\frac{1}{2}\lambda_2\|\alpha\|_{l2}^2)$, $\alpha=\mathrm{argmin}(\frac{1}{2}\|X_{norm}'-D\alpha\|_{l2}^2+\lambda\|\alpha\|_{l0})$, or $\alpha=\mathrm{argmin}(\frac{1}{2}\|X_{norm}'-D\alpha\|_{l2}^2+\lambda\|\alpha\|_{l1})$, where $\alpha$ is the sparse representation of the image block, D is a dictionary of sparse coding, $\lambda,\lambda_1,\lambda_2$ are regularization parameters, and $X_{norm}'$ is a normalized vector of the given image block.

In at least some embodiments, the method further comprises normalizing the given image block by applying a normalization technique comprising one of zero mean-unit amplitude normalization, zero mean-unit variance normalization, and a min-max normalization.

In at least some embodiments, the method further comprising normalizing the dictionary D using the normalization technique prior to determining the sparse representation.

In at least some embodiments, the method further comprises removing the mean of the vector prior to determining the sparse representation.

In at least some embodiments, prior to determining the sparse representation of the image blocks, when the at least one image is a grayscale image, the method further comprises filtering the grayscale image and determine the sparse representation of the image blocks of the filtered grayscale image.

In at least some embodiments, prior to determining the sparse representation of the image blocks, when the at least one image is a color image with multi-channel data, the method further comprises either: (a) converting the color image into a grayscale image, filtering the grayscale image and then determining the sparse representation of the image blocks of the filtered grayscale image or (b) filtering each channel of the at least one image, combining the filtered channels into one grayscale image and then determining the sparse representation of the image blocks of the filtered grayscale image.

In at least some embodiments, wherein after performing non-maxima suppression, the method optionally further comprises applying sub-pixel estimation of detected key-points, wherein sub-pixel estimation comprises: for a given key-point after performing non-max suppression, determining a row co-ordinate and a column co-ordinate of the key-point; fitting strength measures of the key-point and its row neighbor key-points, determined before non-max suppression, into a first fitting model performed in a local coordinate system of the key-point; estimating the parameters of the first fitting model; determining a sub-pixel row co-ordinate by solving a derivative equation of the first fitting model; converting the determined sub-pixel row co-ordinate into the co-ordinate system of the image block the current pyramid level of the detected key-points; fitting strength measures the key-point and its column neighbor key-points, determined before non-max suppression, into a second fitting model performed in the local co-ordinate system of the key-point; estimating the parameters of the second fitting model; determining a sub-pixel column co-ordinate by solving a derivative equation of the second fitting model; and converting the determined sub-pixel column co-ordinate into the co-ordinate system of the current pyramid level of the detected key-points.

In at least some embodiments, the at least one image is identical to the at least one input image.

In at least some embodiments, the method further comprises generating a plurality of scaled image representations from either the at least one input image or a magnified version of the at least one input image, wherein the plurality of scaled image representations form an image pyramid, and wherein the at least one input image, or the magnified version of the at least one input image, comprises a base image of the image pyramid.

In at least some embodiments, the method of key-point detection is applied separately to each scaled image representation in the plurality of scaled image representations.

In at least some embodiments, when applying the key-point detection method to each scaled image representation, the sparse representation of the image block is determined using an extended dictionary ED, wherein the extended dictionary ED is a combination of the dictionary D and multiple rotated versions of atoms of the dictionary D.

In at least some embodiments, the method further comprises generating the extended dictionary ED by: converting each atom vector in the dictionary D into an atom block; applying a circular mask to each atom block to generate a plurality of circularly masked atom blocks; rotating each circularly masked atom block to generate a plurality of rotated versions of the circularly masked atoms blocks; converting (i) the circularly masked atom blocks and (ii) the rotated versions of the circularly masked atom blocks, into masked atom vectors; and combining the masked atom vectors to generate the extended dictionary ED.

In at least some embodiments, after converting into masked atom vectors, the method further comprises removing elements in the masked atom vectors that are outside the circular mask.

In at least some embodiments, after converting into masked atom vectors, the method further comprises applying the normalization technique to elements inside the mask of the masked atom vector, wherein elements outside the mask remain as zeros after applying the normalization technique.

In at least some embodiments, each circularly masked atom block being rotated by an angle $$i\beta = \frac{i*360}{v},$$

wherein v is a positive integer expressing the number of the rotated versions of the circular masked atom block, f is a step angle of rotation, and i is an integer representing the version of rotation, wherein each circularly masked atom blocks is rotated by i=0 to (v−1) times to generate v rotated versions of the circularly masked atom block.

In at least some embodiments, determining the sparse representation of a given image block comprises: applying a circular mask to the image block; converting the given image block into a vector; optionally, removing corresponding elements of the vector outside the mask; normalizing the vector, wherein elements inside the circular mask are normalized and elements outside the circular mask are made zero if not removed; and determining the sparse representation of the vector using the extended dictionary ED.

In at least some embodiments, the method further comprises determining the sparse representation of a given image block according to $$\alpha = \operatorname{argmin}\left(\frac{1}{2}\|Y'_{norm} - ED\alpha\|_{l2}^2 + \lambda_1\|\alpha\|_{l1} + \frac{\lambda_2}{2}\|\alpha\|_{l2}^2\right),$$

where α is the sparse representation of the image block, ED is the extended dictionary of sparse coding, $\lambda_1$ is a norm-1 regularization parameter, $\lambda_2$ is a norm-2 regularization parameter and $Y_{norm}'$ is a circularly masked normalized vector of the given image block.

In at least some embodiments, after applying sub-pixel estimation of each detected key-point in each image scaled representation, the method further comprises converting the sub-pixel position of each detected key-point into a scale of the base image.

In at least some embodiments, the method further comprises generating a list of detected key-points across all image scale representations, wherein the list of detected key-points is expressed in the scale of the base image.

In some embodiment, method further comprises: wherein if sub-pixel estimation is applied to detected key point, then converting the sub-pixel position of each detected key-point into the corresponding position in the base image coordinate system, and generating a list of detected key-points across all image scale representations, wherein the list of detected key-points is expressed in the base image coordinate system; otherwise, if sub-pixel estimation is not applied to detected key points, then converting a position of each detected key-point into the base image coordinate system, then generating a list of detected key-points across all image scale representations, wherein the list of detected key-points is expressed in the base image coordinate system; and optionally, identifying one or more subsets of key-points, from the list of detected key-points, which have overlap ratios larger than a pre-determined overlap ratio; and suppressing key-points, in each of the one or more subsets of key-points, which have strength measures which are not higher compared to strength measures for other key-points in the subsets of key-points.

In at least some embodiments, the method further comprises: identifying one or more subsets of key-points, from the list of detected key-points, which have overlap ratios larger than an overlap ratio; and suppressing key-points, in each of the one or more subsets of key-points, which have a strength measure which is not higher compared to strength measures for other key-points in the subsets of key-points.

In at least some embodiments, the overlap ratio is a ratio of the intersection of two key-point regions and the union of the two-key point regions.

In at least some embodiments, the overlap ratio is a threshold of 0.3.

According to another aspect of the present subject matter, in accordance with the teachings herein, there is provided a computer readable medium comprising computer program code that when executed by a processing unit causes the processing unit to perform a method for detecting key-points in at least one input image, wherein the method comprises: dividing the at least one input image into a plurality of image blocks; determining sparse representations of the image blocks using a dictionary D; determining at least one measure for the sparse representation of each image block; optionally, determining key-points for which the at least one measure for each of the image blocks falls within a specified range; retain only the determined key-points with the at least one measure that is a local maxima in a sliding window when performing non-maxima suppression and identifying these retained key-points as detected key-points; and, storing the detected key-points in the memory unit.

In some embodiments, the at least one measure includes a complexity measure and a strength measure, and the method comprises: converting the given image block into a vector; normalizing the vector; and determining the at least one measure for the sparse representations of each image block by: determining the complexity measure of the image block by applying a first function to coefficients of the sparse representation of the image block; detecting a key-point when the image block's measure is within upper and lower limits; and determining the strength measure of the detected key-point by applying a second function to coefficients of the sparse representation of the image blocks having the detected key-points; wherein the method optionally further comprises: after performing non-maxima suppression, applying sub-pixel estimation of detected key-points, wherein sub-pixel estimation comprises: for a given key-point after performing non-max suppression, determining a row co-ordinate and a column co-ordinate of the key-point; fitting strength measures of the key-point and its row neighbor key-points, determined before non-max suppression, into a first fitting model performed in a local coordinate system of the key-point; estimating the parameters of the first fitting model; determining a sub-pixel row co-ordinate by solving a derivative equation of the first fitting model; converting the determined sub-pixel row co-ordinate into the co-ordinate system of the current pyramid level of the detected key-points; fitting strength measures the key-point and its column neighbor key-points, determined before non-max suppression, into a second fitting model performed in the local co-ordinate system of the key-point; estimating the parameters of the second fitting model; determining a sub-pixel column co-ordinate by solving a derivative equation of the second fitting model; and converting the determined sub-pixel column co-ordinate into the co-ordinate system of the current pyramid level of the detected key-points; and wherein the method optionally further comprises at least one of: (a) generating a plurality of scaled image representations from either the at least one input image or a magnified version of the at least one input image, wherein the plurality of scaled image representations form an image pyramid, and wherein the at least one input image, or the magnified version of the at least one input image, comprises a base image of the image pyramid, and wherein the method of key-point detection is applied separately to each scaled image representation in the plurality of scaled image representations, wherein if sub-pixel estimation is applied to detected key points, then the method further comprises converting the sub-pixel position of each detected key-point into the corresponding position in the base image coordinate system, and generating a list of detected key-points across all image scale representations, wherein the list of detected key-points is expressed in the base image coordinate system, otherwise, if sub-pixel estimation is not applied to detected key points, then the method further comprises converting a position of each detected key-point into the base image coordinate system, then generating a list of detected key-points across all image scale representations, wherein the list of detected key-points is expressed in the base image coordinate system; and optionally, the method further comprises identifying one or more subsets of key-points, from the list of detected key-points, which have overlap ratios larger than a pre-determined overlap ratio; and suppressing key-points, in each of the one or more subsets of key-points, which have strength measures which are not higher compared to strength measures for other key-points in the subsets of key-points; and (b) applying the key-point detection method to one or more of the input image, magnified version of the input image, and the scaled image representations, the sparse representation of the image block is determined using an extended dictionary ED, wherein the extended dictionary ED is a combination of the dictionary D and multiple rotated versions of atoms of the dictionary D, wherein determining the sparse representation of a given image block using the extended dictionary ED comprises: applying a circular mask to the image block; converting the given image block into a vector; optionally, removing corresponding elements of the vector outside the mask; normalizing the vector, wherein elements inside the circular mask are normalized and elements outside the circular mask are made zero if not removed; and determining the sparse representation of the vector using the extended dictionary, and wherein generating the extended dictionary ED comprises: converting each atom vector in the dictionary D into an atom block; applying a circular mask to each atom block to generate a plurality of circularly masked atom blocks; rotating each circularly masked atom block to generate a plurality of rotated versions of the circularly masked atoms blocks; converting (i) the circularly masked atom blocks and (ii) the rotated versions of the circularly masked atom blocks, into masked atom vectors; optionally, after converting into masked atom vectors, removing elements in the masked atom vectors that are outside the circular mask; optionally, applying the normalization technique to elements inside the mask of the masked atom vector, wherein elements outside the mask remain as zeros after applying the normalization technique if the elements outside are not removed; and combining the masked atom vectors to generate the extended dictionary ED.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 4B illustrates an example of pseudo-code for a key-point detection method in accordance with the teachings herein.

FIGS. 10A, 10B, 10C and 10D illustrate examples of detecting and matching key-points in images from a dataset with a sparse coding based key-point (SCK) detector (in accordance with the teachings herein), a SIFT detector, a Harris detector, and a SFOP detector, respectively where the SIFT descriptor is used.

FIGS. 22A, 22B, 22C and 22D illustrate further examples of detecting and matching key-points in images from a dataset using an SRI-SCK detector (in accordance with the teachings herein), a SIFT detector, a Harris detector, and a SFOP detector, respectively, where the SIFT descriptor is used.

FIGS. 23A, 23B, 23C and 23D illustrate still further examples of detecting and matching key-points in images from a dataset using an SRI-SCK detector (in accordance with the teachings herein), a SIFT detector, a Harris detector, and a SFOP detector, respectively, where the SIFT descriptor is used.

FIGS. 24A and 24B illustrate example stitched images generated using an SRI-SCK detector (in accordance with the teachings herein) and a SIFT detector, respectively, where the SIFT descriptor is used.

FIGS. 25A and 25B illustrate further example stitched images generated using an SRI-SCK detector (in accordance with the teachings herein) and a SIFT detector, respectively, where the SIFT descriptor is used.

Figure 1:
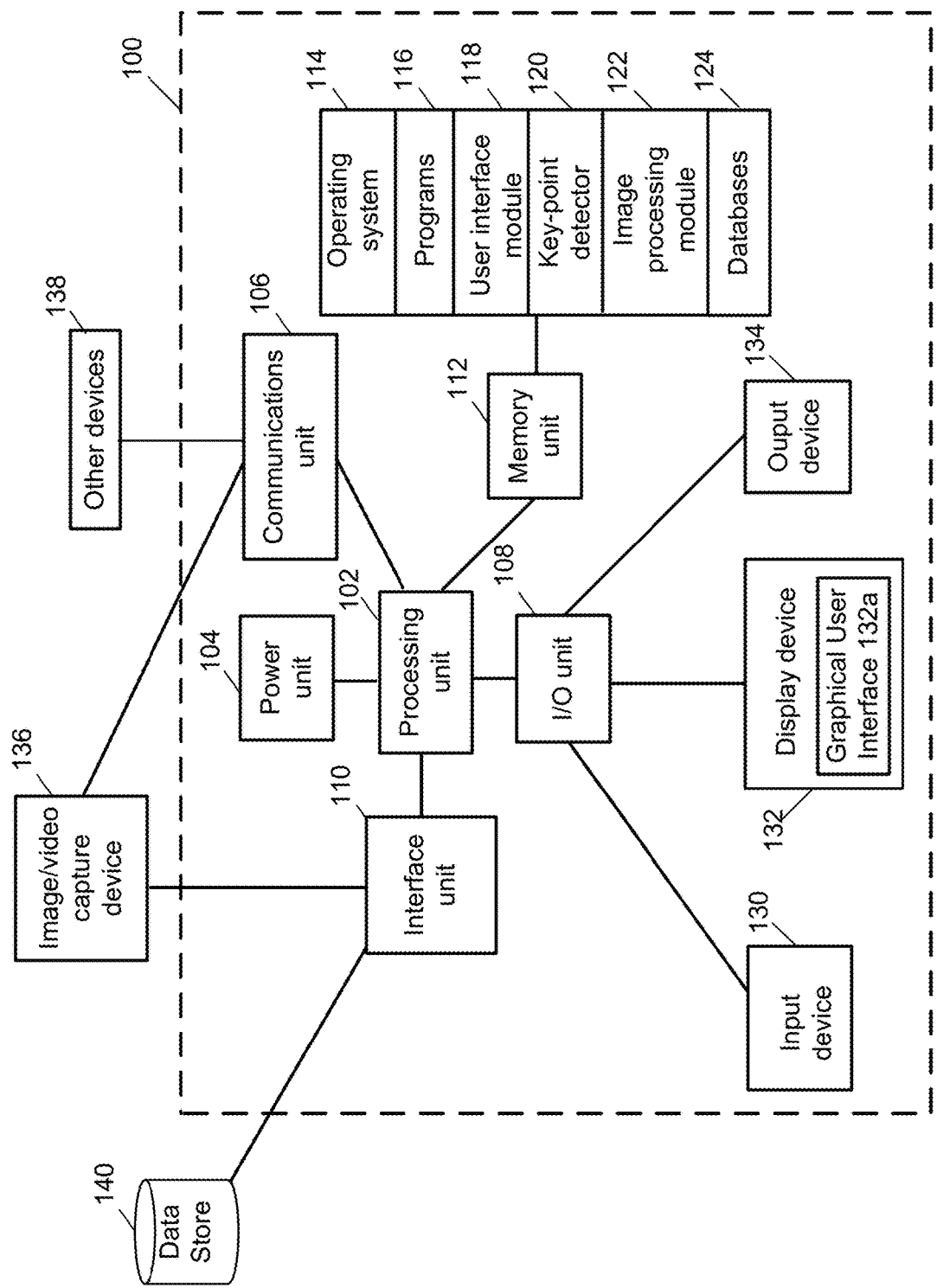
FIG. 1 illustrates an example embodiment of a system for processing image data and/or video data to detect key-point in several images and perform further actions based on the detected key-points in accordance with the teachings herein.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element, depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

The example embodiments of the devices, systems or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e. at least one volatile memory element and at least one non-volatile memory element). The hardware may comprise input devices including at least one of a touch screen, a keyboard, a mouse, buttons, keys, sliders and the like, as well as one or more of a display, a printer, and the like depending on the implementation of the hardware.

It should also be noted that there may be some elements that are used to implement at least part of the embodiments described herein that may be implemented via software that is written in a high-level procedural language such as object oriented programming. The program code may be written in MATLAB, C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a computer readable medium such as, but not limited to, a ROM, a magnetic disk, an optical disc, a USB key and the like that is readable by a device having a processor, an operating system and the associated hardware and software that is necessary to implement the functionality of at least one of the embodiments described herein. The software program code, when read by the device, configures the device to operate in a new, specific and predefined manner (e.g. as a specific purpose computer) in order to perform at least one of the methods described herein.

At least some of the programs associated with the devices, systems and methods of the embodiments described herein may be capable of being distributed in a computer program product comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Furthermore, in some embodiments, the systems and methods described in the present subject matter can be can processed by a hardware environment including CPU (central processing unit) or processor along with a GPU (graphics processing unit). The GPU can be connected to the CPU. The CPU can provide the general computational capabilities of the computer running the systems and methods described in the present subject matter, while the GPU can provide the graphical processing and output provided to a display (e.g. a monitor) for the computer. The CPU and the GPU can be contained in a single chip. The CPU can be connected to RAM (random access memory) to provide working memory and to nonvolatile memory such as flash memory or disk memory. Contained in the nonvolatile memory are applications, an operating system (for example, for running the systems and methods described in the present subject matter) and GPU driver. The RAM can be connected to the GPU to provide the necessary graphics memory. The CPU, the GPU, the RAM, the nonvolatile memory and the RAM are connected to a power supply.

In accordance with the teachings herein, various methods and systems for performing key-point detection and processing images with detected key-points are provided. The techniques described herein require no particular pre-designed structures and can be fully invariant to an affine intensity change when detecting key-points in images of the same scene obtained under different lighting conditions. The techniques described herein generally use sparse coding to generate a sparse representation of image normalized blocks in an image in order to locate potential key-points based on the total number of non-zero components in the sparse representation of the blocks. The sparse coding is generated using one of a number of pre-defined dictionaries. The number of non-zero components in the sparse representation of an image block can be defined as the complexity measure of the image block. In general, an image block which requires more non-zero components to construct it is more complex, and if its complexity measure falls within a specified range, the center, or alternatively another point, in the image block can be considered as a good potential key-point. In at least some of the embodiments described herein, a novel strength measure is proposed to sort and detect suitable key-points when only a specific number of potential key-points are expected.

Building on [18], the teachings herein provide a comprehensive analysis and explanation to support the validity of the inventors' proposed key-point detector from a theoretical viewpoint and also provides experimental data to demonstrate effectiveness. Also, in some embodiments, the strength measure may be used for both key-point detection and selection tasks in accordance with the teachings herein. Experimental results on Webcam [7], EF [19], and Sym-Bench [20] datasets show that the proposed key-point detector achieves higher performance in terms of repeatability and matching score developed by [21].

In accordance with further teachings provided herein, there is provided methods and systems for performing scale and rotation invariant sparse coding based key-point (SRI-SCK) detection and processing of images. The SRI-SCK detection method provided herein increases the robustness of SCK detection with datasets having drastic changes in scale and rotation. In accordance with the teachings provided herein, the SRI-SCK detection method generates an image pyramid using an input image, or a magnified version of the input image. The image pyramid comprises multiple scaled representations of the input image, wherein the scaled representations are generated by scaling the row and column dimensions of the input image with a scale factor. For each scaled representation of the input image, sparse coding is applied to generate a sparse representation for each of image normalized blocks in order to locate potential key-points based on the total number of non-zero components in the sparse representations of the blocks. In applying the sparse coding, an extended dictionary is used, whereby the extended dictionary originates from a combination of the dictionary used in normal SCK detection, and multiple rotated versions of the original dictionary atoms. In SRI-SCK, appropriate sizes/scales of key-points are automatically selected based on the comparison results of the strength measure and the levels where key-points are detected. In accordance with some teachings provided herein, SRI-SCK performance is improved by sub-pixel accuracy estimation of detected SRI-SCK key-point positions, which is based on fitting the key-points and their nearby points' strength measures to a fitting model (e.g., a parabolic fitting model). Experimental results on Webcam [7], and EF [19] public datasets, as well as a VGG data set

[33] demonstrate that the SRI-SCK detection is able to deliver reliable key-point detection under different illumination conditions, rotations and scales, while also achieving high performance in terms of repeatability and matching scores.

Referring now to FIG. 1, shown therein is an example embodiment of a system 100 for processing image data and/or video data to detect key-point in several images and perform further actions based on the detected key-points in accordance with the teachings herein. The system 100 can include a processing unit 102, a power unit 104, a communication unit 106, an Input/Output (I/O) unit 108, an interface unit 110, a memory unit 112, an input device 130, a display device 132, and an output device 134. The system 100 can interact with an image/video capture device 136, other devices 138, and a data store 140. In other embodiments, the system 100 can include further components or fewer components. For example, in some alternative embodiments the system 100 can include the image image/video capture device 136, while in other alternative embodiments, the system 100 may not include the input device 130 and/or the output device 134.

The processing unit 102 can include one or more of any suitable processors, controllers or digital signal processors that can provide sufficient processing power depending on the configuration, and operational requirements of the system 100 as is known by those skilled in the art. For example, in some embodiments, the processing unit 102 can include one or more high performance processors and/or one or more GPUs working with a CPU as described previously. In embodiments where there is more than one processor, each processor may be configured to perform different dedicated tasks. In alternative embodiments, specialized hardware, such as ASICs, can be used to provide some of the functions performed by the processing unit 102.

The power unit 104 can be any suitable power source that provides power to the various components of the system 100 such as a power adaptor or a rechargeable battery pack depending on the implementation of the system 100 is known by those skilled in the art.

The communications unit 106 is optional but can be used by the system 100 to communicate with other devices in a wireless fashion. For example, the communications unit 106 can include a radio that communicates utilizing CDMA, GSM, GPRS, Bluetooth or another suitable communication protocol according to communication standards such as IEEE 802.11a, 802.11b, 802.11g, 802.11n or another suitable communication standard. The communications unit 106 can allow the processing unit 102 to communicate wirelessly with other devices 138 or computers that are remote from the system 100.

The Input/output (I/O) unit 108 provides one or more ports or other interfaces that allows a user, such as an operator of the system 100, to control the system 100 by using one or more input devices 130 that are communicatively coupled to the I/O unit 108 to send control input data to the system 100. The I/O unit 108 also provides one or more ports or other interfaces that allows the system 100 to provide outputs via the output device 134.

The interface unit 110 includes various interfaces that allow the system 100 to communicate with other devices such as the image/video capture device 136 or the data store 140. In some cases, the interface unit 110 can include at least one of a serial port, a parallel port or a USB port that provides USB connectivity. In some embodiments, the interface unit 110 can also include at least one of an Internet, Local Area Network (LAN), Ethernet, Firewire, or digital subscriber line connection or a modem. Various combinations of these elements can be incorporated within the interface unit 110.

The memory unit 112 includes random access memory (RAM) and one or more other types of memory such as Flash memory and/or Read Only Memory (ROM). The memory unit 112 can store and/or allow access to software code used for implementing an operating system 114, various programs 116, and a user interface module 118, a key-point detector 120, an image processing module 122 and one or more databases 124. Examples of programs 116 may include image processing programs such as MATLAB™, OpenCV™, Python™, C/C++ and Java™ integrated development environments, virtual machines and libraries. The processing unit 102 can access these programs to execute one or more of the methods described in accordance with the teachings herein. The processing unit 102 may also use the memory unit 112 to save at least one of image data, video data, detected key-points and/or internal operational parameters/variables in one or more databases 124.

The user interface module 118 is generally software code that may be executed by the processing unit 102 for generating one or more Graphical User Interfaces (GUIs) 132a that may be shown on the display 132 or another input interface that receives user inputs. The user interface module 118 provides the user inputs to other modules, such as the key-point detector 120 where these inputs are used to control the key-point detector 120. Alternatively, the user input received by the user module 118 may be links or other instructions that are used by the processing unit 102 to retrieve at least one image for performing key-point detection thereon. The user interface module 118 also includes software code for providing outputs, such as detected key-points or image processing results, to the user via the GUI 132a or some other output interface such as, but not limited to, the output device 134, for example.

The key-point detector 120 is generally software code that may be executed by the processing unit 102 for performing key-point detection on image data for at least one image or for video data in accordance with the teachings herein. For example, the interface unit 110 or the communication unit 106 can be configured to receive a plurality of images of a scene or a video stream for which the key-point detector 120 may then be used to detect key-points. The processing unit 102 can then select at least one of the images from the video stream to detect key-points in the selected image. Accordingly, the interface unit 110 and/or the communication unit 106 may be referred to as input hardware that is configured to obtain at least one image. Alternatively, the image data and/or video data may be retrieved from the memory unit 112. The operation of the key-point detector 120 is described in more detail with respect to FIGS. 2 to 8.

The image processing module 122 is generally software code that may be executed by the processing unit 102 for performing further operations on the image data for which key-point detection was performed. For example, the image processing module 122 may include software instructions for performing various image processing applications using one or more of the detected key-points such as, but not limited, to one or more of object recognition, image registration, 3-D image reconstruction (i.e. obtaining a 3D image from a series of 2D images which are not stereoscopically linked), creation of panoramic images, camera calibration, facial recognition, comparison of medical images taken over time for determining similarities/dissimilarities, machine vision technology for autonomous driving, automated manufacturing/assembly lines, as well as in simultaneous localization and mapping (SLAM), which is one used in robotics to concurrently localize the pose of a robot and reconstruct the 3D environment surrounding it, for example. The operation of the image processing module 122 is described in further detail with respect to act 208 in FIG. 2. It should be noted that in some embodiments, the image processing module 122 may be implemented using a specialized hardware, such as a GPU, an ASIC or a single-purpose processor, image which case it is considered to be an image processor.

The input device 130 can include various devices for receiving user input such as, but not limited to, one or more of a keyboard, a mouse, a keypad, a cursor-control device, a touch-screen device, and a microphone, for example. The user inputs received by the input device 130 can be provided to the processing unit 102 via the I/O unit 108. The input device 130 can be used by the user to configure the system 100 to set certain operational parameters, process certain image data or video data and/or perform various image processing applications.

The display device 132 can include various devices that are used to provide an output to the user such as, but not limited to, a computer monitor or computer flat-screen display, a TV screen, a projector, an LCD display for a smart phone or a camera and a display panel, for example. The display device 132 may receive output data from the I/O unit 108 under the control of the processing unit 102 for displaying detected key-points with or without corresponding image data or video data. The display device 134 can have a graphical user interface 132a for display the output data. The graphical user interface 132a may also be used to receive user inputs as described earlier. For example, a display device can be used to display key-points of an image.

The output device 134 may include any type of device for presenting output data to the user in an alternative manner rather than displaying on the display device 132. For example, the output device 134 may be a printer for providing a hard copy of key-point data, with/without corresponding image data or video data, for example. In other cases, where the image processing module 122 is performing a specific image processing application, the output device 134 may be used to provide output data related to the application such as an alarm when determines that images do not match under certain situations which can have negative effects such as, but not limited to, manufacturing errors for automated assembly line processing and/or driving errors for autonomous driving applications, for example.

The image/video capture device 136 can be a camera, an image sensor, or any other device capable of capture image data and/or video data. The image/video capture device 136 can connect to the device 100 through a communication link provided by the user interface or the communications unit 106 (e.g. USB cable, wireless connection, etc.) to transfer image data and/or video data to the system 100. In some embodiments, the image/video capture device 136 can capture image data/video data and directly send them to the system 100 or store the image data/video data in its internal memory (not shown), and can send the image data/video data to the system 100 at a later time.

The other devices 138 may be devices that can be configured, for example, to process lists of detected key-points for associated image data and/or video data, for various purposes. For example, the other device 138 may be configured to perform one or more of the image processing applications described for the image processing module 122. These other devices may be an image processing device, an ASIC device or another CPU that can process the detected key-points.

The data store 140 can be one or more devices such as servers or that include one or more databases and image data and/or video data that can be processed by the key-point detector 120 to determine key-points which can then be used for various image processing applications. For example, for medical imaging applications, the data store 140 may be a PACS (Picture Archiving and Communication System) that is used to obtain medical images which are then processed by the key-point detector 120 and/or the image processing module 122 to compare objects in medical images taken of the same region of interest over time to determine if there is any change in the objects. For example, the object can be a tumor or some part of an organ, e.g. a heart valve or a nodule on a liver, and the key-points may be used to establish stable anchors of the objects in the image. Different images of the object can then be aligned using the key-points as anchors. Once the images are aligned, the object can then be segmented in each image to allow determinations in differences (or changes) in the object, as between the different images. In various cases, this can assist in analyzing a physiological object to determine if the object has gotten larger or smaller or has otherwise changed in appearance over time.

Figure 2:
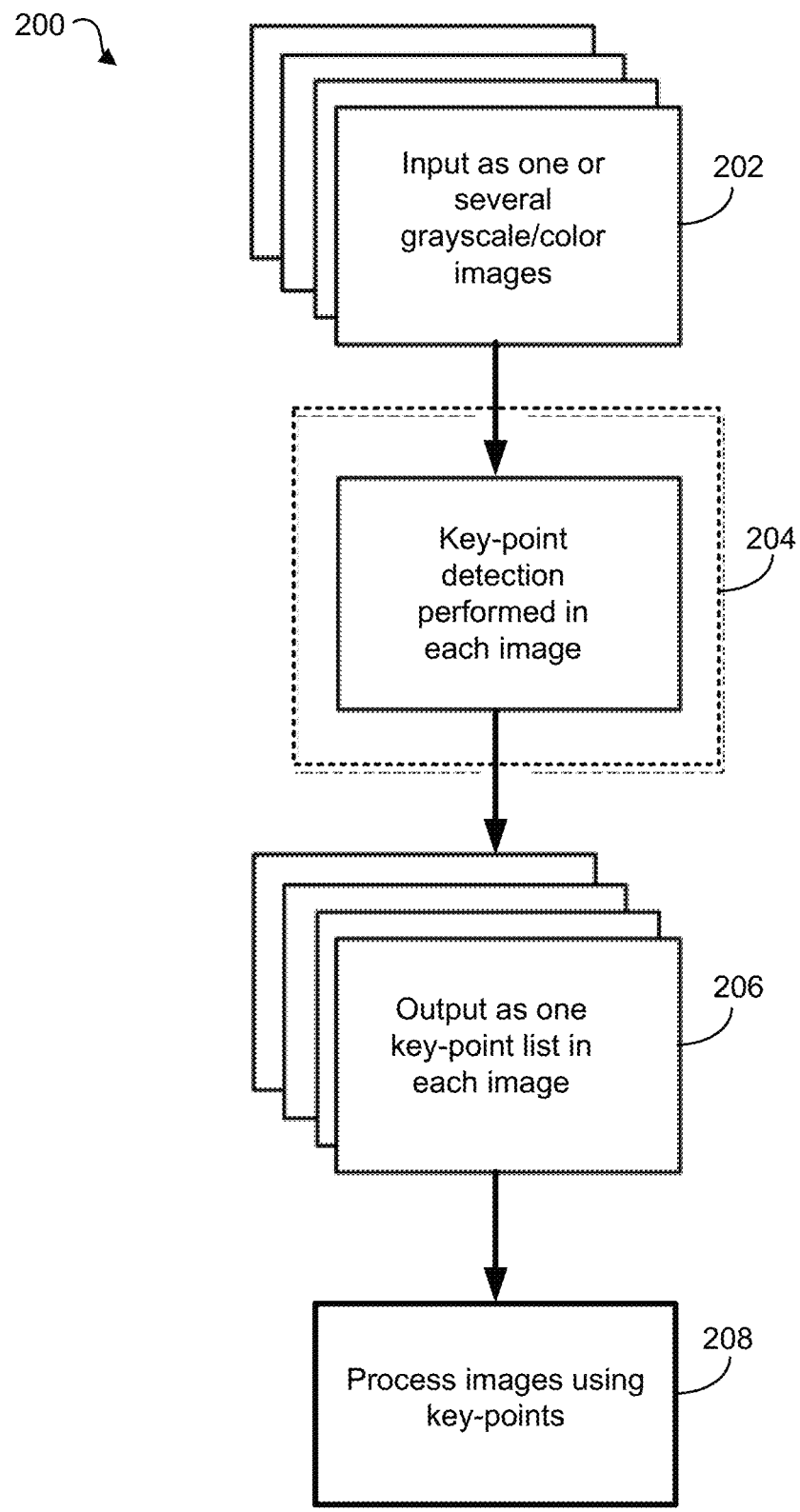
FIG. 2 illustrates an example embodiment of a method for detecting key-points in image data or video data and performing certain actions on the image data or video data in accordance with the teachings herein.

Referring to FIG. 2, there is shown an example embodiment of a method 200 for detecting key-points based on sparse coding in image data or video data and performing certain actions on the image data or video data in accordance with the teachings herein. Sparse coding has been used in numerous applications of different scientific and technological fields such as signal processing, machine learning and neuroscience [22, 23]. Sparse coding involves finding the sparsest representation of an input signal with respect to a given dictionary. However, in accordance with the teachings herein, the inventors' have realized that sparse coding may be beneficial for key-point detection.

At 202, a plurality of image data and/or video data are provided as input. For example, such input can be provided to the system 100 from one or more of the image/video capture device 136, the data store 140, the memory unit 112 or the other device 138 the of FIG. 1. The image data and/or video data can be in grayscale or color. The image data and/or video data include image data for at least two images of the same scene. However, the different images may be obtained at different times, at slightly different camera angles or shifted camera angles and under different lighting conditions. Since video data includes image data for different frames, the method 200 will be described as applied to image data but it can also be applied to video data by obtaining separate image data for separate images from the video data. In at least some cases, as near frames (e.g., consecutive frames) in video data are often highly redundant, the method 200 can be applied to image data from a sub-sampled version of the video frames.

At act 204, the image data is provided to the key-point detector 120 for detecting key-points in the image data. The operation of the key-point detector 120 will be illustrated for application on image data for a single image. However, it should be understood that the key-point detector 120 can operate successively on separate image datasets (where one image dataset corresponds to one image) or in parallel on separate image datasets depending on whether the configuration of the processing unit 102 allows for parallel processing.

Figure 3:
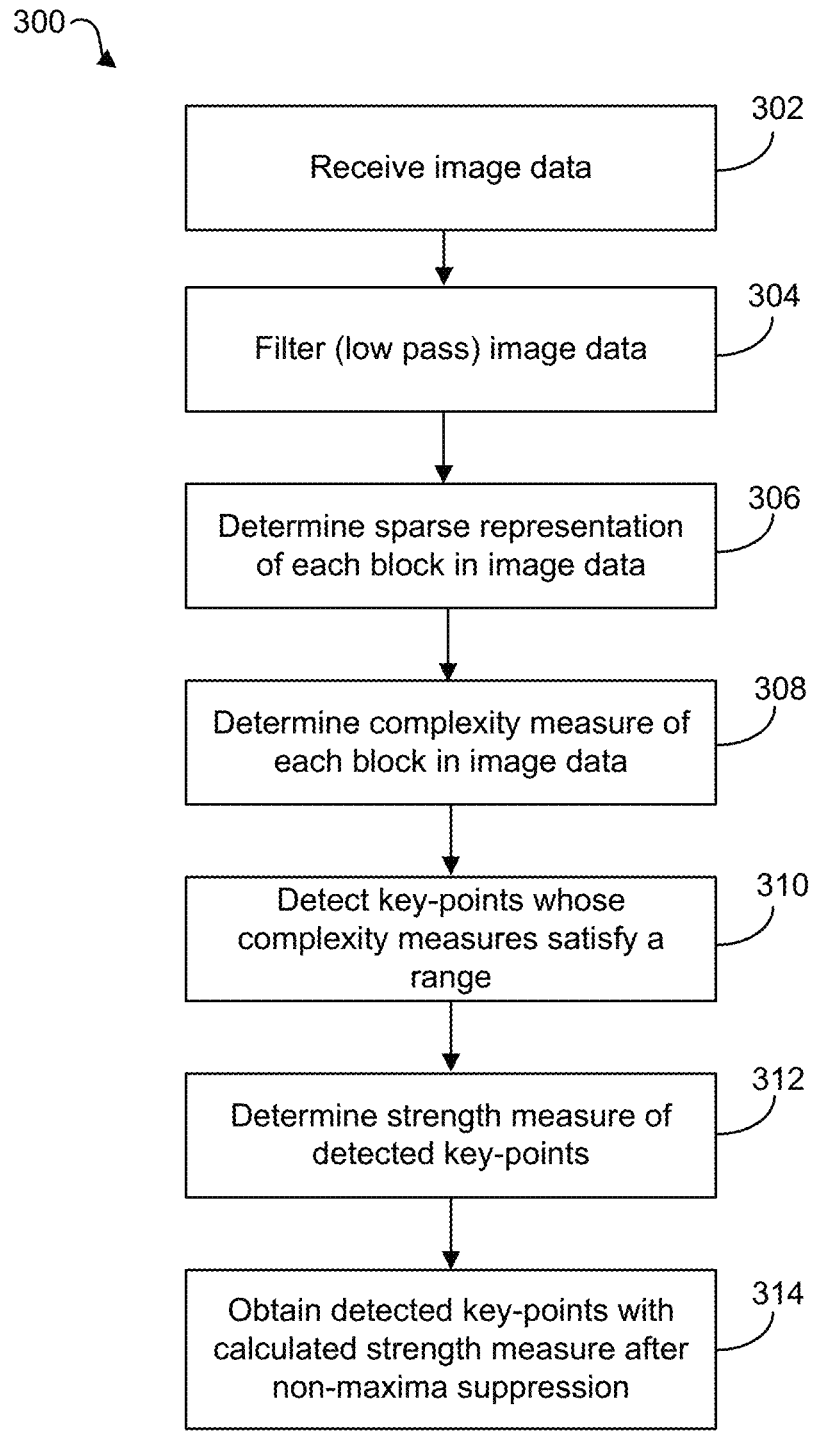
FIG. 3 illustrates an example embodiment of a key-point detection method in accordance with the teachings herein.

Referring now to FIG. 3, shown therein is an example embodiment of a key-point detection method 300 in accordance with the teachings herein. The method 300 can be processed by the system 100 of FIG. 1. The method 300 and alternative embodiments thereof may be referred to as a Sparse Coding based Key-point (SCK) detector.

At act 302, image data are received. The image data can be grayscale image data. At act 304, the image data is filtered to generate filtered image data. For example, the image data can be filtered with a low-pas filter such as a small size Gaussian filter, or a Separable implementation of low pass filters, to remove noise and small structures in the image. Alternatively, adaptive filters can be used during the filtering stage. In some embodiments, bilateral filters can be used to preserve details of an image while suppressing noise.

In some embodiments, depending on the image dataset or image processing application, filtering may be optional or the amount of filtering can be adjusted in order to improve the performance of the key-point detector 120. In such cases, the filter parameters can be adjusted manually. Alternatively, the key-point detector 120 can be programmed to automatically adjust the filter parameters based on certain image dataset parameters.

If the image data is multi-channel image data such as for a color image (e.g. an RGB image with 3 channels or another image with q channels) then filtering can be applied to each channel of the multi-channel image. After that, all filtered image data channels can be combined into one grayscale image before determining the sparse representation of blocks in the grayscale image.

Any method for converting RGB image data to grayscale image data can be used. For example, the gray-scale image intensity at each corresponding pixel position of an RGB image can be determined based on the following: 0.2989*R+ 0.5870*G+0.1140*B, where R is the red channel image data, G is the green channel image data and B is the blue channel image data. For example, Matlab™ functions can be used to convert RGB images to grayscale. Note: for a multi-channel input image, the low-pass filter can be applied in each channel before converting to a gray-scale image, or the multi-channel image can be converted into a grayscale image and then filtered.

Figure 9A:
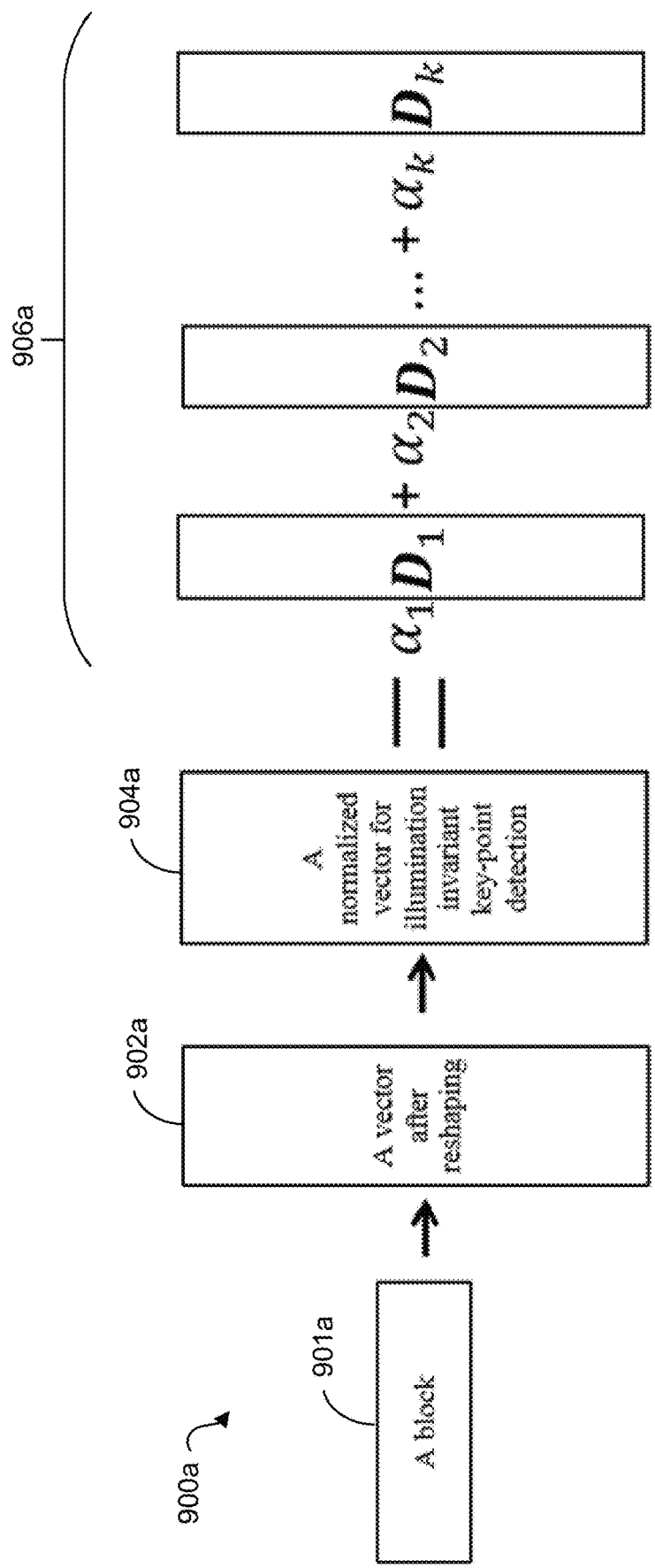
FIG. 9A illustrates an example embodiment of a sparse coding method that is used for key-point detection in accordance with the teachings herein.

At act 306, a sparse representation of each image block in the image dataset is determined. Accordingly, act 306 first involves separating the image data in a plurality of image blocks. Act 306 the method 300 then involves performing a sparse coding step in accordance with the teachings herein. An example embodiment of a method 900a for performing the sparse coding step 306 is shown in FIG. 9A. Referring now to FIG. 9A, sparse coding allows each normalized image block of an image dataset to be represented as a linear combination of components using a dictionary D with the least number of non-zero coefficients. The method 900a can be done by the system 100 of FIG. 1.

Each image block may have the same size and are generally square. However, in other embodiments other shapes can be used for the image block such as rectangular, circular and elliptical. In some embodiments, the image blocks may overlap with adjacent image blocks. The size of an image block is predetermined, for certain image processing applications. For example, the image block size can be 11×11 or 17×17, as this was seen to generate better performance for the tests described herein. However, depending on application, other block sizes may deliver better key-point detection performance which can be determined through testing.

At act 902a, each image block 901 is represented by the matrix X which has a size n by n. The image block X is reshaped into a lexicographic order for a vector X' of size n2 by 1. In some embodiments, the mean of the vector X' may be subtracted from the vector X'. For example, each element of the difference vector corresponds to each element of the reshaped original vector minus the mean of the original reshaped vector.

At act 904a, the vector X' may then be normalized to unit amplitude to create the normalized version $X_{norm}'$ of the block. It should be noted that this normalization makes the key-point detector 120 fully invariant with affine intensity change, which is verified further below in the description. Furthermore, the normalization may also help the sparse algorithm converge faster.

In other embodiments, the normalization of an image block can be performed before or after reshaping it to a vector. Also, while zero mean-unit amplitude normalization is used in this example, other normalization methods such as, but not limited to, zero mean-unit variance, and min-max normalization may be used in other embodiments. For example, if there is a reshaped vector V from an image block, then determining the zero mean-unit variance normalization includes finding the mean M and standard deviation STD of the vector V and normalizing the image block by (V−M)/STD, while determining the min-max normalization includes normalizing the image block by (V−Min(V))/ (Max(V)−Min(V)). Min(V) and Max(V) are operations that give the minimum and maximum elements in V respectively.

At act 906a, the sparse representation of the image block is found by solving the following optimization problem:

$$\alpha = \text{argmin}(\tfrac{1}{2}\|X_{norm}' - D\alpha\|_{l2}^2 + \lambda\|\alpha\|_{l1}) \quad (1a)$$

where α is the sparse representation of the image block, D is a dictionary, λ is the regularization parameter which is a scalar and $X_{norm}'$ is a normalized vector for the image block. The size of the dictionary D is $n^2$ by k where k is the number of atoms in the dictionary D. The sparse representation α can be represented as $\alpha = [\alpha_1, \alpha_2, \ldots, \alpha_k]'$. The dictionary D can be represented as: $D = [D_1, D_2, \ldots, D_k]$. The size of a is k by 1. The first term $\|X_{norm}' - D\alpha\|_{l2}^2$ (i.e., square of the reconstruction error term) in the cost function is to guarantee that the sparse coding output of an image block best represents the corresponding normalized block intensity information, while the second term $\lambda\|\alpha\|_{l1}$ forces the representation to be as sparse as possible.

It should be noted that there can be other embodiments where the sparse representation can be, but not necessarily limited to, being determined differently than what is shown in equation (1a). For example, the term $\lambda\|\alpha\|_{l2}^2$ may be added or some of the terms may be changed such as using the square root of $\|X_{norm}' - D\alpha\|_{l2}^2$. Accordingly, the sparse representation can be determined by, but not limited to, determining one of the following:

$$\alpha = \text{argmin}(\|X_{norm}' - D\alpha\|_{l2} + \lambda\|\alpha\|_{l0}) \quad (1b)$$

$$\alpha = \text{argmin}(\|X_{norm}' - D\alpha\|_{l2} + \lambda\|\alpha\|_{l1}) \quad (1c)$$

$$\alpha = \text{argmin}(\|X_{norm}' - D\alpha\|_{l2}^2 + \lambda_1\|\alpha\|_{l1} + \tfrac{1}{2}\lambda_2\|\alpha\|_{l2}^2)) \quad (1d)$$

$$\alpha = \text{argmin}(\tfrac{1}{2}\|X_{norm}' - D\alpha\|_{l2}^2 + \lambda_1\|\alpha\|_{l1} + \lambda_2\|\alpha\|_{l2}^2 \quad (1e)$$

$$\alpha = \text{argmin}(\tfrac{1}{2}\|X_{norm}' - D\alpha_{l2}^2 + \lambda\|\alpha\|_{l0}) \quad (1f)$$

Since the dictionary D that is used for sparse coding is often complete or over-complete, whether an image block represents distinctive structures in the form of a corner, a blob, a junction, or any more sophisticated structure, it can be decomposed into a linear combination of components in the dictionary D. This is one reason why the key-point detector 120 can detect all types of distinctive structures in image blocks. Accordingly, the SCK detector has the overall benefits of being able to deal with all different distinctive structures that a detector for a single type structure does not have. Also, since low quality structures are filtered out with the SCK detector, these structures have no chance to decrease the performance of the SCK detector meanwhile other detectors for detecting a specific structure may include high and low quality structures as types, since other structures cannot be detected to cover the lack of quality.

However, in alternative embodiments, an under-complete dictionary D may also be considered for key-point detection in accordance with the teachings herein. Although an under-complete dictionary D may not efficiently represent all types of structures, it may still be adequate to represent multiple structures, and thus may still be used by the key-point detector 120 in multiple contexts.

Examples of different dictionaries that may be used include, but are not limited to: the Polynomial Dictionary (poly); the Haar Wavelet Dictionary (haar); the Discrete Cosine Transform Dictionaries (dct and dct2); a sine Dictionary (sin); the Gabor Filter Dictionary; the cosine Dictionary (cos); and the 'eye' Dictionary (i.e. a diagonal dictionary with each element in the diagonal equal to 1 and the rest of the elements equal to 0). These dictionaries can be part of the Matlab™ library and toolbox. Examples of these dictionaries can be found at the Mathworks™ website. Other dictionaries may be used that have better performance for the particular image processing application that is using the list of detected key-points' surrounding block data.

The dictionary D can be predetermined or selected by a user as long as the dictionary D satisfies the dimension conditions. In some embodiments, the dictionary D can be predetermined based on trials on a small image datasets for a certain image processing application. Thereafter, the predetermined dictionary D can be used for the image processing application. In some embodiments, depending on the image datasets, different dictionaries D may provide different performances.

The regularization parameter $\lambda$ can be predetermined and/or it may be set by the user. The regularization parameter $\lambda$ can also be set commonly for a set of image datasets and/or for a particular image processing application based on experimental results.

In some embodiments, prior to determining the sparse representation in accordance with equation (1a) (or equations (1b)-(1f)), each atom of the dictionary D can be normalized using the same normalization technique applied to the image blocks at act 904*a* (e.g., zero mean-unit amplitude normalization, zero mean-unit variance, or min-max normalization). This can be a one-time pre-processing act which can be done to improve key-point detection performance.

Referring back to FIG. 3, after the sparse representations have been determined for each image block, the method 300 determines the complexity of each image block by applying a complexity measure (CM) to each image block at act 308. The CM can be determined using different functions to determine which image blocks contain potential key-points. For example, the CM of an image block may be defined as:

$$CM = \|\alpha\|_{l0} \qquad (2)$$

where $\|\alpha\|_{l0}$ is the total number of non-zero components in the sparse representation of an image block.

At act 310, potential key-points in the input image data are detected, based on which image blocks have a complexity measure that satisfy a specific range. In general, the point at the center of an image block is considered as a detected key-point if its CM falls between a range specified by predetermined lower and upper limits. The limits can be predetermined manually by a user or based on experiments, for example. With the lower limit, the detected key-point is guaranteed to have a sufficient complexity level to be distinct from other points in the image dataset. Meanwhile, the detection of overly distinctive key-points, which may not be repeatedly localized in different images of the same scenes is prevented by the upper limit.

In some embodiments, a single set of upper and lower limits may be commonly used for all image datasets. However, for image datasets with less complexity such as a simple sketch, better results may be achieved by specifying a smaller upper limit. In some embodiments, a fixed number of detected key-points may be extracted for each image dataset, and so lower limits may be set such that there are a certain number of detected key-points per image in the image datasets. In other embodiments, where the images are used for certain image processing applications, as described for image processing module 122, the upper and lower limits may be tuned based on experimental data such that the performance of the key-point detector 120 is adequate given the image processing application that is being performed.

In some embodiments, depending on the regularization parameter $\lambda$ and the dictionary D that are used, different upper and/or lower limits can be set. For very large $\lambda$, the upper and lower limits may not need to be set. A "large" $\lambda$ can be a subjective concept. For example, when the dictionary has several dozens of atoms and $\lambda$ makes the maximum CM in an image dataset to be in the range of about 6 to 10, $\lambda$ can be considered as large. In some embodiments, the upper and lower limits for CM can be determined dynamically by specifying them as a specific percentage of the maximum possible CM in the image dataset.

The size r of a key-point may be determined according to equation (3) shown below. In other words, in some embodiments, the size r of a key-point may be selected to be the square root of 2 multiplied by half of the image block size to cover all possible positions of the key-point belonging to the image block. However, this is only one possible solution. In other embodiments, other key-point sizes may be used. In fact, the key-point size is an application configurable parameter, which provides flexibility, depending on which image processing application the detected key-points are being used for.

$$r = \left(\frac{n}{2}\right)\sqrt{2} \qquad (3)$$

For example, in some embodiments, the size of a key-point may be set as a constant equaling the image block size or a constant based on experimental results. Alternatively, in other embodiments, the size of the key-point may be adaptive based on a particular measure performed on the image block. In other embodiments, the size of the key-point can be determined using other functions which are more suitable to the particular image processing application for which the detected key-points are used.

The detected key-point can be determined by selecting a center position inside the image block whose complexity measure satisfied a pre-determined range. However, in other embodiments, other positions in the image block may be selected as the top left corner or the bottom right corner. Nevertheless, whether the detected key-points are at the center, the top left or elsewhere in the image block, the positions of the detected key-points are just shifted linearly, so there will be no effects on the repeatability of the key-points. That being said, certain characteristics (e.g. distinctiveness, etc.) of the descriptors around the detected key-points may change with shifting of the detected key-points, so users can test the characteristics of the descriptors that are used to decide which key-point locations (e.g. center or elsewhere) in an image block may be used.

At act 312, detected key-point strengths are calculated based on a Strength Measure (SM). The SM is applied to all detected key-points from act 310. Depending on the image processing application, after act 314, the SMs may be optionally ranked and then the M key-points having the highest SMs are retained in the list of detected key-points while the other detected key-points are discarded.

Since many key-points detected at act 310 may have the same levels of complexity, the CM is not suitable for sorting and selecting the key-points. When the maximum number of detected key-points is limited, such as the top hundred or top thousand points, the SM is used. The SM may be determined using different functions which may be based on experimentation depending on the image datasets that are being processed and/or the particular image processing application that the detected key-points are used for. For example, the SM may be defined according to equation (4a) or (4b):

$$SM = \|\alpha\|_{l0} * \|\alpha\|_{l1}, \quad (4a)$$

$$SM = a_1 \|\alpha\|_{l0} + a_2 \|\alpha\|_{l1} \quad (4b)$$

where $a_1$, $a_2$ are any positive parameters, which may be selected to be equal to 1 so as to arrive at equation (4a). In alternative embodiments, it may be possible to use corner response metrics to replace the SM such as, but not limited to, the Harris and Laplacian corner-ness measures though the non-uniform illumination invariant property may be affected.

A good SM may be determined such that it satisfies the following three conditions:
(a) a larger number of non-zero components of the corresponding sparse representation of the image block around a candidate key-point gives a positive effect on the strength measure;
(b) a larger summation of quantities (i.e. coefficients) of the non-zero components of the image block around a candidate key-point gives a positive effect on the SM; and
(c) lower CM key-points may have a chance to be stronger than higher CM key-points to diversify the types of the detected key-points, which means not only key-points with top complexity measures, but also those with lower complexity measures can be detected even though only a limited number of key-points are expected. In fact, as long as a function satisfies the aforementioned three conditions, it can be considered as a strength measure.

In other embodiments, depending on the image datasets and sparse coding dictionary D, different strength measures such as a linear combination of two or more of norm-0, norm-1 and norm-2 or a higher level norm (e.g., norm-s) or some other combination of functions may yield better performances. These functions are defined as follows for an example vector $A = (A1, A2, A3, \ldots, AN)$: norm-0=total number of non-zero components in the vector A; norm-1=abs(A1)+abs(A2)+ . . . +abs(AN) where abs=absolute value; norm-2=sqrt($A1^2 + A2^2 + A3^2 + \ldots + AN^2$), and $$\text{norm-}l = \sqrt[l]{|A1|^l + |A2|^l + \ldots + |AN|^l}.$$

In some cases, the strength measure can be determined based on an appropriate combination of one or more of the norm-s functions previously mentioned with a function of the reconstruction error ($\|X_{norm}' - D\alpha\|_{l2}$), such as a square of the reconstruction error ($\|X_{norm}' - D\alpha\|_{l2}$), or the reciprocal of the square of the reconstruction error ($1/\|X_{norm}' - D\alpha\|_{l2}^2$).

At act 314, the method 300 includes performing non-maxima suppression on the key-points in order to determine the final set of detected key-points. This may be performed by sliding a small window (of size m×m) through all key-point positions in the image dataset. At any position, a key-point is suppressed if its SM is not the highest SM in the neighborhood limited by the window. Since many nearby key-points which have very similar CMs are eliminated after the suppression, this act contributes to the spreading of the types of detected key-points. Accordingly, the distribution of detected key-points in the image dataset may be improved by the suppression step. The enhancement in distribution of detected key-points may be expected for some situations such as occlusion, in which points around a neighborhood are blocked by other objects and are unable to be detected by the key-point detector 120.

The size of the sliding window can set by a user and is fixed when used on an image dataset for key point detection. The window may be moved such that a given position of the window overlaps with a previous position of the window which is represented by the variable stride. For example, the window can be moved with a stride=1 meaning that the current window location overlaps with the previous window location by one line of pixels.

Figure 4A:
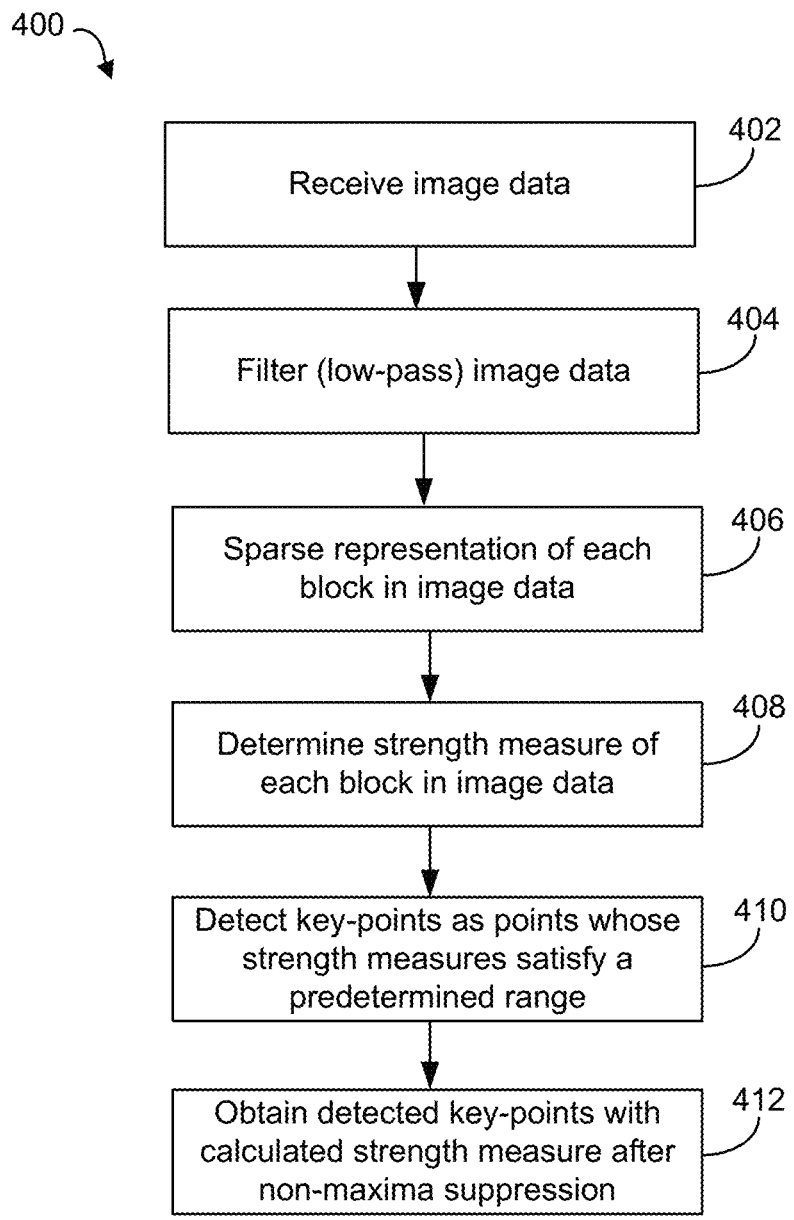
FIG. 4A illustrates an example of an alternative embodiment of a key-point detection method in accordance with the teachings herein.

Referring now to FIG. 4A, shown therein is an example of an alternative embodiment of a key-point detection method 400 in accordance with the teachings herein. The method 400 can be processed by the system 100 of FIG. 1. In method 300, the CM is used for key-point detection which eliminates many spurious key-points, and the SM is used for key-point selection as a final refinement step. However, with method 400 the SM is used for both key-point detection and selection tasks.

Method 400 works well when the value for the sparseness penalty A in equation (2) is set higher, which makes the CM value for each image block become much smaller, and the components which remain are those that are more used to represent the image block. Thus, the settings for the upper and lower limits of the CM become unnecessary; i.e. the lower and upper limits become negative and positive infinitive respectively, which, in fact, negates the need to set these parameters. The SM, which takes into consideration the contribution of these remaining components, meanwhile, becomes very reliable such that it can be utilized for both tasks. This means that the SM can be calculated for all key-points and then, the top M key-points (i.e. the M key-points having the largest SM) are selected as key-points for subsequent image processing based on a descending order of the SM (the selection of the top M points is performed after the non-maxima suppression step or act 412). The other acts of method 400 are similar to those of method 300. Accordingly, acts 402-406 of method 400 correspond to acts 302-306 of method 300. Method 400 then implicitly performs act 408 and omits 310. Act 410 is an optional step, which is only performed when it is desired to extract key-points as points that have a SM that is in a pre-defined range. If this range is unlimited, then this act can be by-passed. Act 412 of method 400 corresponds to act 314 of method 300. After act 412, similar to an optional act of method 300, the detected key-points can be optionally ranked and then the M key-points having the highest SMs are retained in the list of detected key-points while the other detected key-points are discarded.

An example of pseudo code 450 for performing key-points detection is shown in FIG. 4B. In the pseudo code 450, step 1 involves applying pre-filtering to the image data in a somewhat similar manner as was described for act 304. Steps 2 and 3 involve setting up a loop and processing each image block by performing sparse coding on each image block in a somewhat similar manner as was described for acts 306 and 402-406, and determining the CM and SM in a somewhat similar manner as was described for acts 308, and 310 respectively. Non-maxima suppression is now performed on the SMs in a somewhat similar manner as was described for act 314. A final set (i.e. list) of detected key-points is then determined by selecting the N key-points with the highest SMs. Alternatively, in another embodiment, the CM is used for both key-point detection and selection, in which case the non-maxima suppression step may be performed on the CMs. If this is the case, any calculation with SMs may be omitted.

In alternative embodiments, the key-point detection methods 300, 400 and 450 can be performed for colour images without first converting the colour images to gray-scale images. This can be done in several ways such as reshaping each image block in color images into a vector and then performing the sparse coding on the reshaped vector and then performing the sparse coding step as shown in FIG. 9A. In this case, each image block for sparse coding can have three dimensions, for example the dimensions=n×n×3 where 3 is the number of color channels, and the dimensions are not n×n as when grayscale images are processed. Therefore, an RGB image block can be reshaped into a vector of n×n×3 by 1. After that the sparse coding representation of that image block can be determined with a dictionary D of the same dimension, for example, n×n×3 by k where k is the number of atoms or components of the dictionary D.

In another alternative embodiment, the CMs for each pixel in each channel of an image block can be determined. After that, the CMs for each channel can be combined to create a combined CM for the pixel of the RGB image block. The combination may be a linear combination or a multiplication of the 3 CMs.

In another alternative embodiment, the CM can be first used for key-point detection and then SM can be used for key-point selection. In some embodiments, the SM may not necessarily be required when the number of expected key-points is large, and determining the SM may be more computationally expensive than determining the CM.

In another alternative embodiment, some of the acts the key-point detection methods described herein may be re-organized into different sequential orders or performed in parallel to be appropriately applied in different applications or implemented with certain types of hardware such as hardware that has at least one GPU. For example, a number of steps of the methods described herein such as low-pass-filtering an image, preparing a normalized version of an image block, finding the sparse representation of a vector derived from an image block and calculating the complexity measure and strength measure of a normalized image block, can be performed in parallel. For example, these steps can be divided into multiple smaller steps, each running with different threads of a GPU. For example, the sparse coding step for each block in an image can be run separately in parallel rather than in sequence, as the sparse coding result of one block is independent from another block. Similar operations that are performed in independent blocks or information parts of images may be run like this. As a GPU may have thousands of cores supporting thousands of threads, this strategy can allow for shortening the key-point detection (e.g. extraction) time.

Referring back to FIG. 2, the key-point detector 120 outputs a list of key-points at act 206. For example, one key-point list can be output for each image. It is to be understood that the same process can be performed with video data by performing the methodology on separate images (i.e. image datasets) of the video data that correspond to the same scenes but are taken at different points in time or from different angles or different shifted perspectives.

Method 200 then proceeds to act 208, where different image processing operations may be performed on the image datasets using the list of key-points that are associated with the image datasets. For example, two or more images containing common key-points can be analyzed such that regions associated with the key-points are compared to determine if there is a change in size or appearance of the regions over time. This can involve determining whether two key-points from different images represent the same thing. For example, when analyzing two or more images for identification of similar or common key-points the steps may include performing key-point detection for each of the images, calculating descriptors for the detected key-points, and using the descriptors to find correspondences of key-points between the images, which means common key-points in the different images which represent the same underlying object or structure.

A descriptor is a vector that is used to describe the characteristics of the neighborhood of a key-point in order to identify it from other key-points in a given image and find a corresponding key-point in a different image of the same scene taken at a different point in time from at least one of a different camera angle, a shifted camera angle and under different lighting conditions. For example, one way for finding correspondences of two key-points representing the same positions in different images is by determining when the Euclidean distance of two corresponding descriptors of two key-points from different images is the smallest in all key-point descriptor space. Other similar metrics may also be used to determine that two key-points correspond to one another when the distance between their corresponding descriptors multiplied by a factor is less than the distances between one of the two key-points with any other key-point in the image.

Different image processing applications that may be performed at act 208 were listed in describing the operation of the image processing module 122. Examples of some of these image processing applications are now discussed in more detail.

For instance, in one image processing application, the key-points detection methods described herein may be used in stitching together different images that capture different parts of the same scene to create a panoramic image or a wide-angle view of a physical space. In this case, two or more images containing common key-points can be combined (i.e. "stitched together") such that the common key-points overlap to produce the panorama or wide-angle view.

Another example image processing application is object tracking. In this case, each object in an image can be represented, for example, by a collection of multiple key-points. Several images can be processed in this way and it can be determined which key-points in two or more of these images correspond to one another (i.e. represent the same object) by comparing the descriptors of the key-points. The corresponding key-points can be tracked in a series of images. Tracking the moving directions and the new positions of the key-points gives information about new positions and moving directions of the objects in successive images.

As another example image processing application, in the medical field, two or more medical images containing common key-points can be analyzed such that regions associated with these key-points are compared to determine when there is a change in size or appearance of the regions. Once corresponding key-points are found for two or more medical images, to determine a change in size of the regions, the shifting distance or level of growth of an object of interest can be estimated based on the shifting or relative changes in distances of the corresponding key-points.

As another example image processing application, there have been other key-point detectors and descriptors that have been developed for face recognition, resulting in very encouraging recognition accuracy [27, 16, 17]. In this facial recognition, one of the primary steps is to detect distinctive points to represent the faces in test and reference images. After this step, each detected key-point is described by a feature vector, called a descriptor, which characterizes the appearance of the face area around the key-point. Then, each test or reference image can be represented by a collection of key-point positions and their descriptors. A matching algorithm may then be used to evaluate the similarity between a given test image and any reference image based on their representations. The matching step is to decide if the test image is of a person in one of the reference images. Based on the aforementioned face recognition procedure, it is apparent that different detected key-point positions of images of even the same person can lead to very different representations for the face of that person, and affect the final recognition result, so it is preferable to stably localize key-points under various imaging conditions. In fact, as the lighting conditions for capturing test images are often uncontrolled, stable key-point detection under illumination change is therefore especially required. The key-point detectors described in accordance with the teachings herein has been proved to be robust with affine intensity change and may be a better alternative in the key-point detection step for facial recognition.

As another example image processing application, the key-point detection methods described herein can be used with Simultaneous Localization and Mapping (SLAM) which is one of the most important tasks in robotics to concurrently localize the pose of a robot and reconstruct the 3D environment surrounding it. Among SLAM approaches, the visual SLAM methods which use one or more cameras as the sole input are in a dominant trend, since cameras are lightweight, inexpensive, low power demanding sensors that can also allow the robot to cope with other high-level tasks such as human and place recognition [28]. In many visual SLAM systems [29-32], key-points are first detected and then their descriptors are extracted for each frame captured by the input cameras. The detected key-points are then tracked and/or matched between frames obtained at different times or by different cameras to reconstruct the 3D information of the environment (including solving the loop-closure problem) and estimate the current positions and orientations of the cameras. The matching of key-points is also crucial to re-localize the robot in situations such as a kidnapped situation in which the robot is blindly brought back to one of the previously known locations. To have more accurate matches of key-points, more key-points given in one frame by a key-point detector can be repeatedly detected by that key-point detector in other frames (i.e. images) of the same scene. Yet when the robot is deployed in outdoor environments, the captured frames often have different lighting conditions and so, the repeatability of key-point detection may be greatly affected. However, unlike traditional key-points such as SURF, SIFT, Harris corner, the key-point detection methods described herein are proved to be fully robust with affine illumination change, and thus the application of the detectors described in accordance with the teachings herein for key-point detection may improve many current visual SLAM systems.

In another example image processing application, for autonomous driving, which may use SLAM systems, once corresponding key-points are determined for one or more images, 3D information of the surrounding environment of a vehicle can be generated. Once the 3D environment information and the current vehicle position are determined, guidance to a destination (such as a route for a navigation system) can be determined.

Evaluation of SCK Detector

To evaluate the SCK detector with a matching score metric [21], a scale can be specified where key-points are located. The scale for the key-points can be selected empirically. Alternatively, based on the fact that a black disk with radius r in a white background has the highest response to a normalized Laplacian of Gaussian function (see equation (5)) at a scale a equaling to $r/\sqrt{2}$, the scale for the key-points can be selected as $\sigma=r/\sqrt{2}$ where r is the size of a key-point as determined by equation (3). This is because at each key-point location, a key-point can be estimated as a disk with radius r, and any points inside r can be considered potential key-point positions while any points outside r are not. This way of selection consistently improves the performance of the matching score metric.

$$\text{LoG} = \frac{(x^2 + y^2 - 2\sigma^2)}{\sigma^4} e^{-(x^2+y^2)/2\sigma^2} \tag{16}$$

The Capacity of Detecting all Types of Structures with SCK Detectors

The ability to detect multiple structure types in images is favorable since it makes a detector adaptable to different situations, as the detector can find quality key-points of different structure types simultaneously. Meanwhile, a single type structure detector, when being used in a situation which does not have much suitable pre-defined structures, will find fewer quality key-points and thus decrease the repeatability.

The SCK detector described herein is concerned with the number of components required to construct the structure in an image block, and to what extent these components contribute to the construction of the structure. The corresponding shape for the combination of the components is not essential, and thus whether a shape is a corner or a blob, it may be detected by the SCK detector described herein. On the other hand, based on linear algebra theory, any arbitrary vector $X' \in R^{N \times 1}$ can be represented as a linear combination of a complete basis set of vectors of the same dimensions. Since the dictionary used in the sparse coding steps described herein is often a complete or over-complete dictionary, whether an image block X' represents a corner, a blob, a junction, or any other structure, it can be decomposed into a linear combination of the corresponding basis set. If the number of non-zero components in the combination satisfies a predefined complexity range, it will be detected as a key-point by the proposed SCK detector.

In practice, the use of an under-complete dictionary instead of complete or over-complete dictionaries may also be considered for the SCK-based key-point detection methods described herein. Although not all types of structures may be as effectively represented, an under-complete dictionary may be sufficient to represent multiple structures and deliver good results with the proposed SCK key-point detection methods.

Robustness of the SCK Key-Point Detector Under an Affine Intensity Change

The so-called affine intensity change model in the computer vision field is based on the following assumptions:
(1) Under a change in lighting condition, each pixel intensity I becomes aI+b (a: multiplicative, and b: additional effects of light); and
(2) The light effects in a small neighborhood are uniform.

Following the description about act 306 or act 406, for each image block X, the input to the sparse coding step is its normalized version $X_{norm}'$ after reshaping the block to a vector X'. The normalization step can be formulated as:

$$X_{norm}' = \frac{X' - \mu_X}{\|X' - \mu_X\|} \quad (17)$$

where: $\mu_X$ is the mean vector of the intensity levels of pixels inside the image block. With the two aforementioned assumptions, it is observed, in equation (17), that under different lighting conditions, the image block X may be changed to $X_{after\ change}$=aX+b, but the input to the sparse coding step remains the same as before the change in lighting occurs.

$$X_{norm\ after\ change}' = \frac{(aX' + b) - (a\mu_X + b)}{\|(aX' + b) - (a\mu_X + b)\|} = \frac{X' - \mu_X}{\|X' - \mu_X\|} = X_{norm}' \quad (18)$$

Since the input to the sparse coding step is the same, the CM and SM are therefore also unchanged under the affine intensity change. This verifies the illumination invariance property of the SCK detectors described herein.

Experimental Results for Sck Detector

In an experimental study, the SCK detector was evaluated with three public datasets with different natures, Webcam [7], EF [19] and SymBench [20] in order to demonstrate the effectiveness, robustness and flexibility of the SCK detector. Also, there are significant changes in illumination in the tested images in these datasets for verification of the SCK detector's robustness with changes in lighting conditions.

The Webcam dataset [7] has 6 sequences, each of which has 140 images of the same scene (Training: 100; validation: 20; testing: 20). In this dataset, each scene has drastic changes in time and seasons, such as day/night, rain/snow, and winter/summer. The performance reported in the experimental results herein is for the testing images only.

The EF dataset [19] has 5 sequences of 38 images with drastic changes in illumination, scale and background clutter changes. The SymBench dataset [20] has 46 pairs of images with a range of dramatic variations in lighting, age, scale and rendering style.

Two metrics that were used for the quantitative evaluation of different key-point detectors include the repeatability and matching scores. The evaluation code is provided by Mikolajczyk et al. [21] and VLBenchmarks [24]. As in Mikolajczyk et al. [21], with a known transformation between a pair of images, if the overlapped error of one key-point region in an image and the projected region from another image is less than a threshold (which was 0.4, but a different threshold can be used in other cases), the two key-point regions are considered to be corresponding to one another. The repeatability is then defined as the ratio between the number of corresponding regions and the smaller number of regions in the shared part of the image pair. Meanwhile, the matching score is the ratio between the number of correct matches and the smaller region number. A match is considered a correct one, if the distance between two corresponding descriptors is the minimum in the descriptor space. Since random matching of key-points and unreasonably high performance may occur if a large number of key-points are used, only 1000 key-points/image are considered as suggested in [8].

As the implementations of some of the methods, which are compared to the SCK (e.g., Harris Laplace), do not have a clearly associated strength measures—the average 1000 key-points/image can be used for calculation of the quantitative results for each of these methods. This, however, can cause potential inconsistency in the measurement quality. Through substantial experiments, it has been identified that a corner-ness measure, provided with the implementations in [39], is better suited for sorting and selecting points for these methods. Accordingly, this can allow for enhanced determination of the quantitative results of these methods. Additionally, studies were conducted for some methods in [8] that generate very few key-points, and in turn, utilized appropriate thresholds with proper adjustment to generate sufficient points for selection. In respect of matching scores, it has been appreciated through experimentation that SIFT orientation assignment does not work well with large non-uniform illumination changes in both SCK, and methods being compared to the SCK. Accordingly, the matching scores for all methods, as disclosed herein, is calculated with only downward direction of key-points. In [8], [27], average matching score, for each p image sub-dataset, was calculated using only the first p−1 image pairs. This, however, appeared to generate bias and incomplete statistics. Accordingly, to rectify this shortcoming, the matching scores herein are calculated based on all image pairs ((p−1)p pairs) in the sub-dataset. With the abovementioned steps, it is expected that fairer perspectives in performance evaluation and comparison, between all methods, is achieved.

FIGS. 10A-10D shows 4 pairs of images 1000a, 1000b, 1000c and 1000d. Key-points and their correspondences are plotted on top of these images. Approximately 1,000 key-points/image were used and 20 potential best matches/pair are plotted. As shown in 1000a, 15 correct matches are found using the SCK key-point detector. In 1000b, 5 correct matches are found using the SIFT detector. In 1000c, 7 correct matches are found using the Harris detector. In 1000d, 7 correct matches are found using the SFOP detector.

Figure 11:
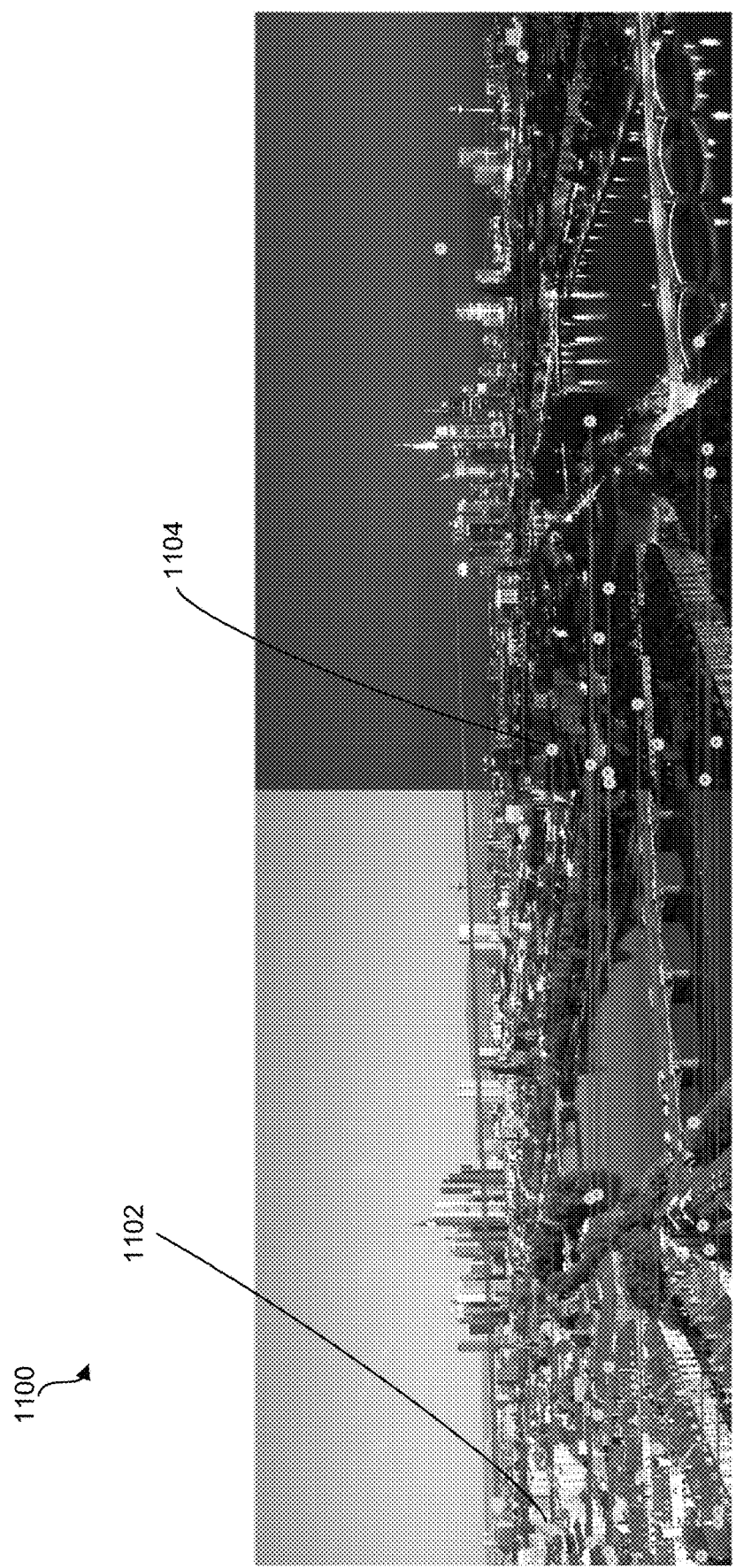
FIGS. 11, 12, 13 and 14 illustrate examples of detecting and matching key-points in images from a dataset with a SCK detector (in accordance with the teachings herein), a SIFT detector, a Harris detector, and a SFOP detector, respectively, where the SIFT descriptor is used.

FIG. 11 shows a pair 1100 of images from the Webcam dataset with drastic changes in illumination. Twenty (20) potential best matched key-points and their correspondences are shown on these images. An example of corresponding key-points are 1102 and 1104. In this experiment, the SCK key-points were first located with a cosine dictionary, an image block size of 11, and λ=0.25 for the sparse coding detector. The detected key-points were then matched by the SIFT descriptor based on Euclidean distance. The matching code is provided in [24]. In this matching scheme, two key-points a, b in two different images are deemed matched if the distances between two corresponding descriptors $D_a$ and $D_b$ multiplied by a threshold (e.g. 1.5) is less than the distance of $D_a$ to all other descriptors (this may be used when matching key-points in the other image processing methods described herein).

Figure 12:
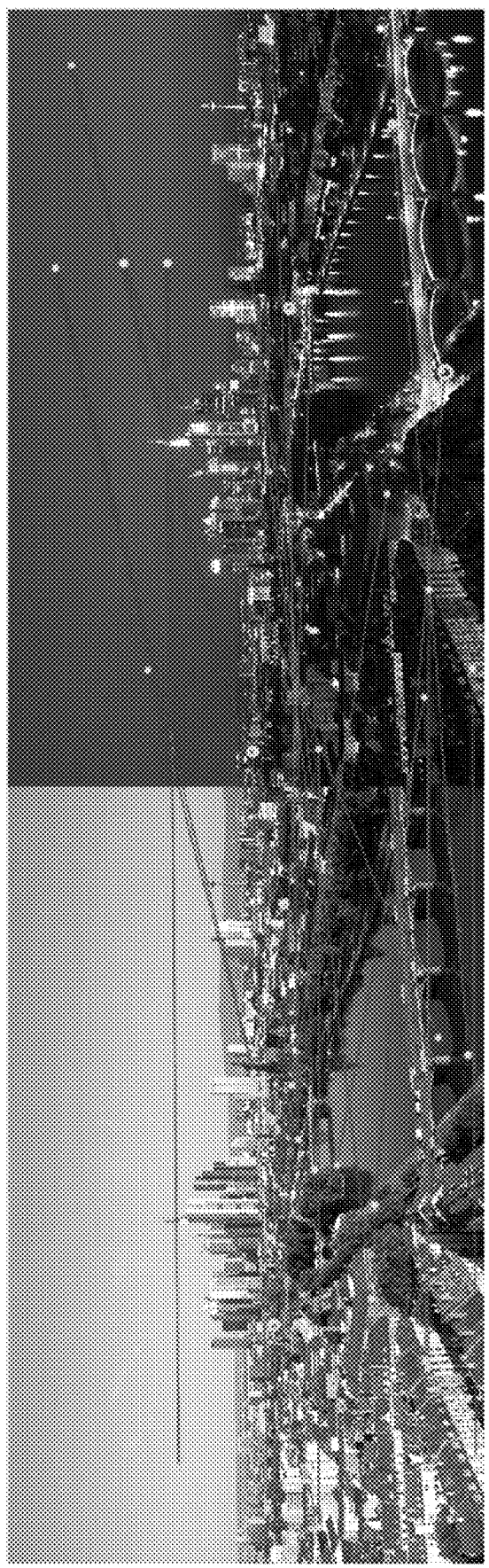
Figure 13:
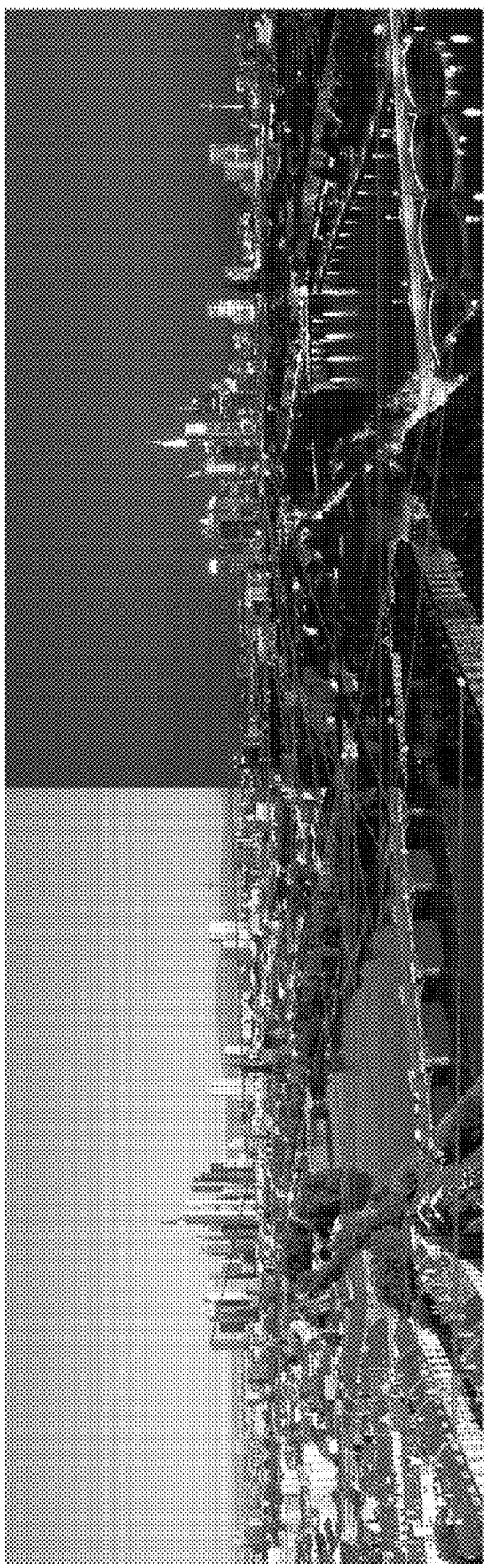
Figure 14:
Figure 15:
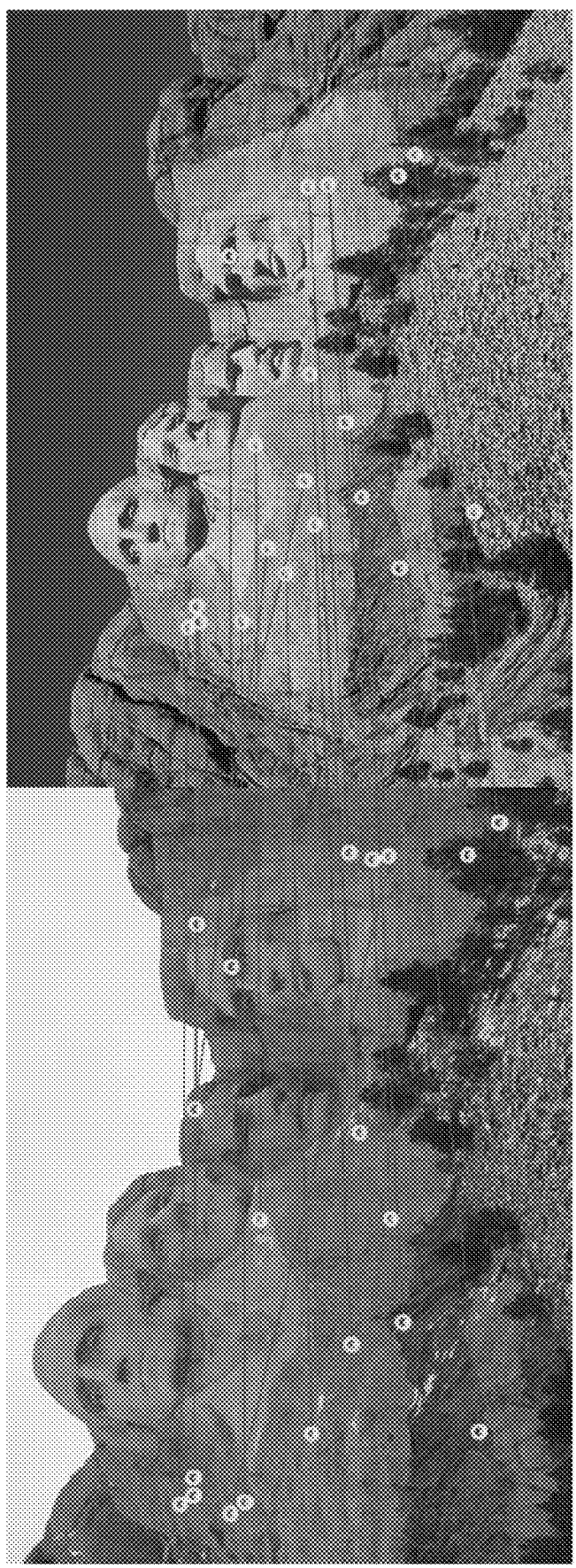
FIGS. 15, 16, 17 and 18 illustrate examples of detecting and matching key-points in images from a dataset according to a SCK detector (in accordance with the teachings herein), a SIFT detector, a Harris detector, and a SFOP detector, respectively, where the SIFT descriptor is used.
Figure 16:
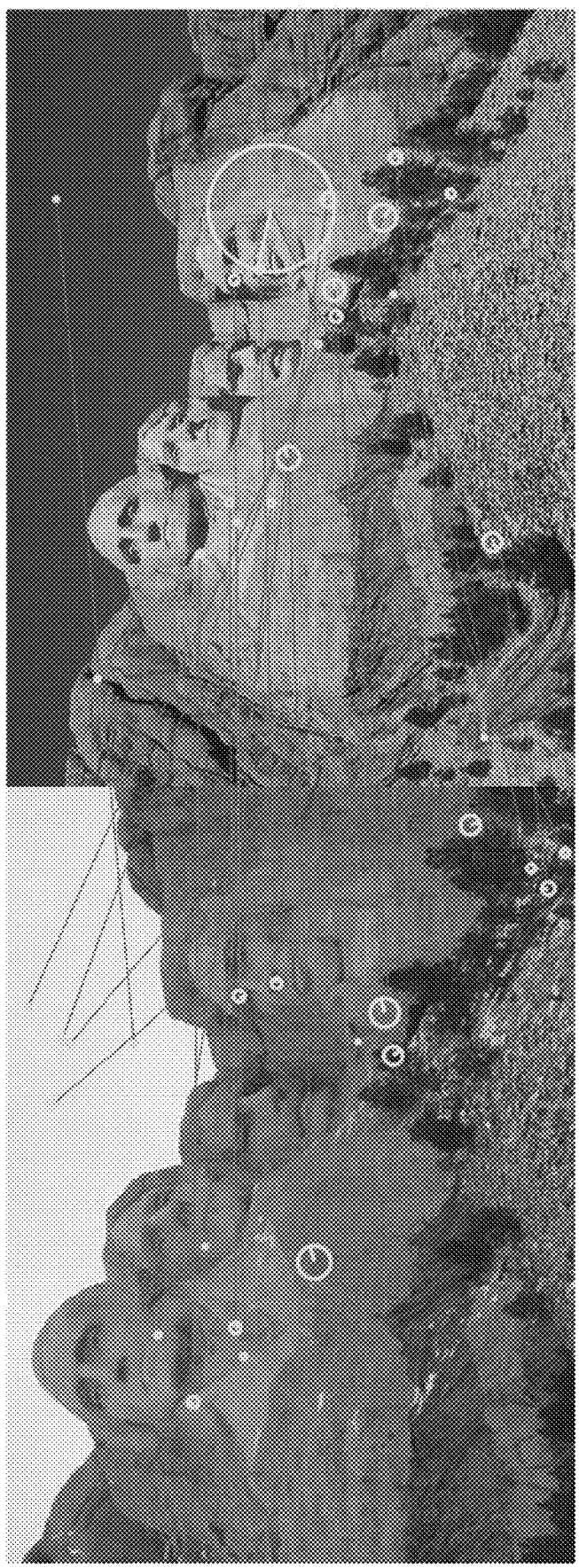
Figure 17:
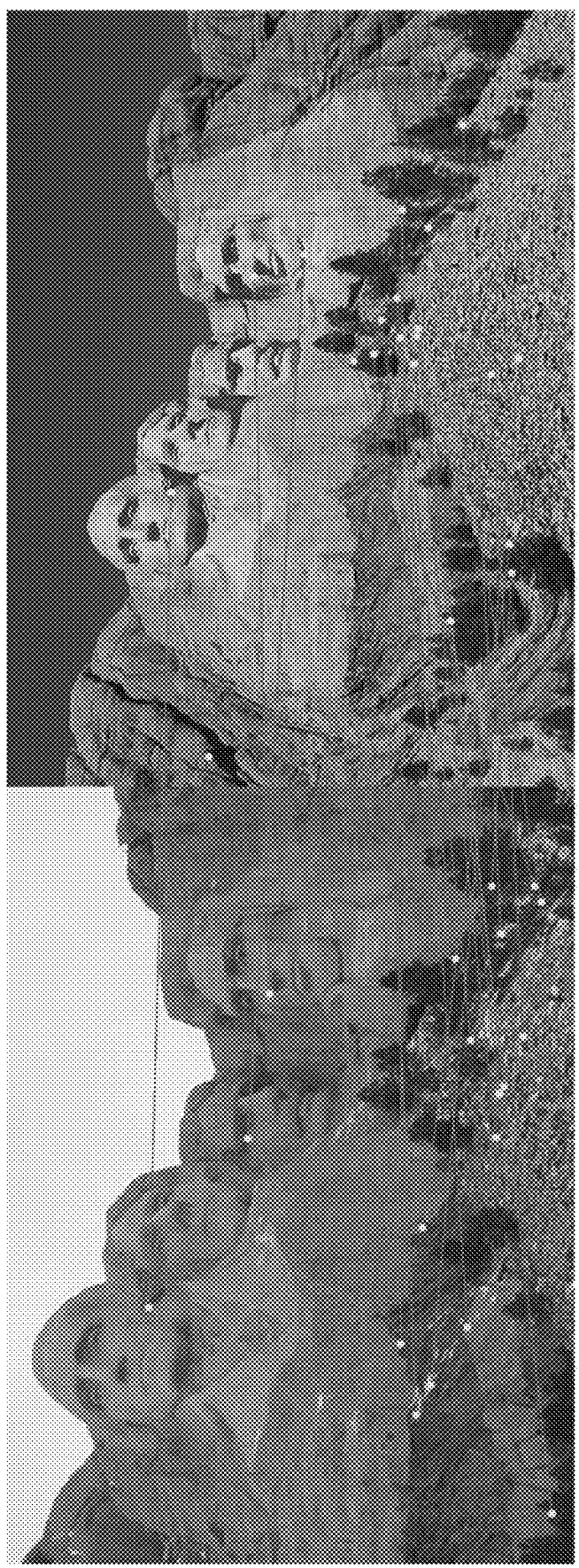
Figure 18:
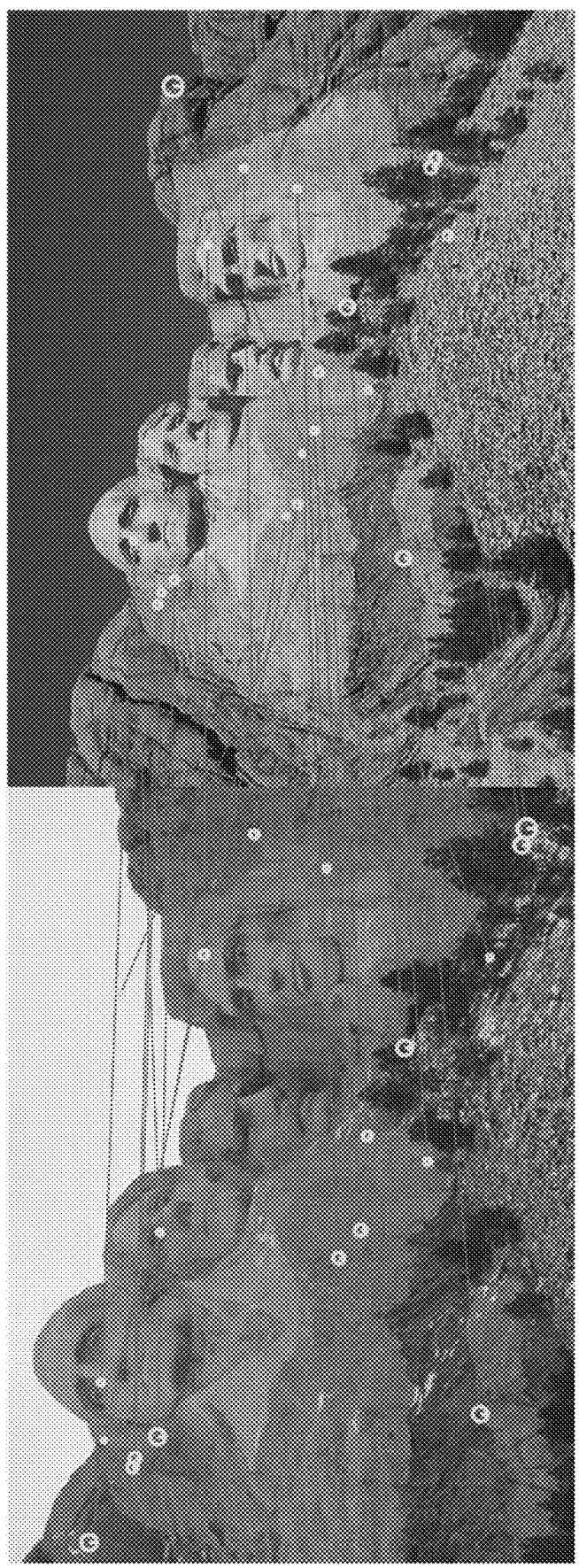

It can be seen from FIG. 11 that although there are several spurious matches, generally the matching results are extremely encouraging (visually around 16 correct matches). Meanwhile, when the experimental procedure is performed with the SIFT, Harris, and SFOP detectors, less promising matching results are obtained with around 5, 7, and 11 correct matches as demonstrated in FIGS. 12, 13 and 14, respectively.

The abovementioned procedure was then repeated with the four detectors on another pair of images from the EF dataset (this pair has significant change in illumination and a mild variation in scale). As illustrated in FIGS. 15-18, a similar trend occurs in each of these pair of images as in the previous example. Visually the SCK detector generated about 17 correct matches, followed by the SFOP (15 correct matches), SIFT (10 correct matches) and Harris (8 correct matches) detectors. Consequently, these qualitative results clearly suggest that the SCK detector can deliver very stable detected key-points under different lighting conditions. This observation can be further confirmed with the following quantitative results which are based on the evaluation of the repeatability and matching score of the SCK detector compared with existing popular detectors.

The average repeatability of the proposed SCK detector was compared, for reference, with popular hand-crafted detectors such as the SIFT [3], SURF [4], SFOP [6], Hessian Laplace, Harris Laplace detectors [21]. Also included in this comparison were some learning based methods including T-P24 (the best detector presented by TILDE) [7], and the Transformation Covariant Detector (TransCovDet) [8] (considered state-of-the-art-work). The Webcam and EF datasets were used in this experiment. In this comparison, there were three different configurations for the SCK detector: SCK-C-1, SCK-C-2, SCK-C-3 (see Table 1). While the SCK-C-2 detector was the configuration for the SCK detector presented previously, the SCK-C-1 and SCK-C-3 SCK detectors are configurations for the procedure with the aforementioned variant in FIG. 4A. The "Cos" dictionaries were used in these configurations which is available from MATLAB™. The three different SCK configurations were used to give a perspective about the performance of the SCK method with different sets of parameters.

As demonstrated in Table 2, the SCK-C-3 detector outperforms all of the hand-crafted detectors by a large margin in Webcam dataset. Additionally, it is higher than the top hand-crafted detector by 0.9% on the EF dataset. The SCK-C-3 detector also shows comparable performance with learning based methods. Furthermore, the SCK-C-1 and SCK-C-2 detectors also perform well when compared with other hand-crafted detectors.

For the matching score, the proposed SCK detectors were compared with three representative hand-crafted detectors including SIFT, SURF, Hessian Laplace, and two previously mentioned learning based detectors, including T-P24 (the best version of TILDE), and TransCovDet detectors implemented on the two datasets. Table 3 illustrates that the proposed SCK detectors work significantly better than SIFT, SURF, and Hessian Laplace (and even better than T-P24) on Webcam dataset. The SCK detectors also show comparable performance (or slightly higher with SCK-C-1 configuration) compared with these methods on EF dataset, even though the three SCK configurations are not designed to work with large scale changes featured in EF dataset. Without a learning component, SCK-C-1 can achieve similar performance comparable with state-of-the-art learning based detector TransCovDet. As will be explained later, state-of-the-art work TransCovDet's performance will be overcome by a proposed Scale and Rotational Invariant Sparse Coding based Key-point detectors (SRI-SCK) which can search for more stable key-points of different scales. Yet, it is noted that the comparison with learning based detectors is for reference only, as the developed detectors could serve as input to enhance performance of a learning based detector.

To illustrate the flexibility of the proposed SCK key-point detection method, it was also tested with another dataset, SymBench. For this dataset, the SCK-C-3 detector was compared with the SYM-I and SYM-G detectors [20], for the detection of symmetric structures available in images using intensity and gradient information respectively. In this comparison, the average repeatability values for 200 points and 1,000 points per image are reported. From Table 4, it can be seen that the SCK-C-3 detector works much better than the SYM-I detector but slightly worse than the SYM-G detector, which is a scale invariant detector.

To show the performance of the proposed SCK method can be enhanced without changing the current design, the proposed SCK detector was tested using another configuration called SCK-H (Haar dictionary from Matlab, block size 11, $\lambda=0.15$, upper limit=20). With this new setting, the SCK detector outperformed the SYM-G detector in both cases. Thus, depending on the image datasets, better performance may be achieved by using a different dictionary for the SCK detector. The reason for the change in performance is that the same structure may have different levels of complexity with different dictionaries, so dissimilar key-point positions are detected in the same images if the dictionary is changed. If the key-point positions detected with a selected dictionary are inherently stable in an image dataset, then the repeatability of detecting these key-points will be higher than those given with other dictionaries. In practice, a suitable dictionary may be selected based on testing an appropriate image dataset before utilizing the SCK detector in a real image processing application.

TABLE 1

Different Configurations of the SCK Detectors

| Name | Dictionary | Block size | λ | Upper limit |
|---|---|---|---|---|
| SCK-C-1 | Cos | 11 | 0.25 | +inf |
| SCK-C-2 | Cos | 17 | 0.15 | 12 |
| SCK-C-3 | Cos | 17 | 0.25 | +inf |

TABLE 2

Repeatability of Different Methods on Webcam and EF datasets

| Type | Method | Webcam | EF |
|---|---|---|---|
| Hand-crafted | SIFT | 28.5 | 20.6 |
|  | SURF | 45.5 | 40.3 |
|  | SFOP | 38.1 | 33.6 |
|  | Hessian Laplace | 35.9 | 23.4 |
|  | Harris Laplace | 38.8 | 22.2 |

TABLE 2-continued

Repeatability of Different Methods on Webcam and EF datasets

| Type | Method | Webcam | EF |
|---|---|---|---|
| | SCK-C-1 | 61.1 | 39.3 |
| | SCK-C-2 | 61.3 | 40.0 |
| | SCK-C-3 | 63.2 | 41.2 |
| Learning-based | T-P24 | 61.1 | 46.1 |
| | TransCovDet | 63.4 | 49.2 |

TABLE 3

Matching Score of Different Methods on Webcam and EF datasets

| Method | Webcam | EF | Average |
|---|---|---|---|
| SIFT | 11.8 | 8.9 | 10.35 |
| SURF | 16.2 | 8.3 | 12.25 |
| Hessian Laplace | 14.2 | 8.0 | 11.10 |
| T-P24 | 22.2 | 9.0 | 15.60 |
| TransCovDet | 29.2 | 11.9 | 20.55 |
| SCK-C-1 | 27.0 | 9.2 | 18.10 |
| SCK-C-2 | 23.6 | 7.6 | 15.60 |
| SCK-C-3 | 24.4 | 7.9 | 16.15 |

TABLE 4

Repeatability of Different Methods on Symbench Dataset

| Method | 200 points/image | 1000 points/image |
|---|---|---|
| SYM-I | 20.6 | 39 |
| SYM-G | 28.1 | 51.8 |
| SCK-C-3 | 24.4 | 49.8 |
| SCK-H | 30.9 | 52.3 |

Scale and Rotation Invariant (SRI) SCK Detector

Although the SCK detector demonstrates enhanced performance in comparison to other hand-crafted detectors, the SCK detector may not perform well when handling images having drastic changes in scale and rotation. Accordingly, in an alternative embodiment, an SRI-SCK detector is proposed which can locate stable key-points in images that contain the same objects but have significant changes in scale and/or rotation, all the while demonstrating invariance to affine intensity changes and operating independently of pre-defined structures, as with the SCK detector embodiments.

In particular, the proposed SRI-SCK detection method is performed using method 200 of FIG. 2, with the exception that a novel SRI-SCK detection technique is applied at act 204.

Figure 5:
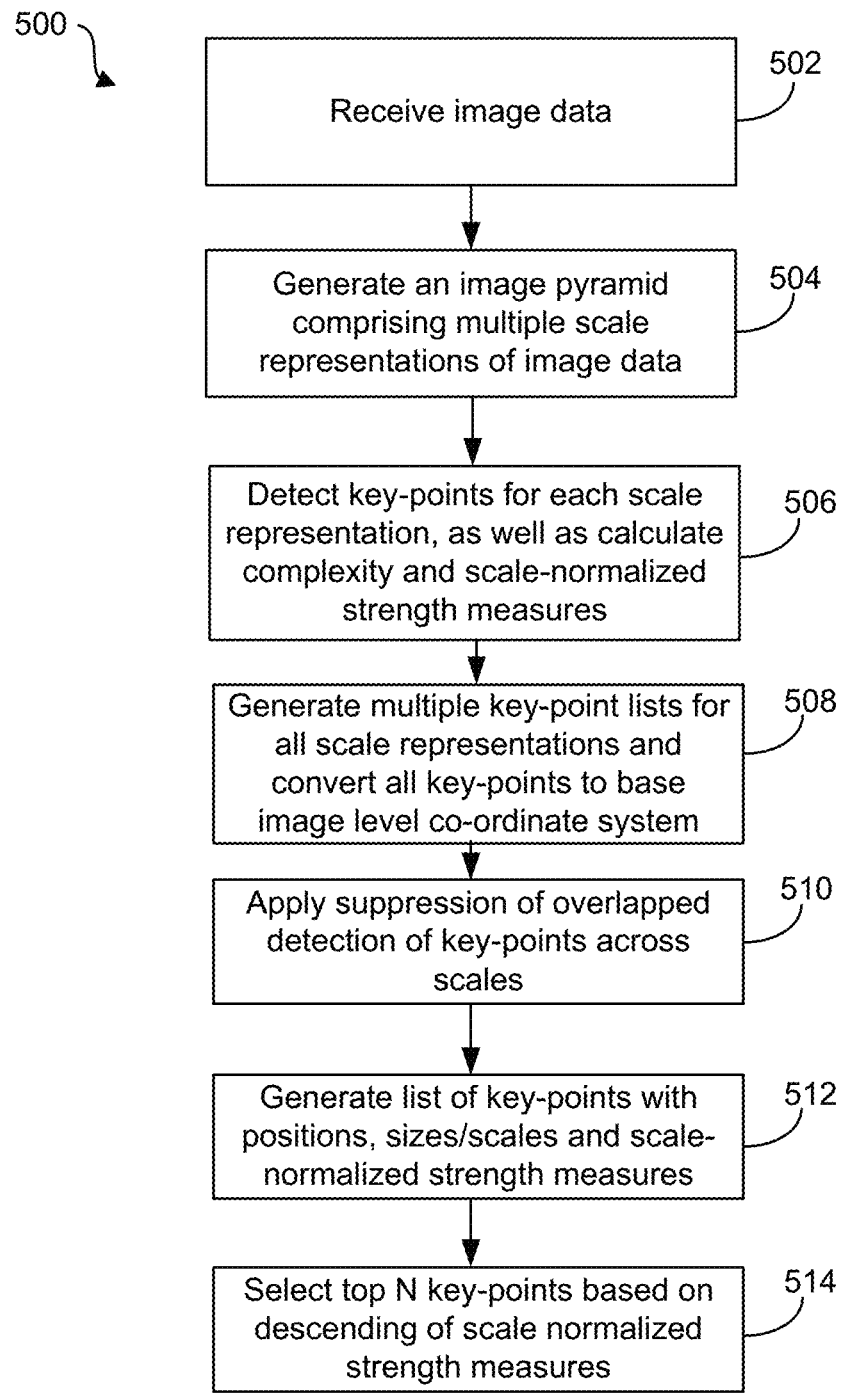
FIG. 5 illustrates an example embodiment of a scale and rotational invariant key-point (SRI-SCK) detection method, in accordance with the teachings herein.

Referring now to FIG. 5, shown therein is an example embodiment of a method 500 for SRI-SCK detection in accordance with the teachings herein. The SRI-SCK detection method 500 corresponds to act 204 of method 200 of FIG. 2. Method 500 can be processed by the system 100 of FIG. 1.

At act 502, input image data is received.

Figure 19:
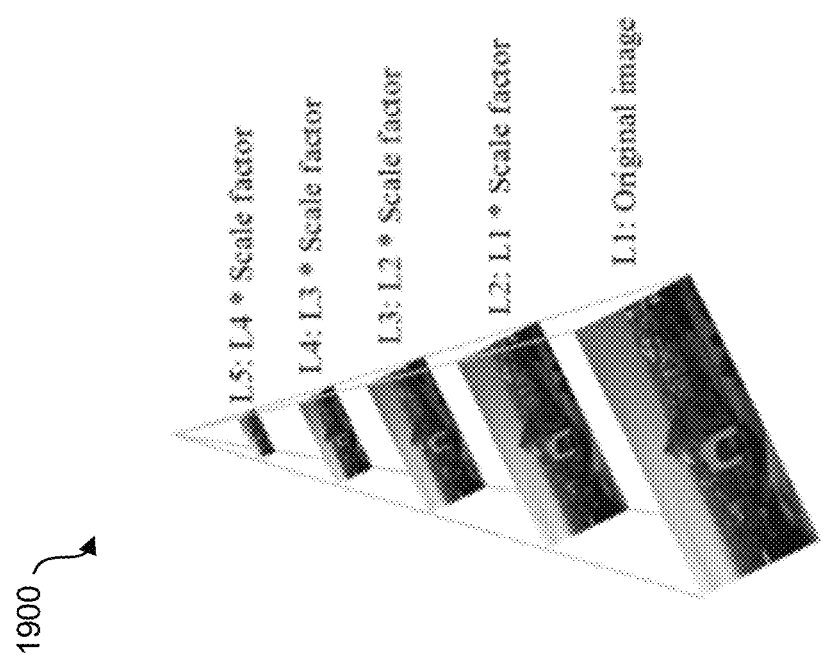
FIG. 19 is an example visual representation of an image pyramid, in accordance with the teachings herein.

At act 504, an image pyramid is generated using the input image data. FIG. 19 shows an example visual representation of an image pyramid 1900 generated using input image data. As shown, the image pyramid comprises multiple "scale representations" of the original input image data. The original image data is visually represented at the bottom of the pyramid (e.g., level 1 (L1)) as the base image. In some cases, a magnified version of the original input image data may be used as the base image. For example, this can be done when objects of interest, in an input image, are scaled down significantly before performing key-point detection. Accordingly, the input image can be magnified to avoid losing important key-points related to the objects of interest. In various cases, the magnified version can be generated by up-sampling the input image with a desired scale factor.

To calculate the dimensions of each progressively higher level of the image pyramid 1900 (e.g., levels 2-5), a 'scale factor' is multiplied to the first and second dimensions of the scaled image located in the preceding pyramid level (e.g., the height ('H') and width ('W') dimensions). For example, the level 2 ("L2") image dimensions are calculated by multiplying the 'H' and 'W' dimensions of the level 1 ("L1") image by a scale factor. Similarly, the level 3 ("L3") image dimensions are calculated by multiplying the 'H' and 'W' dimensions of the level 2 ("L2") image by the scale factor, and so forth. In this manner, a specific level 'I' image becomes the down-sampled version of a previous level I−1 image, with the down-sampled factor equal to the scale factor or the down-sampled version of the bottom layer image, with the down-sampled factor equal to the scale factor^(I−1). In various cases, the scale factor can be in a range between 0 and 1 (e.g., 0.8).

In some cases, the same scale factor can be used to generate new image pyramid levels. Accordingly, each new pyramid level is generated by down sampling the previous pyramid level image with the same scale factor. In cases where a magnified version of the input image is used as the base image pyramid level, the scale factor used for down sampling the previous pyramid level can be the same scale factor initially used to up-sample the input image to generate the magnified version of the input image (i.e., an inverse of the same scale factor is used to down sample, rather than up-sample), or can be a different scale factor. In other cases, different scale factors can be used to generate new image pyramid levels using previous pyramid levels. For example, a first scale factor can be used to generate the second pyramid level from the first pyramid level, and a second scale factor can be used to generate the third pyramid level from the second pyramid level, and so forth. In still other cases, different pyramid image levels can be generated by down sampling the base image by different scale factors, to generate different pyramid levels (i.e., rather than down sampling the image in the preceding pyramid level with a scale factor to generate the next pyramid level). For example, the base image can be down sampled with a first scale factor to generate a second image pyramid level, and with a second scale factor to generate a third image pyramid level, and so forth. The scale factors which are used to down sample the base image to generate new pyramid levels, can be the same, or can be different for different pyramid levels. Any number of pyramid levels can be generated. In various cases, the number of pyramid levels can depend on the size of the image. For example, in some cases, large images (e.g., 2912×2912 pixels) can require just eight image pyramid levels. In at least some embodiments, new image pyramid levels can be generated until one dimension of the highest (e.g., top) pyramid level is less than a pre-defined value (e.g., 160 pixels). In some cases, the dimensions of the highest (e.g., top) pyramid level is at least larger than the size of the image block subsequently used in sparse coding of the image blocks.

In some cases, where the original input image is a color image, a color image pyramid can be generated, and then converted into greyscale as described herein. In other cases, the input image can be converted into grayscale before generating the image pyramid.

Figure 6:
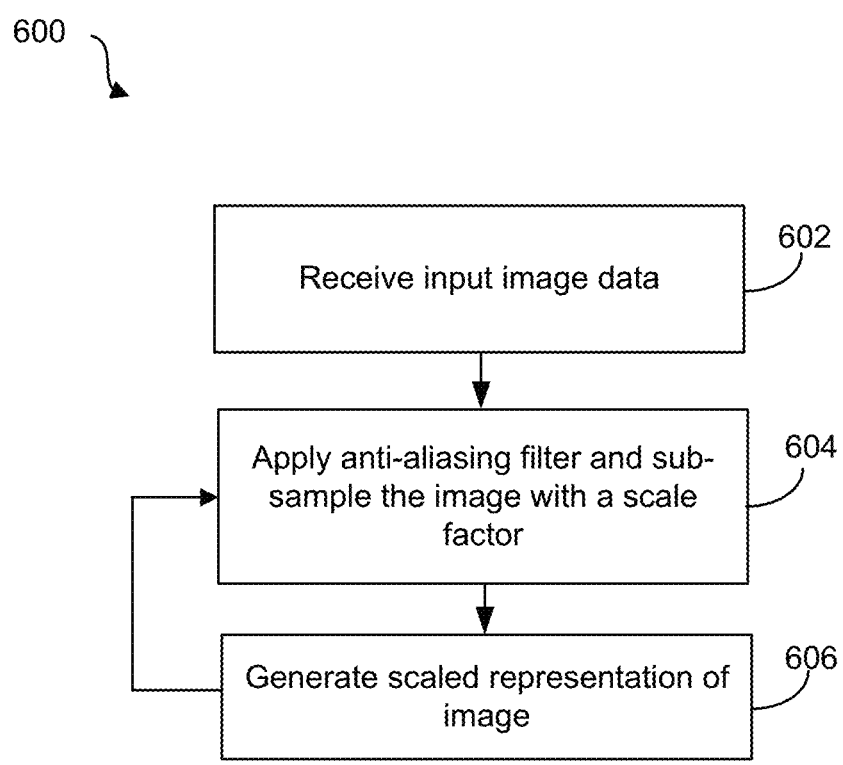
FIG. 6 illustrates an example embodiment of a method for generating an image pyramid from input image data, in accordance with the teachings herein.

FIG. 6 shows an example embodiment of a method 600 for generating an image pyramid in accordance with the teachings herein. The method 600 can be performed by the system 100 of FIG. 1.

As shown, at act 602, the input image data is received. In some cases, a magnified version of the input image data can be received at act 602. At act 604, an anti-aliasing filter is applied to the input image data (or the magnified version of the input image data), and the image data is then subsampled with the scale factor. At act 606, a scaled representation of the image data is generated. In various cases, interpolation can be performed to estimate the correct intensity at each pixel position during subsampling. In order to generate more than one pyramid level, act 604 is iteratively repeated. In particular, each scaled image, generated from a previous iteration of method 600, is processed through the anti-aliasing filter and then sub-sampled at act 604 to generate the next scaled image representation (e.g., a new image pyramid level), and so forth. In other cases, rather than using the scaled image generated from a previous iteration to generate new scaled images, the original input image (or a magnified version thereof) can be repeatedly processed through different anti-aliasing filter and different sub-samplings to generate new scaled image representations. In at least some cases, this can be done to reduce interpolation error.

Figure 7:
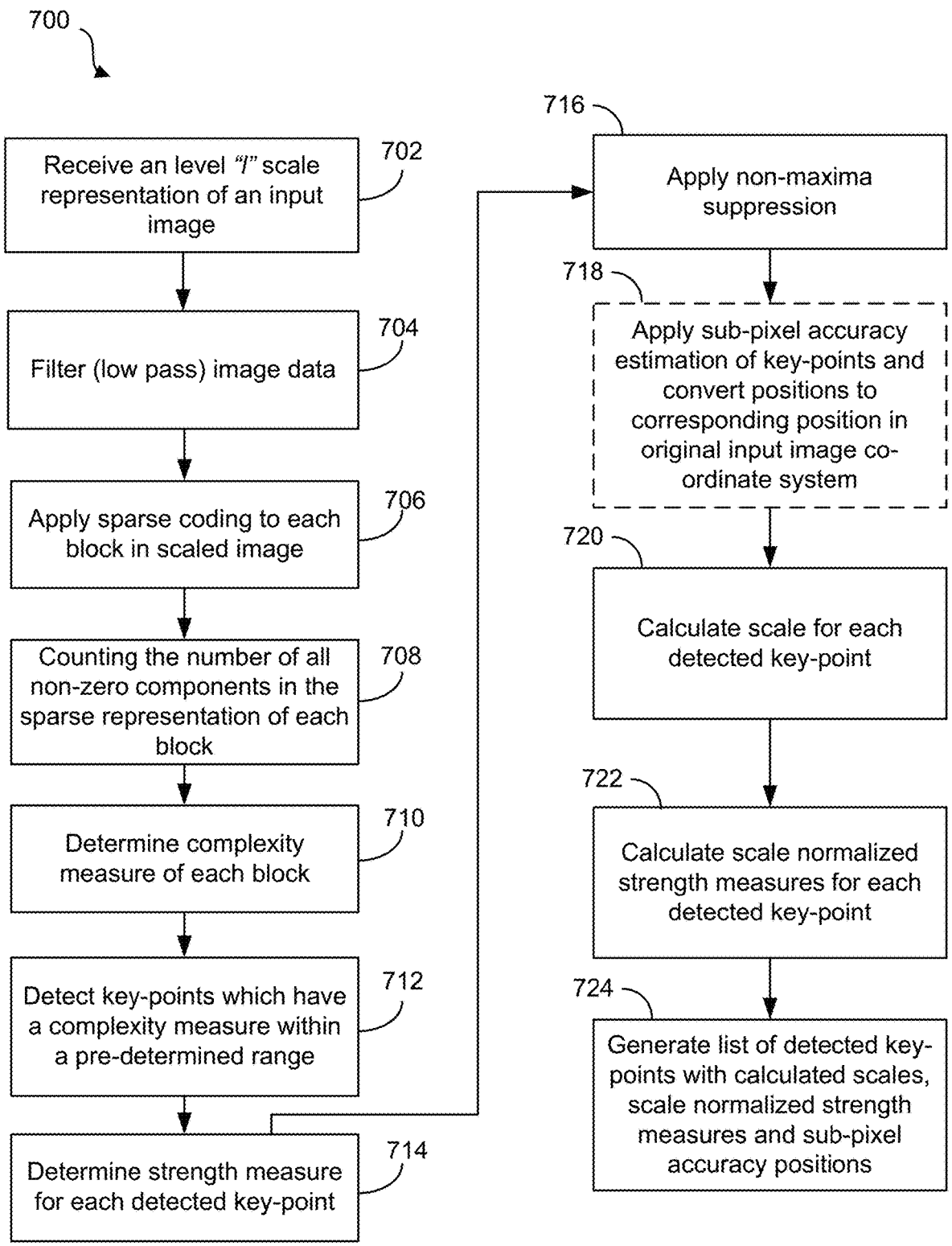
FIG. 7 illustrates an example embodiment of a method for detecting key-points in a scaled representation of an image, in accordance with the teachings herein.

Referring now back to FIG. 5, at act 506, key-points are detected in each scaled image generated at act 504. FIG. 7 shows an example embodiment of a method 700 for key-point detection in a scaled representation of an image in an image pyramid, in accordance with the teachings herein. Method 700 corresponds to act 506 in FIG. 5. Method 700 can be carried out using system 100 of FIG. 1.

As shown, at act 702, scaled representation image data is received. The scaled representation image data corresponds to a level l image in the image pyramid.

At act 704, a low pass filter is applied to the scaled image data to remove noise, and to generate filtered image data. In particular, act 706 is analogous to act 306 of method 300 of FIG. 3. In cases where scaled image data is not in grey scale, the scaled image data can be converted to grey scale prior to, or after, applying the low pass filter.

At act 706, a sparse representation of each image block in the scaled image dataset is determined. As explained previously with reference to act 306 of method 300, act 706 involves first separating the scaled image data into a plurality of image blocks, and applying a sparse coding step to each image block. In various cases, the size of the image blocks may be 21×21 or 25×25. In various cases, the sparse coding step can be performed using method 900a of FIG. 9A, in accordance with the teachings previously described herein. Using method 900a in conjunction with the technique described herein allows the detector to be scale invariant. However, in cases where the SCK detector is an SRI detector (e.g., scale and rotational invariant SCK), an extended dictionary (ED) is used to generate the sparse representation of each image block. In particular, the extended dictionary (ED) originates from a combination of the dictionary (D) described herein, and multiple rotated versions of the dictionary atoms.

Figure 9B:
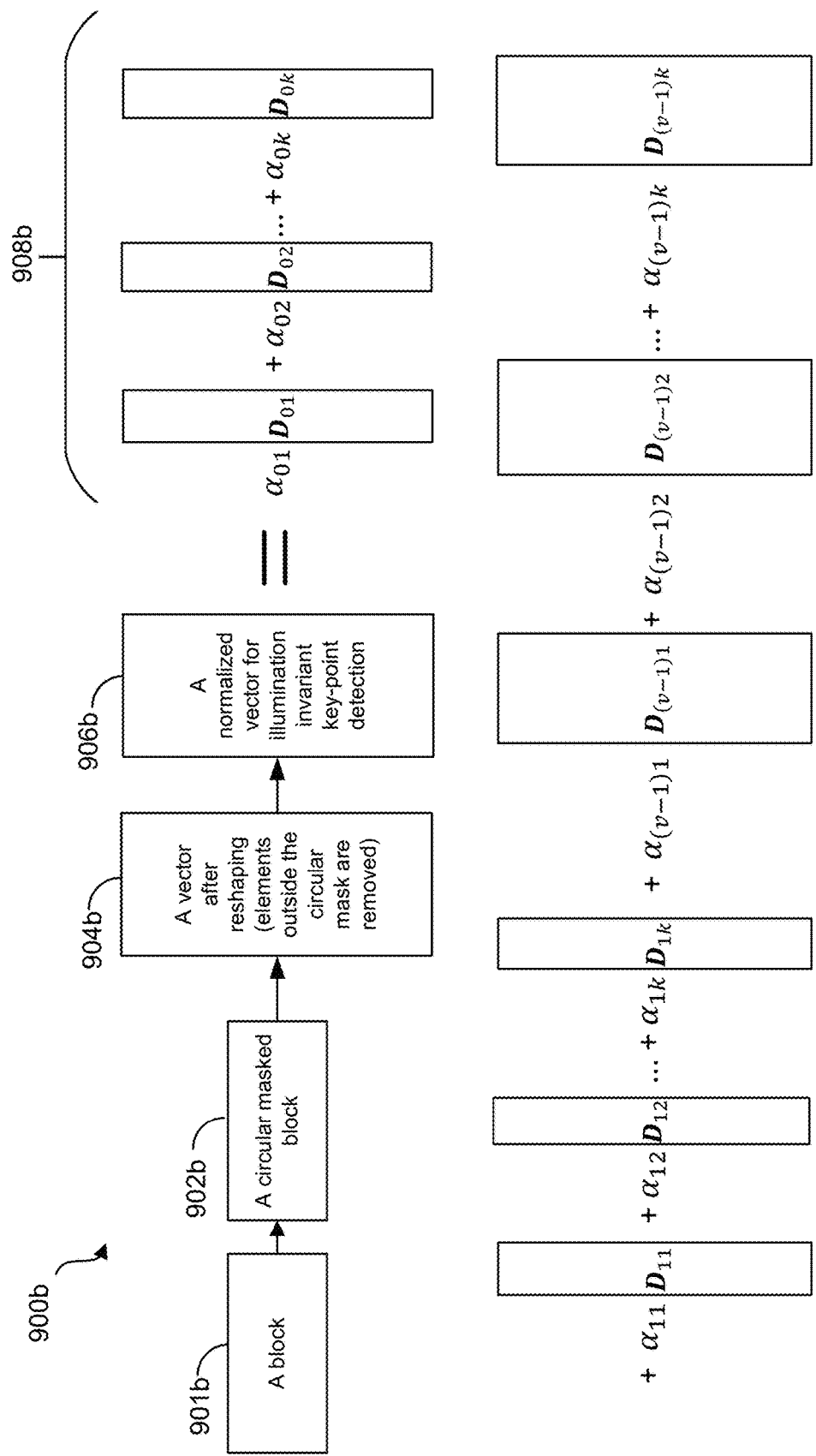
FIG. 9B illustrates an example embodiment of a sparse coding method which is used in an SRI-SCK detector, in accordance with the teachings herein.

FIG. 9B shows an example embodiment 900b for performing the sparse coding step in act 706 using an extended dictionary.

As shown, at act 902b, for each image block 901b (e.g., image block X), a circular mask is applied to generate a circular masked block Y. Circular masking of an image block is performed by changing elements of the block to zero when the elements are outside a circle whose center is positioned at the center of the block. In various cases, the radius of the circular mask may be defined as n/2 or (n/2)±1, wherein "n" is a pre-determined variable. In one example embodiment, "n" may be selected to be n=21 or n=25. In some cases, 'n' may be related to the size of the image block.

At act 904b, similar to act 902a of method 900a, each masked block Y of size n by n is re-shaped into a lexicographic order of a vector Y' of size $n^2$ by 1, then the values (or elements) outside of the circular mask are removed. In at least some cases, the masked block Y can be reshaped, but values (or elements) outside of the circular mask may not be removed.

At act 906b, the vector Y' can be normalized to a unit amplitude to generate a normalized vector $Y_{norm}'$ for the masked image block. In particular, $Y_{norm}'$ is a zero mean, unit amplitude normalized version of vector Y after being reshaped into vector Y'. In cases where values (elements) outside of the circular mask are removed at act 904b, the normalization is performed on all elements in the masked image block. In cases where values (elements) outside of the circular mask were not removed at act 904b, normalization is performed to only the elements located inside the circular mask (elements outside the circular mask remain zeros after the normalization). As expressed in equation (18), the normalization can be performed using zero mean-unit amplitude normalization, in which the mean of the vector Y' is subtracted from the vector Y'.

$$Y'_{norm} = \frac{Y' - \mu_Y}{\|Y' - \mu_Y\|} \tag{18}$$

where $\mu_Y$ is the mean vector of pixel intensities inside the Y'. Equation (18) demonstrates that the normalization for the case that elements outside the mask of the image block are removed.

In other embodiments, the normalization can be performed using other techniques, including min-max normalization, or a zero mean-unit variance. In particular, in a min-max normalization, it would not be necessary to subtract the mean of the vector Y' from the vector Y'. As discussed previously with respect to act 904a of method 900a, the normalization of the masked image block can be performed before, or after, reshaping the masked image block into a vector.

At act 908b, the sparse representation of the masked image block can be determined by solving the optimization problem of equations (19a) or (19b). In particular, equation (19a) is analogous to equation (1a), however $X_{norm}'$ is substituted for $Y_{norm}'$ (e.g., the masked normalized vector).

$$\alpha = \mathrm{argmin}(\tfrac{1}{2}\|Y_{norm}' - ED\alpha\|_{l2}^2 + \lambda\|\alpha\|_{l1}) \tag{19a}$$

$$\alpha = \mathrm{argmin}(\|Y_{norm}' - ED\alpha\|_{l2} + \lambda\|\alpha\|_{l1}) \tag{19b}$$

wherein ED is the extended dictionary. The sparse representation α can be represented as $\alpha = [\alpha_{01}, \alpha_{02}, \ldots, \alpha_{0k}, \ldots]'$. In some cases, the value of λ may be different between equations (19a) and (19b).

In various cases, equations (19a) or (19b) may be further modified to accommodate for the rotational invariant property of the key-point detection method. In particular, the optimization problem in equations (19a) or (19b) can be modified to include a norm-2 penalty term $\left(\frac{\lambda_2}{2}\|\alpha\|_{l2}^2\right)$, as expressed in equations (20a) or (20b):

$$\alpha = \operatorname{argmin}\left(\frac{1}{2}\left\|Y'_{norm} - ED\alpha\right\|_{l2}^2 + \lambda_1\|\alpha\|_{l1} + \frac{\lambda_2}{2}\|\alpha\|_{l2}^2\right) \quad (20a)$$

$$\alpha = \operatorname{argmin}\left(\left\|Y'_{norm} - ED\alpha\right\|_{l2} + \lambda_1\|\alpha\|_{l1} + \frac{\lambda_2}{2}\|\alpha\|_{l2}^2\right) \quad (20b)$$

In particular, it can be shown that when an image block X is rotated by an angle $\delta = u\beta$, $u \in Z$, wherein Z is an integer number, a solution of the revised equation is a new sparse representation $\alpha'$ in which the number and values of non-zero components are the same as $\alpha$, however the non-zero positions are shifted. Accordingly, with the sparse representation in equations (20a) or (20b), the number and values of non-zero components in the sparse representation are unchanged and accordingly the complexity measure (CM) and strength measure (SM) of the corresponding key-points are unaffected (e.g., because the CM, SM calculation is based on the values and number of non-zero components only, and not the positions of the non-zero components). This, in turn, indicates that the detector is rotational invariant. However, using only a norm-1 penalty term ($\lambda_1\|\alpha\|_{l1}$) (e.g., equations (19a) or (19b)), the optimization solver may find another solution, rather than the unique representation $\alpha'$ for the rotated block. Accordingly, by adding a norm-2 penalty in equations (20a) or (20b), the cost function becomes strictly convex, and the rotational invariance is more guaranteed.

Figure 9C:
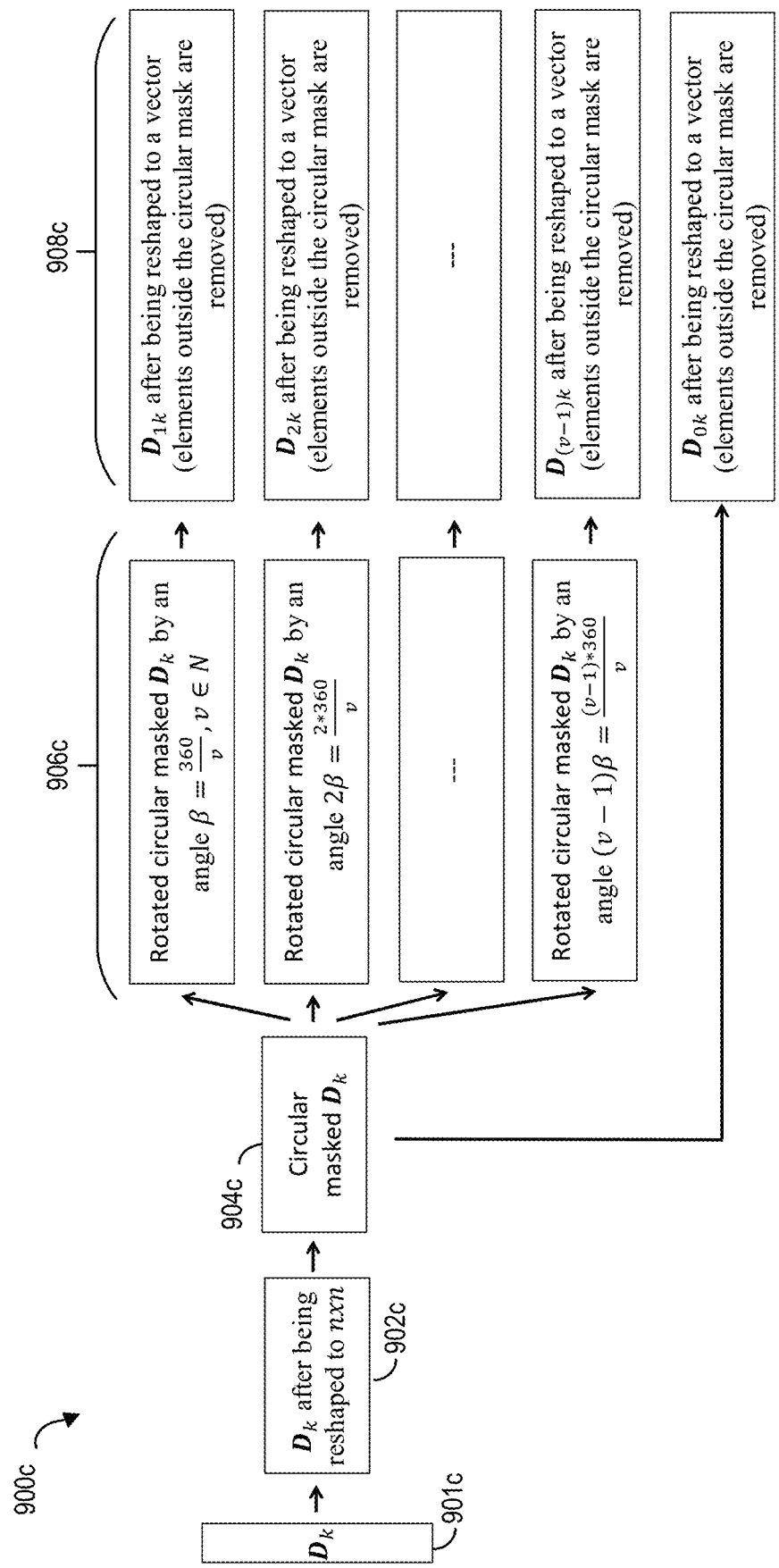
FIG. 9C illustrates an example embodiment for a process for generating an extended dictionary for use in the sparse coding method of FIG. 9B, in accordance with the teachings herein.
Figure 10A:
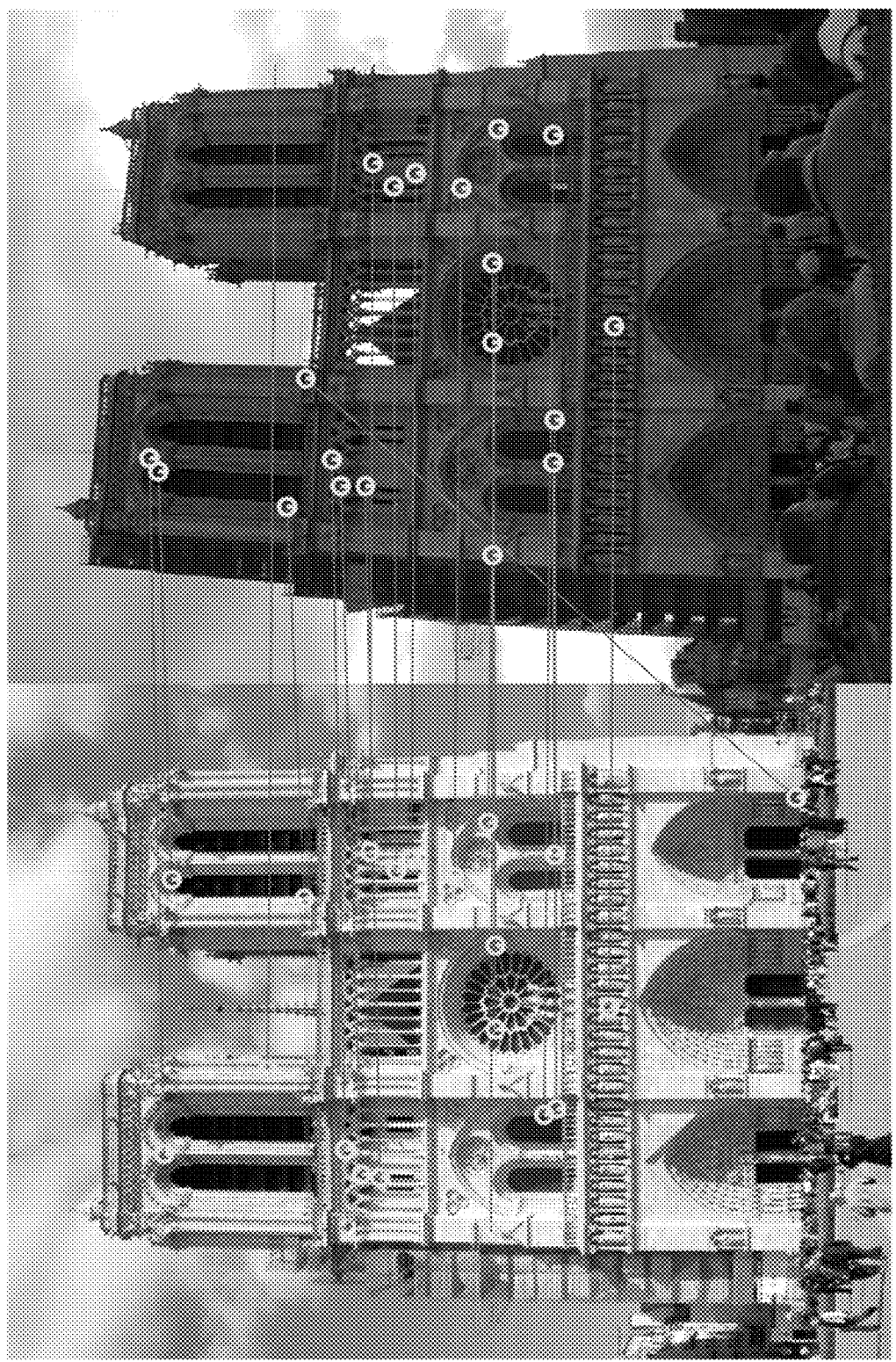
Figure 10B:
Figure 10C:
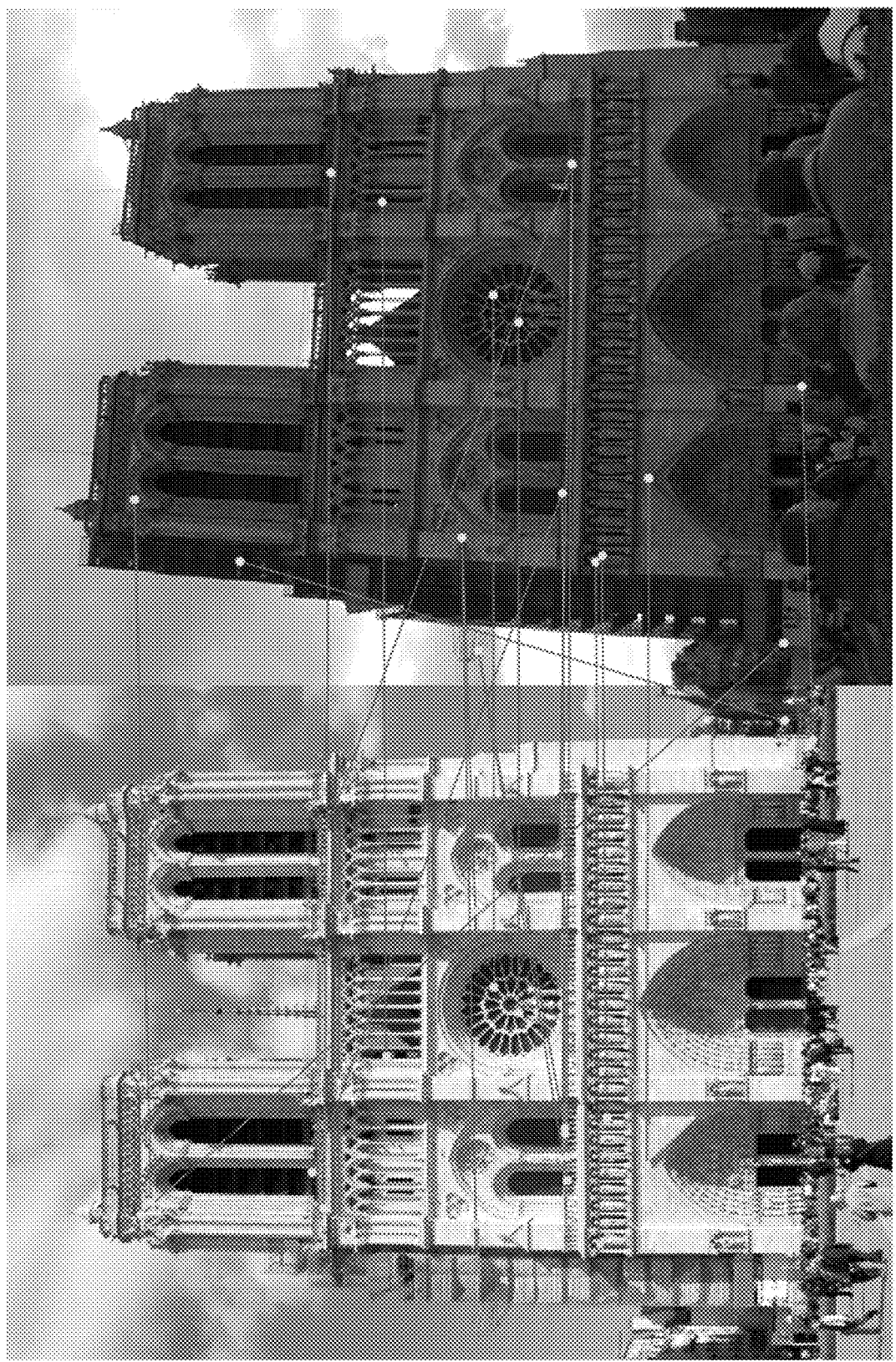

Referring now briefly to FIG. 9C, which illustrates an example embodiment for a method 900c for generating an extended dictionary (ED) using a dictionary (D). The extended dictionary (ED) generated by method 900c can be applied to either equation (19) or (20). Method 900c can be performed using system 100 of FIG. 1.

As shown, at act 902c, each atom of an original dictionary 901c ($D_k$) having a dimension $n^2 \times 1$ and k atoms is reshaped into a block of n×n (also referred to herein as an atom block). At act 904c, a circular mask is applied to each atom block to generate masked atom blocks. In various cases, the size of the circular mask is the same as the size of the circular mask applied to generate a circular masked block Y. In cases, where the values (e.g., elements) outside of mask of the circular masked block Y (act 904b) are removed, the elements outside of masks of the circular masked atom blocks are also removed. In cases where the values (e.g., elements) are not removed at act 904b, the elements outside of the masks of circular masked atom block may also not be removed.

At act 906c, each circular masked atom block is rotated one or more times, by an angle $\beta$, to generate one or more corresponding rotated atoms of the extended dictionaries. In particular, at act 906c, all of the circular masked atom blocks are rotated v times to generate v rotated versions of the atom, wherein v is a non-negative integer number. For example, all of the masked atom blocks in the original dictionary $D_k$ may be first rotated by an angle $$\beta = \frac{360}{v}, v \in N$$

to generate a first rotated version of the dictionary $D_{k1}$. The masked atom blocks may also be rotated by any angle $$2\beta = \frac{2*360}{v}, v \in N$$

to generate a second rotated version of the dictionary $D_{2k}$. Accordingly, the masked atom blocks may be rotated until the masked atom blocks are rotated by angle of $$(v-1)\beta = \frac{(v-1)*360}{v}, v \in N$$

to generate $D_{(v-1)k}$ rotated versions of the atoms $$\left(\text{e.g., } i\beta = \frac{i*360}{v}, v \in N, i:0 \to (v-1),\right.$$

to generate $D_{ik}$ rotations), wherein k=1 to K, where K are the number of atoms in the original dictionary. At act 908c, the original masked atom blocks (e.g., original masked dictionary ($D_{0k}$)) and the rotated version of the masked atom blocks (e.g., rotated version of the masked dictionary) are re-shaped into a vector, and elements outside of the circular mask are removed. The vectors of the rotated and original versions of each atoms are combined to generate the extended dictionary (ED), as expressed in equation (21):

$$ED = [D_{01}, D_{02}, \ldots D_{0k}; D_{11}, D_{12}, \ldots, D_{1k}; \ldots \\ D_{(v-1)1}, D_{(v-1)2}, \ldots, D_{(v-1)k}] \quad (21)$$

In some cases, where the original atoms of the dictionary (ED) are already rotationally symmetric with step $\beta$ (e.g., their circular masked versions become themselves when being rotated by an angle $\beta$), the rotated version of the atoms are not necessary to generate the extended dictionary (ED). In other words, If rotating an atom by a step $\beta$ creates a new atom completely the same as the original one, the atom is considered rotationally symmetric with step $\beta$. Accordingly, if the original dictionary includes only these atoms, the original dictionary can be used directly as the extended dictionary, without further rotation.

In some cases, every masked atom of ED using the same normalization technique used to normalize the masked block vector Y' (e.g., act 906b). In particular, this can done to increase performance and help the sparse coding algorithm converge faster.

Referring now back to FIG. 7, once the sparse representation of each image block is determined at act 706 in accordance with equations (19) or (20), at acts 708 and 710, the complexity measure (CM) of each image block of the scaled image is determined. In particular, acts 708 and 710 are analogous to act 308 of FIG. 3. For example, the complexity measure is determined by first by counting the number of all non-zero components in the sparse representation of each image block at act 708, and then determining the complexity measure (CM) at act 710 in accordance with equation (2).

At act 712, potential key-points in the scaled image are detected, based on which image blocks have a complexity measure (CM) that satisfy a specific range. Act 712 is analogous to act 310 of method 300.

At act 714, detected key-point strengths are determined based on a Strength Measure (SM). Act 714 is analogous to act 312 of method 300.

At act 716, non-maxima suppression is applied to key-points based on the strength measure (SM) determined at act 714. Act 716 is analogous to act 314 of method 300. In particular, applying non-maxima suppression allows determination of the locally strongest SRI-SCK key-points in the scaled image in pixel accuracy. In some embodiments, a low pass filter may also be applied to SM scaled image data to remove unstable peaks before applying non-maxima suppression to improve performance of the SRI-SCK method.

Figure 8:
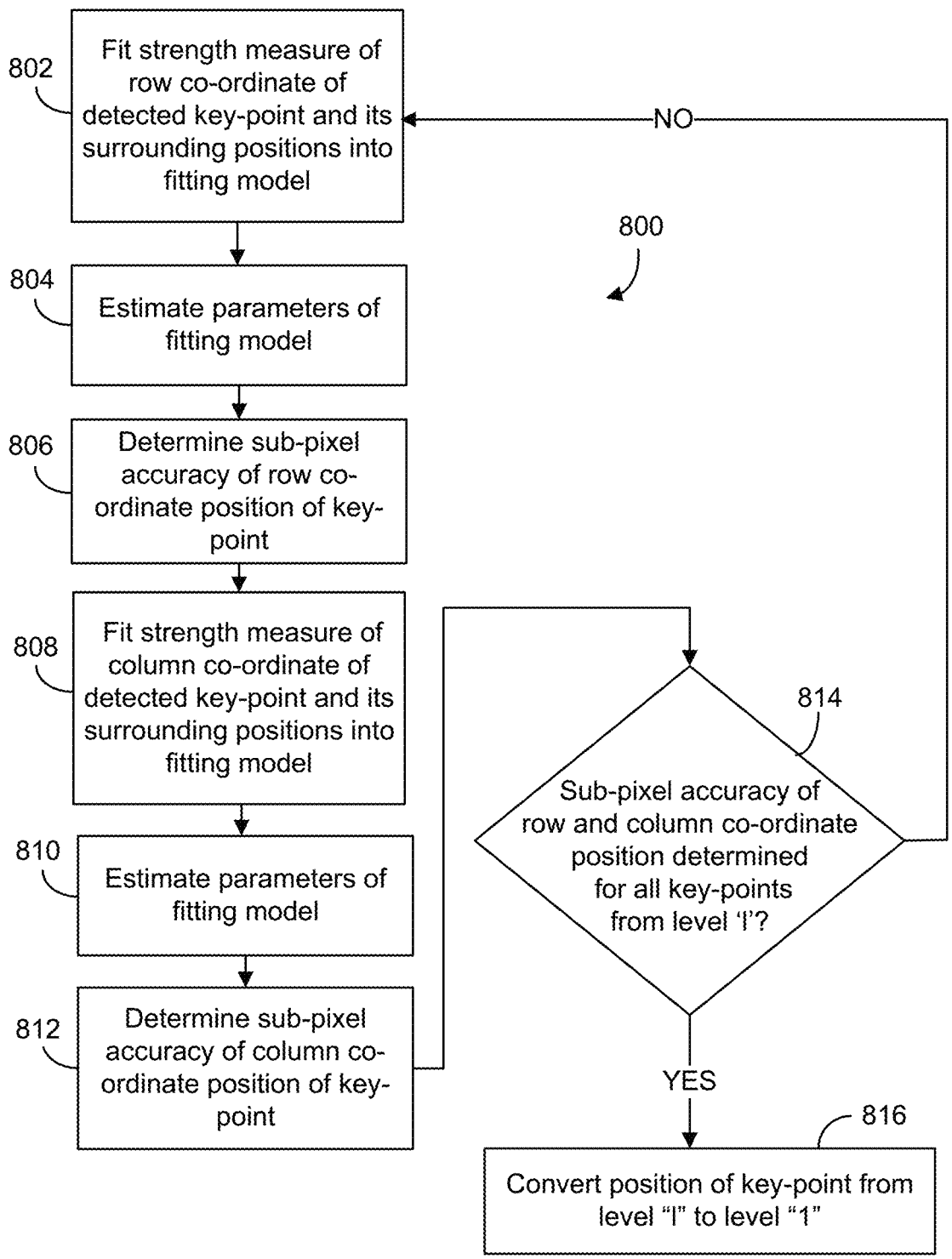
FIG. 8 illustrates an example embodiment of a method for sub-pixel accuracy estimation of a detected key-point position, in accordance with the teachings herein.

In at least some embodiments, after performing non-maxima suppression at act 716, at act 718, sub-pixel accuracy estimation is applied to each detected key-point (or local maxima) position in the scaled image data. In particular, sub-pixel accuracy estimation can be used to improve the performance of the key-point detector. FIG. 8 shows an example embodiment of a method 800 for performing sub-pixel accuracy estimation for a given key-point position. Method 800 can be performed by system 100 of FIG. 1.

As shown, at act 802, for each key-point row co-ordinate, the strength measure of the key-point is fit into a parabolic model, as expressed in equation (22).

$$SM = ax^2 + bx + c \quad (22)$$

wherein x is the row co-ordinate of the detected key-point in the local Cartesian coordinate system, wherein x=0 is at the center of the pixel accuracy of the detected key-point position, x=−1 is left of center pixel, and x=1 is right of center pixel. In other example cases, the fitting model may be any other suitable model, including any model used for sub-pixel estimation of local extrema, including a pyramid model [38].

At act 804, the constants (e.g., a, b and c) in equation (22) are resolved using the known strength measures at x=0 (e.g., the center of the pixel accuracy key-point position), x=−1 (e.g., left of center pixel), and x=1 (e.g., right of center pixel). In particular, at this stage, the key-points local co-ordinate system is used, rather than the co-ordinate system in the level 'I' scale image. More specifically, the key-point in its local coordinate system has coordinates as (0, 0). This coordinate system has the origin at the center of the corresponding pixel, and each key-point has its own coordinate system. In the level "I" coordinate system, the key-point has coordinates, for example, as $(x_{l(prior\ to\ sub-pixel\ estimation)} + 0.5, y_{l(prior\ to\ sub-pixel\ estimation)} + 0.5)$. The origin of the level "I" coordinate system is not the center of the pixel, but the top left of the first pixel in the level "I" image. In view of the foregoing, equations (23)-(25) form a solvable system of three linear equations based on the known strength measures of the key-point at $SM_{-1}$ (x=−1), $SM_0$ (x=0), and $SM_{+1}$ (x=1).

$$SM_{-1} = a - b + c \quad (23)$$

$$SM_0 = c \quad (24)$$

$$SM_{+1} = a + b + c \quad (25)$$

At act 806, based on the constant values determined at act 804, the row co-ordinate of the maxima is located at the point where the derivative of the parabola of equation (22) is equal to zero. The maxima defines the sub-pixel position of the row co-ordinate of the key-point. In particular, the derivative of the parabolic equation (22) can be expressed according to equation (26).

$$x = -\frac{b}{2a} = \frac{SM_{+1} + SM_{-1}}{4SM_0 - 2(SM_{+1} + SM_{-1})} \quad (26)$$

The row co-ordinate determined in equation (26) is then converted from the key-point co-ordinate system, into the level "I" co-ordinate system. For example, this can be determined by the equation $x_{l\ co-ordinate} = x_{l\ (prior\ to\ sub-pixel\ estimation)} + 0.5 + x$, wherein $x_{l\ co-ordinate}$ is the sub-pixel row co-ordinate position of the key-point in the level "I" co-ordinate system, $x_{l\ (prior\ to\ sub-pixel\ estimation)}$ is the row co-ordinate position of the key-point in the level "I" co-ordinate system (i.e., prior to performing sub-pixel estimation), and x is the sub-pixel row co-ordinate position of the key-point after sub-pixel estimation in the key-point's local co-ordinate system (i.e., as determined by equation (26)). In other cases, any other appropriate constant (i.e., "0.5") can be used, based on the particular level "I" co-ordinate system.

At acts 808-812, acts 802-806 are repeated likewise to resolve the sub-pixel position of the column co-ordinate for a given detected key-point. In particular, at act 808, for each key-point column co-ordinate, the strength measure (SM) of the key-point, and its nearby points, is fit into a parabolic model (or other suitable models), as expressed in equation (27).

$$SM = ay^2 + by + c \quad (27)$$

wherein y is the column co-ordinate in the local Cartesian coordinate systems of the key-point, and y=0 is at the center of the pixel accuracy key-point position, y=−1 is below the center pixel, and y=1 is above the center pixel (i.e., as determined in the key-points local co-ordinate system).

At act 810, the constants (e.g., a, b and c) in equation (27) are resolved using the known strength measures at y=0 (e.g., the center of the pixel accuracy key-point position), y=−1 (e.g., left of center pixel), and y=1 (e.g., right of center pixel). In particular, equations (28)-(30) form a solvable system of three linear equations based on the known strength measures of the key-point at $SM_{-1}$ (y=−1), $SM_0$ (y=0), and $SM_{+1}$ (y=1).

$$SM_{-1} = a - b + c \quad (28)$$

$$SM_0 = c \quad (29)$$

$$SM_{+1} = a + b + c \quad (30)$$

At act 812, based on the constant values determined at act 810, the column co-ordinate of the maxima, or the key-point in sub-pixel accuracy, is then located at the point where the derivative of the parabola of equation (27) is equal to zero. In particular, the derivative of the parabolic equation (27) can be expressed according to equation (31).

$$y = -\frac{b}{2a} = \frac{SM_{+1} + SM_{-1}}{4SM_0 - 2(SM_{+1} + SM_{-1})} \quad (31)$$

The column co-ordinate determined in equation (31) is then converted from the key-point co-ordinate system, into the level "I" co-ordinate system. For example, this can be determined by $y_{l\ co-ordinate} = y_{l\ (prior\ to\ sub-pixel\ estimation)} + 0.5 + y$, wherein $y_{l\ co-ordinate}$ is the sub-pixel column co-ordinate position of the key-point in the level "I" co-ordinate system, $y_{l\ (prior\ to\ sub-pixel\ estimation)}$ is the column co-ordinate position of the key-point in the level "I" co-ordinate system (prior to performing sub-pixel estimation), and y is the sub-pixel column co-ordinate position of the key-point after sub-pixel estimation in the key-points local co-ordinate system (i.e., as determined by equation (31)). In other cases, any other appropriate constant (i.e., "0.5") can be used, based on the particular level "l" co-ordinate system.

At act 814, it can be determined whether the sub-pixel accuracy of the row and column co-ordinate position has been determined for all key-points in the level "l" scaled image. If not, acts 802-812 can be repeated for all remaining key-points. Otherwise, if the row and column co-ordinates has been determined for all key-points, then at act 816, the estimated sub-pixel accuracy positions for each key-point (e.g., column and row co-ordinates) is converted from the current image scale level (e.g., level "l" scale of the image pyramid) to the co-ordinate system of the original base image (e.g., first scale level of the image pyramid). In one example, the estimate sub-pixel accuracy for each key point is converted into the co-ordinate system of the original base image in accordance with equations (32a) (row co-ordinate (x)) and equation (32b) (column co-ordinate (y)).

$$x_1 = (x_{l\,co-ordinate} - 0.5) * \left(\frac{1}{\text{Scale Factor}}\right)^{l-1} + 0.5 \quad (32a)$$

$$y_1 = (y_{l\,co-ordinate} - 0.5) * \left(\frac{1}{\text{Scale Factor}}\right)^{l-1} + 0.5 \quad (32b)$$

wherein $x_1$ is the row co-ordinate of a given key-point converted in the base image scale, $x_l$ is the row co-ordinate of a given key-point in the level "l" scale image, y, is the column co-ordinate of a given key-point converted in the base image scale, and $y_l$ is the column co-ordinate of a given key-point in the level "l" scale image, and the 'scale factor' is the scale factor used to generate the image pyramid. In particular, the inclusion of the '0.5' constant in equations (32a) and (32b) results from the fact that $x_l$, $y_l$ are counted from the center of pixels in the image. More specifically, the image starts from pixel (0.5+sub-pixel estimation, 0.5+sub-pixel estimation) rather than (0.0+sub-pixel estimation, 0.0+sub-pixel estimation) when sub-pixel estimation is performed. In other cases, equations (32a) and (32b) may not include a '0.5' constant, as shown in equations (33a) and (33b). For example, this may be the case where no sub-pixel estimation is performed, and accordingly, the image pixel can start from (0,0) or (1,1) depending on the programming language.

$$x_1 = (x_{l\,co-ordinate}) * \left(\frac{1}{\text{Scale Factor}}\right)^{l-1} \quad (33a)$$

$$y_1 = (y_{l\,co-ordinate}) * \left(\frac{1}{\text{Scale Factor}}\right)^{l-1} \quad (33b)$$

The conversion formulas in equations (32) or (33) are non-limiting and many other numerous variations can be introduced into the conversion formulas (e.g., constants or variables).

It will be appreciated that the method for determining sub-pixel accuracy for key-points may also be applied to the SCK methods in FIGS. 3 and 4. For example, sub-pixel accuracy estimation can be performed after act 314 of method 300 or act 412 of method 400. In these cases, however, act 816 may be omitted as no image pyramid is generated in the SCK method.

Referring now back to FIG. 7, once the estimated sub-pixel accuracy position is determined for each key-point at act 718, and the pixel accuracy position is converted into the first level co-ordinate system (e.g., act 816 of method 800), at act 720, the size and scale of each detected key-point is determined. In particular, the size of each detected key-point can be determined according to equation (34).

$$S_l = \frac{s_1}{(sf)^{l-1}} \quad (34)$$

wherein $s_l$ is the size of a key-point in the scaled image (e.g., at level 1 of the image pyramid), sf is the scale factor used for the construction of the image pyramid, and $s_1$ is the size of the key-point with respect to the original image scale (e.g., level 1 of the image pyramid). In particular, the size of the key-point can be used for calculating a repeatability metric.

While $s_1$ in equation (34) can be determined using equation (3), in higher image pyramid levels, the key-point size can become unexpectedly large, which can result in random repetition between multiple key-points. Accordingly, to account for this situation, in some embodiments, a smaller $s_1$ value can be used in equation (34), in accordance with equation (35).

$$s_1 = \frac{\sqrt{2} \cdot n}{4} \quad (35)$$

Other constant values (e.g., besides √2/4) can also be used in equation (35).

The scale of detected key-points, for descriptor calculations, can be determined in accordance with equation (36).

$$\text{Scale of a key-point in level 1} = \sigma_l = \frac{s_l}{\sqrt{2}} = \frac{s_l}{\sqrt{2}\,(sf)^{l-1}} \quad (36)$$

wherein $s_l$ is the size of the key-point detected at an image scale at level "l" of the image pyramid. In other cases, other constants (e.g., besides √2) can be used in equation (34). In particular, the factor square root of 2 is selected based on an observation that relation between the radius of a binary disk and the scale that a Laplacian of Gaussian gives the highest response to the disk.

As nearby pixels in higher levels of the image pyramid are interpolated from highly overlapped neighborhoods, the blocks in higher levels tend to be flat, and the SMs of key-points in these levels are expected to be smaller than those in lower levels. More particularly, in higher levels of the image pyramid, the interpolation of different pixels in the block tends to be calculated from overlapped regions in the original image. If these overlapped regions are large, then there is high chance that pixels in the block are very similar to each other (e.g., flat), leading to lower SMs of key-points in higher levels, and thus key-points at lower levels may be favored by the techniques. Accordingly, selection of key-points and their associated characteristic sizes/scales across pyramid levels based on comparing the SM (equations (4a) or (4b)) may make the detector favor key-points at lower levels. Accordingly, at act 722, in some embodiment, a scale normalization function "H" is applied on the SM of a level "l" scale image in accordance with equation (37) to compensate for this potential bias.

$$\text{Scale-normalized-SM} = H(l, sf, SM) \quad (37)$$

In other cases, SM=H(l,sf,SM) may be used.

At act 724, the list of detected key-points for the level "l" scaled image is generated, along with calculated sizes/scales, scale normalize strength measures and sub-pixel accuracy positions for scale "l" representations.

Method 700 is repeated for each level of the image pyramid (e.g., each scaled image generated at act 506 of method 500) to generate a global list of detected key-points for all image scale representations.

It will be appreciated that, in other embodiments, method 700 in FIG. 7 can be performed on only the input image, or otherwise, a magnified version of the input image, or a single scale image (e.g., at the bottom of the image pyramid), without first generating an image pyramid (act 504 in method 500) or otherwise iterating the method 700 on all levels of the image pyramid (act 506 of method 500). In other words, method 700 can be performed by iterating on an image pyramid having only the base level, and no further pyramid levels. In various cases, this allows achieving a rotational invariant SCK detector which is not otherwise scale invariant.

Referring now back to FIG. 5, once multiple key-point lists for all scale representation of the base image are generated at act 506 and converted into the co-ordinate system of the base image level at act 508, suppression of overlapped detections of key-points across multiple image scales is performed at act 510. In particular, at act 510, after converting all key-point positions to coordinates of the first level in the image pyramid (e.g., act 508), a key-point "A" with scale $\sigma_1$ can be suppressed if the strength measure (SM) of "A" at level "l" is not the highest one compared with any key-points which share a sufficiently large ratio of overlapped area with "A" (including "A" with different sizes/scales). For example, a key-point "A" can be suppressed if its SM is not the highest one compared with any key-point which has an overlap ratio with key-point "A" of greater than a threshold i.e. 0.3. In other example cases, the threshold can be set higher or lower than 0.3. In particular, the overlap ratio between two key-points "A" and "B" may be defined as the ratio between the intersection area ("A" and "B") and the union area ("A" or "B"). Accordingly, this may remove less distinctive key-point positions, as well as non-representative sizes/scales of key-points across the image pyramid. Accordingly, surviving key-points can be considered the most reliable key-points for succeeding steps like descriptor calculation or matching. Further, any survived scales/sizes associated with the key-points are selected as their characteristic scales/sizes.

At act 512, based on the suppression performed at act 508, a more finalized list of key-points is generated with positions, sizes/scales and scale-normalize strength measures.

At act 514, in some embodiments, the top N-key-points are selected, based on the descending of the scale-normalized strength measure. For example, the top N key-points selected may be the top 1000 key-points.

Illumination Invariant Property of the SRI-SCK

The SRI-SCK detector demonstrates robustness against significant changes in illumination. This is because for each block X=X(x,y,l), the input to the sparse coding algorithm is not its original, but the normalized version $Y_{norm}'$ of its circular masked version Y after being reshaped to a vector Y' (see equation (18)).

As explained previously, in computer vision, the effect of illumination change in image pixels can be modeled based on the following two assumptions (e.g., the affine intensity change model):

1. Each pixel intensity $I$ changes to a/+b (a>0: multiplicative, and b: additional effects of light) under illumination change.
2. The light effects in a small neighborhood are uniform.

Supposing that the supporting neighborhood in the original image for interpolation of the block X satisfies the aforementioned two assumptions and nearest neighbor interpolation method is used, under different lighting conditions, the block X after change could be modeled as aX+b. The circular mask version Y after change then becomes aY+b, however, the input of the sparse coding step, remains unchanged as shown in equation (38).

$$\frac{(aY' + b) - (a\mu_Y + b)}{\|(aY' + b) - (a\mu_Y + b)\|} = \frac{Y' - \mu_Y}{\|Y' - \mu_Y\|} = Y_{norm}' \quad (38)$$

As the input is the same, the CM and SM are thus unaffected under affine intensity change. This explains the robustness of SRI-SCK under illumination variations. In practice, good results could also be generated by different interpolation method such as a bi-cubic interpolation.

Rotational Invariant Property of the SRI-SCK Detector

To make the SRI-SCK detector rotational invariant, the extended dictionary is used which allows for the complexity measure (CM) and the strength measure (SM) of a circular masked block to be invariant with rotation of the block. As explained previously, the extended dictionary is generated by combining the original circular masked atoms and their rotated versions. This approach requires only one round of sparse coding for each point and the current structure of SCK can be re-used.

As also explained previously, if the current dictionary of SRI-SCK (all atoms are circular masked, elements outside the mask are removed) is expressed as D=[$D_{01}$, ..., $D_{0k}$], then the dictionary for SRI-SCK can be expressed according to equation (39):

$$ED = [D_{01}, \ldots, D_{0k}, \ldots, D_{(v-1)1}, \ldots, D_{(v-1)k}] \quad (39)$$

wherein $D_{ij}$=Rot($D_{(i-1)j}$,β)=Rot($D_{0j}$, iβ). In other words, $D_{ij}$ is the rotated version of $D_{(i-1)j}$ by an angle $$\beta = \frac{360}{v},$$

or rotated version of $D_{0j}$ by an angle $$i\beta = \frac{i360}{v}.$$

Meanwhile, $D_{0j}$ is the rotated version of $D_{(v-1)j}$ by the angle β.

Assuming that before the rotation of a circular masked block Y, there is a solution α for equation (1a) in accordance with equation (40):

$$\alpha = \operatorname{argmin}\left(\frac{1}{2}\|Y'_{norm} - [D_{01}, \ldots, D_{0k}, \ldots, D_{m1}, \ldots, D_{mk}]\alpha\|_{l2}^2 + \lambda_1\|\alpha\|_{l1} + \frac{\lambda_2}{2}\|\alpha\|_{l2}^2\right) \quad (40)$$

where $m=v-1$. In other words, with a sparse representation $\alpha=[\alpha_{01}, \ldots, \alpha_{0k}, \ldots, \alpha_{m1}, \ldots, \alpha_{mk}]^T$, the cost function in the optimization problem achieves the minimum, in accordance with equation (41).

$$s = \frac{1}{2}\|Y'_{norm} - [D_{01}, \ldots, D_{0k}, \ldots, D_{m1}, \ldots, D_{mk}]\alpha\|_{l2}^2 + \lambda_1\|\alpha\|_{l1} + \frac{\lambda_2}{2}\|\alpha\|_{l2}^2 = s_{min} \quad (41)$$

For an arbitrary point in $Y_{norm}'$, equation (42) is generated:

$$I(\rho,\beta_0) = \alpha_{01}I_{01}(\rho,\beta_0) + \ldots + \alpha_{0k}I_{0k}(\rho,\beta_0) + \ldots + \alpha_{m1}I_{m1}(\rho,\beta_0) + \ldots + \alpha_{mk}I_{mk}(\rho,\beta_0) + e \quad (42)$$

where $(\rho,\beta_0)$ are the radial and angular coordinates of the point and the atoms when $Y_{norm}'$ and the dictionary atoms are represented in circular forms, e is the reconstruction error of the point. The reconstruction error remains the same for this point, if the circular masked input block and the dictionary atoms are rotated by the same angle $u\beta$ (u is an integer). Account for the rotation by angle $u\beta$, equation (43) is generated.

$$I(\rho,\beta_0+u\beta) = \alpha_{01}I_{01}(\rho,\beta_0+u\beta) + \ldots + \alpha_{0k}I_{0k}(\rho,\beta_0+u\beta) + \ldots + \alpha_{m1}I_{m1}(\rho,\beta_0+u\beta) + \ldots + \alpha_{mk}I_{mk}(\rho,\beta_0+u\beta) + e \quad (43)$$

The second portion of equation (43) can be re-written into equation (44).

$$I(\rho, \beta_0 + u\beta) = \alpha_{01}I_{u1}(\rho, \beta_0) + \ldots + \alpha_{0k}I_{uk}(\rho, \beta_0) + \ldots + \alpha_{m1}I_{(m+u)1}(\rho, \beta_0) + \ldots + \alpha_{mk}I_{(m+u)k}(\rho, \beta_0) + e$$

$$= \alpha_{01}I_{u1}(\rho, \beta_0) + \ldots + \alpha_{0k}I_{uk}(\rho, \beta_0) + \ldots + \alpha_{m1}I_{(v-1+u+1-1)1}(\rho, \beta_0) + \ldots + \alpha_{mk}I_{(v-1+u+1-1)k}(\rho, \beta_0) + e$$

$$= \alpha_{01}I_{u1}(\rho, \beta_0) + \ldots + \alpha_{0k}I_{uk}(\rho, \beta_0) + \ldots + \alpha_{m1}I_{(u-1)1}(\rho, \beta_0) + \ldots + \alpha_{mk}I_{(u-1)k}(\rho, \beta_0) + e \quad (44)$$

From equation (44), it can be observed that for a block rotated by an angle $u\beta$, if a circular shift is performed of the components of $\alpha$ (found before the rotation) by u units (atom wise), there is new representation $\alpha'$ maintaining the same reconstruction error as before the rotation of the block. As no change occurs in the number of non-zero components and their values, the cost function remains the minimum $s_{min}$. The cost function in equation (41) is strictly convex, so $\alpha'$ is the unique sparse representation for the rotated block. Further, $\alpha'$ and $\alpha$ have the same numbers of non-zero components which have changes in positions but not in values. Hence, the complexity measure (CM) and the strength measure (SM) of the block are unaffected. In other words, the detector is invariant with rotation of the block.

Experimental Results for SRI-SCK Detector

The SRI-SCK detector is evaluated using the Webcam [7], and EF [19] public datasets, as well as a VGG data set [33]. The VGG dataset [33] includes eight sequences of images, each sequence having six images which feature different levels of change in blur, viewpoint, scale, rotation, lighting and JPEG compression.

Table 5, below, shows different settings used for evaluating SRI-SCK. The different settings involve using different image block sizes, as well as different norm-1 and norm-2 penalties in equation (20). Accordingly, these settings can be used to provide perspective on the performance of SRI-SCK with different parameter sets.

TABLE 5

Configurations for Various Scale Invariant Detectors

| Name | Dictionary | Block Size | $\lambda_1, \lambda_2$ |
| --- | --- | --- | --- |
| SRI-SCK-1 | Ext-DCT-2 | 21 × 21 | 0.125, 0.375 |
| SRI-SCK-2 | Ext-DCT-2 | 25 × 25 | 0.0625, 0.1875 |

Figure 20:
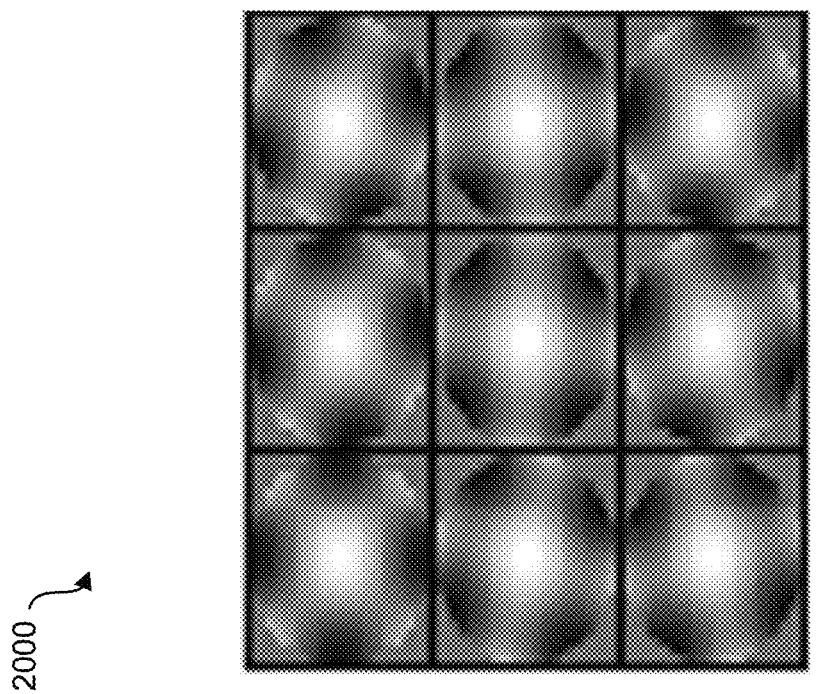
FIG. 20 is an example visual representation of an extended dictionary for scale and rotational invariant key-point detection.

FIG. 20 shows an example re-sized visualization of the "Ext-DCT-2" dictionary 2000 expressed in Table 5. The "Ext-DCT-2" is an extended dictionary which is created from a diagonal atom in a Discrete Cosine Transform (DCT)-2 basis [34], [35]. It can be observed in FIG. 20 that a circular masked version of the atom (e.g., top left image) is rotationally symmetric with a step 90° (e.g., the atom becomes itself after being rotated 90°), such that only 8 times of rotation, with 10 degrees per rotation time, is sufficient to create the "Ext-DCT-2" dictionary covering 360 degree rotation. Since there are only a few atoms in "Ext-DCT-2", no upper and lower limit are set for the SRI-SCK. Additionally, as random matching of key-points may occur if a large number of key-points are used, 1000 key-points/image, and a scale factor of 0.8 is used.

FIGS. 21-23 show various image pairs and detected key-points plotted on top of the images using an SRI-SCK detector. In particular, these images provide qualitative results demonstrating the improved performance of the SRI-SCK detector in comparison to other detectors.

In each image pair in FIGS. 21-23, twenty potential best matches (key-points and their correspondences) are displayed on the image. The matches are calculated with the matching code [24]. The matching of key-points is performed with a SIFT descriptor and Euclidean distance. In the matching scheme, two key-points a, b in a pair of images are considered matched if the Euclidean distance between two corresponding descriptors $D_a$ and $D_b$ multiplied by a threshold (1.5) is less than the distance of $D_a$ to other descriptors of other candidate matching points [3].

Figure 21A:
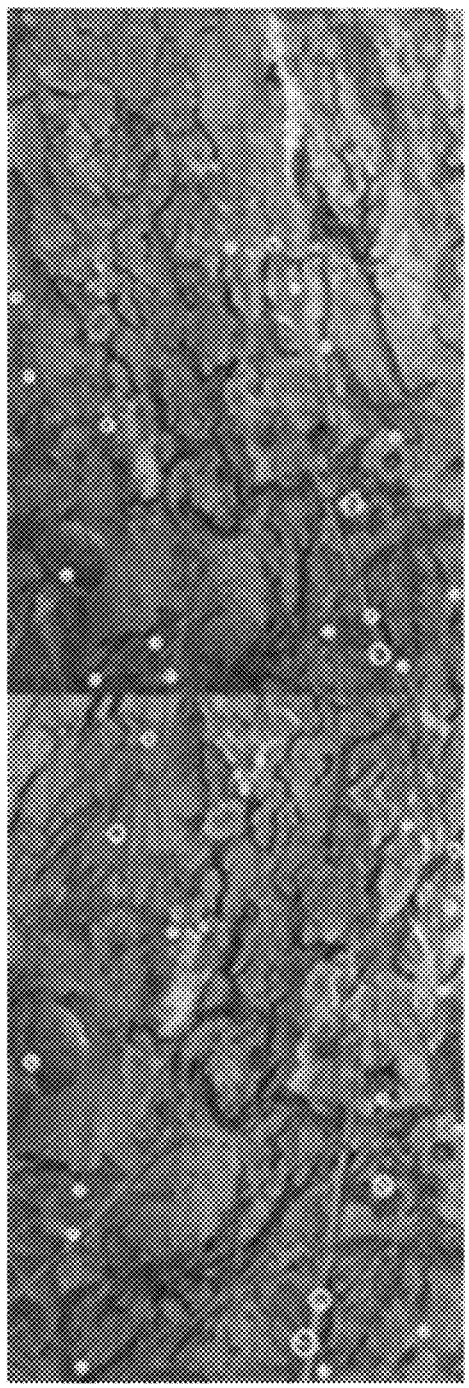
FIGS. 21A, 21B, 21C and 21D illustrate examples of detecting and matching key-points in images from a dataset using an SRI-SCK detector (in accordance with the teachings herein), a SIFT detector, a Harris detector, and a SFOP detector, respectively, where the SIFT descriptor is used.
Figure 21B:
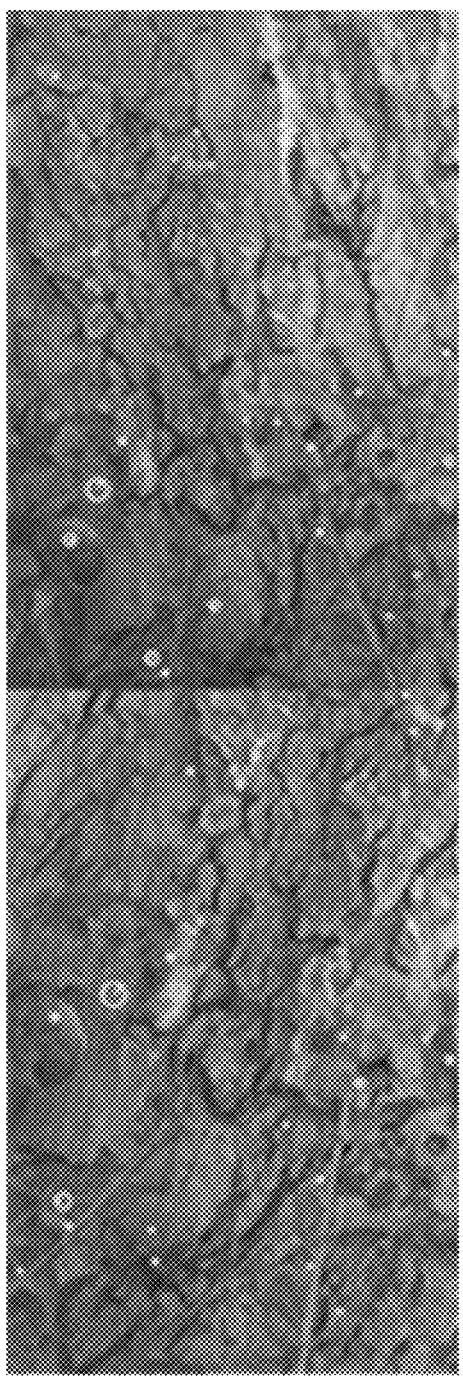
Figure 21C:
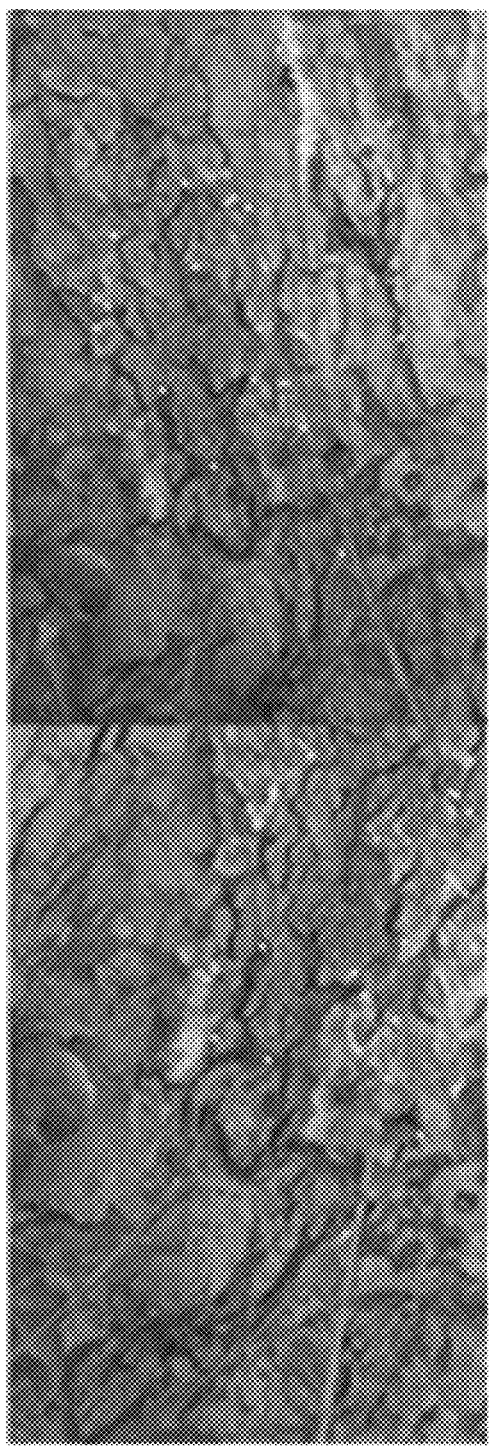
Figure 21D:
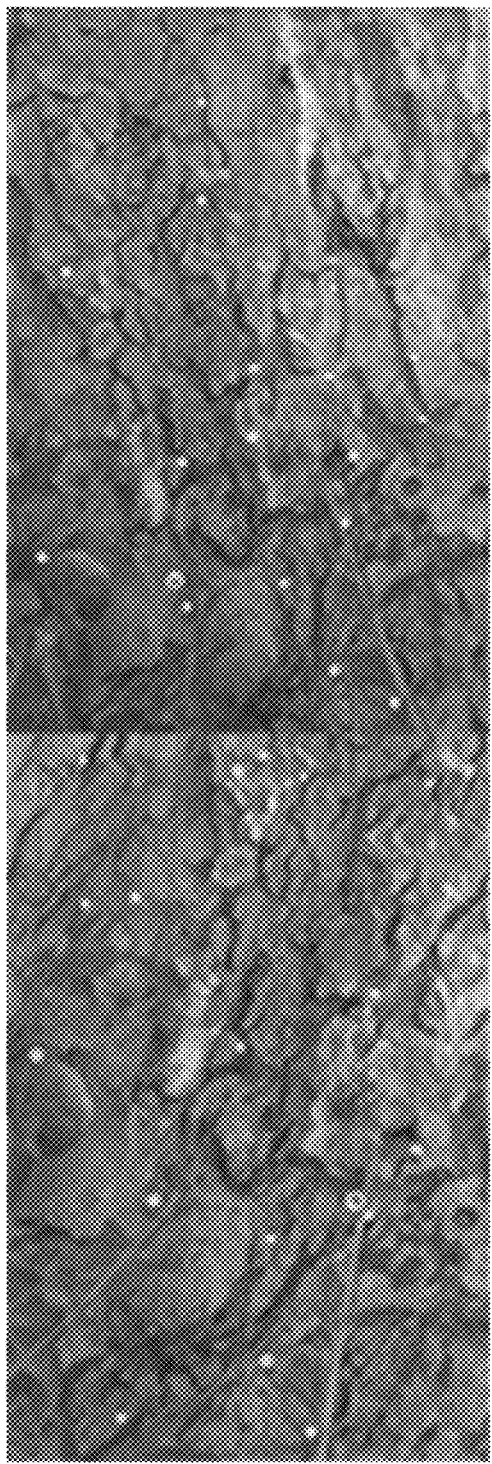
Figure 22C:

Referring first to FIGS. 21A-21D, which show images pairs from a VGG dataset featuring changes in scale and rotation and illustrating example detection and matching of key-points. In particular, FIG. 21A shows an image pair 2100a for an example detection and matching of key-points using an SRI-SCK detector and a SIFT descriptor. FIG. 21B shows an image pair 2100b for an example detection and matching of key-points using an SIFT detector and a SIFT descriptor. FIG. 21C shows an image pair 2100c for an example detection and matching of key-points using a Harris detector and a SIFT descriptor. FIG. 21D shows an image pair 2100d for an example detection and matching of key-points using a SFOP detector and a SIFT descriptor.

As shown in FIG. 21A, although some spurious matches exist, 18 correct matches are detected using the SRI-SCK detector. On the other hand, in FIGS. 21B-21D, when the experimental procedure is repeated with SIFT (FIG. 21B), Harris (FIG. 21C) and SFOP (FIG. 21D) detectors, worse matching results are received with around 11, 13, 11 correct matches demonstrated, respectively. Further, the matched images in FIGS. 21B-21D have drastic changes in scale and rotation.

FIGS. 22A-22D show images pairs 2200a, 2200b, 2200c and 2300d, respectively, from an EF dataset featuring changes in illumination and scale, and illustrating example detection and matching of key-points using an SRI-SCK (FIG. 22A), SIFT (FIG. 22B), Harris (FIG. 22C) and SFOP (FIG. 22D) detectors using SIFT descriptors.

Figure 22D:

As shown in FIGS. 22A-22D, similar trends are observed when performing the SRI-SCK technique on pairs of images from an EF dataset which feature variations in illumination and scale. In particular, as shown, 16 visual correct matches are generated by the SRI-SCK (FIG. 22A), followed by 6 correct matches using SIFT (FIG. 22B), 6 correct matches using SFOP (FIG. 22C), and 4 correct matches using Harris (FIG. 22D). From these images, it can be seen that SRI-SCK can outperform its counterparts even with significant difference of lighting conditions of imaging.

FIGS. 23A-23D show further images pairs 2300a, 2300b, 2300c and 2300d, respectively, from an EF dataset featuring changes in illumination and scale, and illustrating example detection and matching of key-points using an SRI-SCK (FIG. 23A), SIFT (FIG. 23B), Harris (FIG. 23C) and SFOP (FIG. 23D) detectors using SIFT descriptors.

Figure 23C:
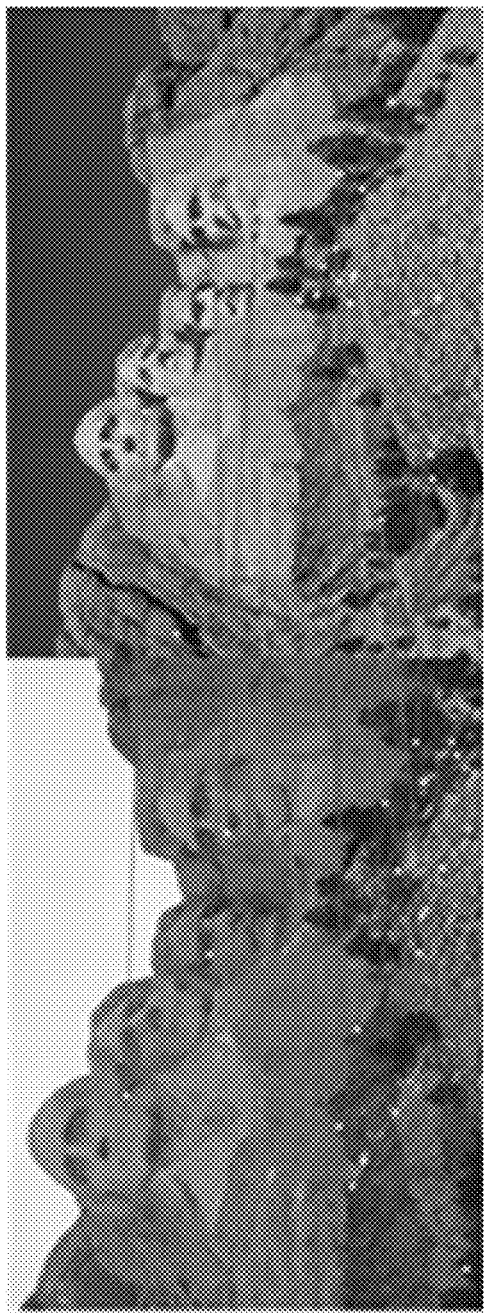
Figure 23D:
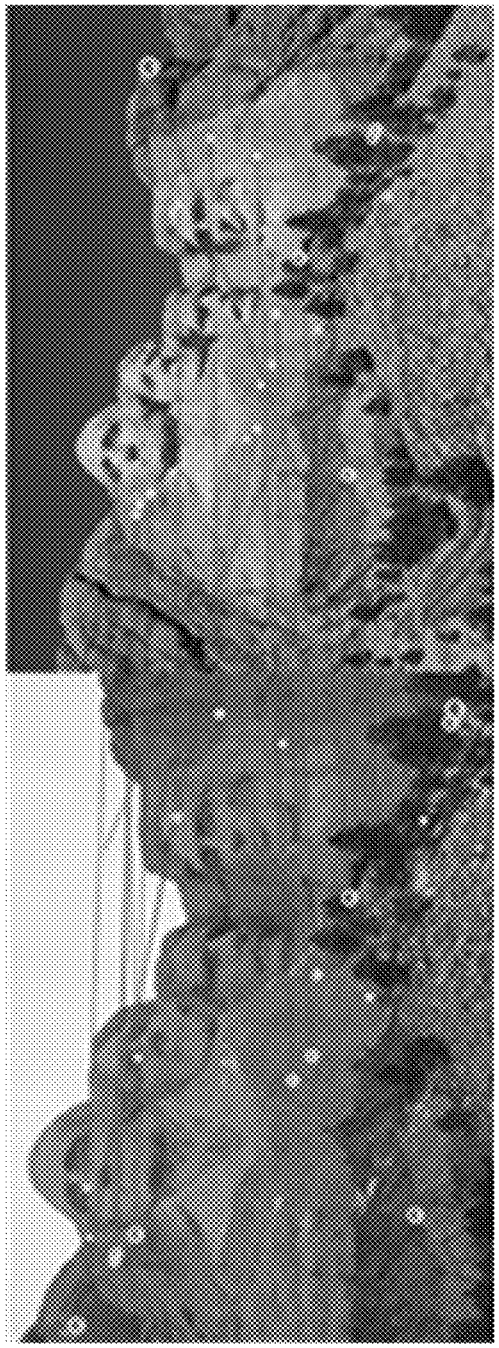

As shown in FIGS. 23A-23D, the top number of correct matches (15) is led by SRI-SCK (FIG. 23A) and SFOP (FIG. 23D), and then followed by 8 correct matches generated by both SIFT (FIG. 23B), and Harris (FIG. 23C). As SIFT orientation assignment does not demonstrate good performance for significant illumination change, downward directions are selected for key-point orientations in FIGS. 22A-22D and FIG. 23A-23D.

Accordingly, FIGS. 21A-23D demonstrate that the SRI-SCK detector is able to deliver reliable key-point detection under different illumination conditions, rotations and scales.

Quantitative experiments are also performed to evaluate the performance of the SRI-SCK detector. In particular, repeatability and matching score are used for the quantitative evaluation. If the overlapped error of one key-point region in an image and the projected region from another image is less than a threshold (0.4), the two key-point regions can be considered corresponding ones given that the transformation between the pair of images is known (see e.g., [21]). The ratio between the number of corresponding regions and the smaller number of regions in the shared part of the image pair is then defined as repeatability. Meanwhile, the matching score is the ratio between the number of correct matches and the smaller region number. A match is considered correct when the distance between two corresponding descriptors is the minimum in the descriptor space. Evaluation code in VLBenchmark [26] is used for evaluation of matching score as in [8].

The average repeatability measures of the SRI-SCK detector on Webcam, VGG and EF datasets are compared with known hand-crafted detectors including SIFT [3], SURF [4], SFOP [6], Hessian Laplace [36], Harris Laplace [33], and additionally two top learning based detectors T-P24 (the best version of TILDE), and the Transformation Covariant Detector (TransCovDet) [8]. As shown in Table 6, SRI-SCK demonstrates improved performance than all hand-crafted detectors by a large margin (~20%, 7%, 8% higher than the top, SURF) respectively on the three datasets. SRI-SCK also demonstrates favored performance with TransCovDet by overcoming this detector on Webcam and VGG datasets while maintaining comparable performance on EF dataset.

TABLE 6

Repeatability of Different Methods on Various Datasets

| Method | Webcam | VGG | EF |
|---|---|---|---|
| SIFT | 28.5 | 46.8 | 20.6 |
| SURF | 45.5 | 61.1 | 40.3 |
| SFOP | 38.1 | 49.2 | 33.6 |
| Hessian Laplace | 35.9 | 55.9 | 23.4 |
| Harris Laplace | 38.8 | 52.2 | 22.2 |
| T-P24 | 61.1 | 64.2 | 46.1 |
| TransCovDet | 63.4 | 67.3 | 49.2 |
| SRI-SCK-1 | 65.1 | 68.1 | 47.9 |
| SRI-SCK-2 | 65.9 | 69.0 | 46.1 |

For the matching score, the proposed settings are compared with three representative hand-crafted detectors SIFT, SURF, and Hessian Laplace, and the two aforementioned learning based detectors T-P24 and TransCovDet. Table 7 illustrates that SRI-SCK outperforms all other methods in comparison.

TABLE 7

Matching Score for Different Methods using Various Datasets

| Method | Webcam | VGG | EF |
|---|---|---|---|
| SIFT | 11.8 | 27.7 | 8.9 |
| SURF | 16.2 | 39.9 | 8.3 |
| Hessian Laplace | 14.2 | 33.5 | 8.0 |
| T-P24 | 22.2 | 45.2 | 9.0 |
| TransCovDet | 29.2 | 49.8 | 11.9 |
| SRI-SCK-1 | 31.0 | 51.0 | 14.3 |
| SRI-SCK-2 | 32.3 | 52.3 | 14.1 |

Example Stitching Application for SRI-SCK Detector

In at least one example application, the SRI-SCK detector can be used for stitching two or more images. In particular, the SRI-SCK demonstrates improved performance for image stitching in comparison to other detectors. FIGS. 24A-24B illustrate an example pair of stitched images 2400a and 2400b, respectively, generated using an SRI-SCK detector with a SIFT descriptor (FIG. 24A) and a SIFT detector with a SIFT descriptor (FIG. 24B). FIGS. 25A-25B illustrate another example pair of stitched images 2500a and 2500b, respectively, generated using an SRI-SCK detector with a SIFT descriptor (FIG. 25A) and a SIFT detector with a SIFT descriptor (FIG. 25B). The pair of images used for the stitching in FIGS. 24 and 25 are collected from a publicly available Adobe Panoramas dataset [37].

In each of FIGS. 24A, 24B, 25A and 25B, the pair which are not nearest images in the dataset are selected to make the stitching application challenging. Further, max top 1000 matches and random sample consensus (RANSAC) are used for stitching. As shown in FIGS. 24A-24B and FIGS. 25A-25B, the SRI-SCK detector generates a more visually satisfied stitching result than SIFT, especially in the area inside the circles (e.g., 2402a, 2402b, 2502a and 2502b, respectively). This suggests that SRI-SCK detector provides more correct matches (e.g., consistent with the quantitative experiment in FIGS. 21A-23D), and thus the corresponding homography matrix estimated for the stitching given by SRI-SCK detector is more accurate.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

REFERENCES

[1] W. Forstner and E. Gulch, "A Fast Operator for Detection and Precise Location of Distinct Points, Corners and Centres of Circular Features", ISPRS Intercommission Conference on Fast Processing of Photogrammetric Data, 1987.
[2] C. Harris and M. Stephens, "A Combined Corner and Edge Detector", Fourth Alvey Vision Conference, 1988.
[3] David G. Lowe, "Distinctive image features from scale-invariant keypoints", International Journal of Computer Vision, 60, 2 (2004), pp. 91-110.
[4] Herbert Bay, Tinne Tuytelaars, Luc Van Gool, "SURF: Speeded Up Robust Features", Proceedings of the ninth European Conference on Computer Vision, May 2006.
[5] J. Matas, O. Chum, M. Urban, and T. Pajdla, "Robust wide baseline stereo from maximally stable extremal regions", Image and vision computing, 2004.
[6] W. Förstner, T. Dickscheid and F. Schindler, "Detecting interpretable and accurate scale-invariant keypoints", 2009 IEEE 12th International Conference on Computer Vision, Kyoto, 2009, pp. 2256-2263.
[7] Y. Verdie, Kwang Moo Yi, P. Fua and V. Lepetit, "TILDE: A Temporally Invariant Learned Detector", 2015 IEEE Conference on Computer Vision and Pattern Recognition (CVPR), Boston, Mass., 2015, pp. 5279-5288.
[8] X. Zhang, F. X. Yu, S. Karaman and S. F. Chang, "Learning Discriminative and Transformation Covariant Local Feature Detectors", 2017 IEEE Conference on Computer Vision and Pattern Recognition (CVPR), Honolulu, Hi., 2017, pp. 4923-4931.
[9] T. Kadir, M. Brady, "Scale, saliency and image description," International Journal of Computer Vision, 45(2) (2001) 83-105.
[10] L. Shao, T. Kadir, M. Brady, "Geometric and photometric invariant distinctive regions detection", Information Science. 177 (4) (2007) 1088-1122.
[11] Martins, Pedro, Paulo Carvalho, and Carlo Gatta, "Context Aware Keypoint Extraction for Robust Image Representation", BMVC. 2012.
[12] Flore Faille, "Adapting interest point detection to illumination conditions", in Digital Image Computing: Techniques and Applications (DICTA 2003), December 2003, vol. 1 pp. 499-508.
[13] F. Faille, "A fast method to improve the stability of interest point detection under illumination changes", Image Processing, 2004, ICIP '04. 2004 International Conference on, 2004, pp. 2673-2676 Vol. 4.
[14] M. Gevrekci and B. K. Gunturk, "Reliable interest point detection under large illumination variations," 2008 15th IEEE International Conference on Image Processing, San Diego, Calif., 2008, pp. 869-872.
[15] V. Vonikakis, D. Chrysostomou, R. Kouskouridas, and A. Gasteratos, "A biologically inspired scale-space for illumination invariant feature detection", Measurement Science and Technology, 24(7):074024, 2013.
[16] Z. Miao X. Jiang "Interest point detection using rank order LoG filter" Pattern Recognit., vol. 46 no. 11 pp. 2890-291 November 2013.
[17] Z. Miao, X. Jiang and K. H. Yap, "Contrast Invariant Interest Point Detection by Zero-Norm LoG Filter", in IEEE Transactions on Image Processing, vol. 25, no. 1, pp. 331-342, January 2016.
[18] Thanh Hong Phuoc, Yifeng He, Ling Guan, "SCK: A Sparse Coding Based Key-point Detector", https://arxiv.org/ftp/arxiv, February 2018, accepted in Proceedings of ICIP 2018.
[19] C. L. Zitnick and K. Ramnath, "Edge foci interest points", 2011 International Conference on Computer Vision, Barcelona, 2011, pp. 359-366.
[20] D. C. Hauagge and N. Snavely, "Image matching using local symmetry features", 2012 IEEE Conference on Computer Vision and Pattern Recognition, Providence, R.I., 2012, pp. 206-213.
[21] K. Mikolajczyk, T. Tuytelaars, C. Schmid, A. Zisserman, J. Matas, F. Schaffalitzky, T. Kadir and L. Van Gool, "A comparison of affine region detectors", International Journal of Computer Vision, 65(½):43-72, 2005.
[22] J. Mairal, F. Bach and J. Ponce, "Sparse Modeling for Image and Vision Processing", Foundations and Trends in Computer Graphics and Vision, Vol 8. number 2-3. pages 85-283. 2014.
[23] J. Mairal, F. Bach, J. Ponce and G. Sapiro, "Online Learning for Matrix Factorization and Sparse Coding", Journal of Machine Learning Research, Volume 11, pages 19-60. 2010.
[24] K. Lenc, V. Gulshan, and A. Vedaldi, VLBenchmarks, http://www.vlfeat.org/benchmarks/, 2012.
[25] E. Rosten and T. Drummond, "Machine learning for highspeed corner detection", In European Conference on Computer Vision, Volume 1, 2006.
[26] K. Lenc and A. Vedaldi, "Learning covariant feature detectors", European Conference on Computer Vision Workshop on Geometry Meets Deep Learning, 2016.
[27] C. Geng, X. Jiang, "Face recognition based on the multi-scale local image structures," Pattern Recognition, 44 (10-11) (2011) 2565-2575.
[28] J. Fuentes-Pacheco, J. Ruiz-Ascencio, and J. M. Rendon-Mancha, "Visual simultaneous localization and mapping: a survey," Artificial Intelligence Review, 43(1):55-81, 2015.
[29] R. Mur-Artal, J. M. M. Montiel, J. D. Tardos, "ORB-SLAM: a Versatile and Accurate Monocular SLAM System", IEEE Transactions on Robotics, vol. 31, no. 5, pp. 1147-1163, 2015.
[30] T. Pire, T. Fischer, G. Castro, P. De Cristoforis, J. Civera, and 'J. J. Berlles, "S-PTAM: Stereo parallel tracking and mapping," Robotics and Autonomous Systems, 2017.
[31] P. Araújo, R. Miranda, D. Carmo, R. Alves and L. Oliveira, "Air-SSLAM: A Visual Stereo Indoor SLAM for Aerial Quadrotors," in IEEE Geoscience and Remote Sensing Letters, vol. 14, no. 9, pp. 1643-1647, September 2017.
[32] S. Maity, A. Saha and B. Bhowmick, "Edge SLAM: Edge Points Based Monocular Visual SLAM," 2017 IEEE International Conference on Computer Vision Workshops (ICCVW), Venice, 2017, pp. 2408-2417.
[33] K. Mikolajczyk and C. Schmid, "A performance evaluation of local descriptors," in IEEE Transactions on Pattern Analysis and Machine Intelligence, vol. 27, no. 10, pp. 1615-1630, October 2005.

[34] Jain, Anil K., "Fundamentals of Digital Image Processing, Englewood Cliffs," NJ, Prentice Hall, 1989, pp. 150-153.

[35] Pennebaker, William B., and Joan L. Mitchell, "JPEG: Still Image Data Compression Standard," Van Nostrand Reinhold, 1993.

[36] Hailin Jin, Paolo Favaro, and Stefano Soatto, "Real-Time feature tracking and outlier rejection with changes in illumination," In IEEE Intl. Conf. on Computer Vision, pages 684-689, July 2001.

[37] J. Brandt, "Transform coding for fast approximate nearest neighbor search in high dimensions," 2010 IEEE Computer Society Conference on Computer Vision and Pattern Recognition, San Francisco, Calif., 2010, pp. 1815-1822.

[38] Bailey, D. G., "Subpixel estimation of local extrema", Proceedings Image and Vision Computing New Zealand Conference, pp 414-419, 2003.

[39] A. Vedaldi and B. Fulkerson, "An Open and Portable Library of Computer Vision Algorithms," http://www.vlfeat.org/, 2008.

The invention claimed is:

1. A system for detecting key-points in at least one input image, wherein the system comprises:
    interface hardware configured to obtain the at least one input image;
    a memory unit for storing the detected key-points for the at least one input image;
    a processing unit coupled to the interface hardware and the memory unit, the processing unit being configured to perform a key-point detection method for the at least one input image, wherein the key-point detection method comprises:
        dividing the at least one input image into a plurality of image blocks;
        determining sparse representations of the image blocks using a dictionary D;
        determining at least one measure for the sparse representation of each image block;
        determining key-points for which the at least one measure for each of the image blocks falls within a specified range, wherein the specified range is one of a limited range or an unlimited range;
        retain only the determined key-points with the at least one measure that is a local maxima in a sliding window when performing non-maxima suppression and identifying these retained key-points as detected key-points; and,
        storing the detected key-points in the memory unit.

2. The system of claim 1, wherein the at least one measure includes a complexity measure and a strength measure and the processing unit is configured to determine the at least one measure for the sparse representation of each image block by:
    determining the complexity measure (CM) of the image block by applying a first function to coefficients of the sparse representation of the image block;
    detecting a key-point when the image block's complexity measure is within upper and lower limits; and
    determining the strength measure of the detected key-point by applying a second function to coefficients of the sparse representation of the image block having the detected key-point,
    wherein the complexity measure CM is determined by applying the first function to the non-zero components of the sparse representation of the image block or vectorized image block to determine the image block having the detected key-point.

3. The system of claim 2, wherein when the at least one image is a multi-channel image, the processing unit is configured to, for a given image block, calculate a separate measure for each channel of the given image block and then combine the separate measures to obtain a final measure for the given image block, wherein the separate and final measures are one of a complexity measure and a strength measure, and
    wherein the combination of the separate measures includes a linear combination or a multiplication of the separate measures.

4. The system of claim 2, wherein the strength measure SM is determined according to:
    (a) $SM=\|\alpha\|_{l0}*\|\alpha\|_{l1}$ or $SM=a_1\|\alpha\|_{l0}+a_2\|\alpha\|_{l1}$ where $\|\alpha\|_{l0}$ is the total number of non-zero components in the sparse representation of the given image block and $\|\alpha\|_{l1}$ is norm-1 of the coefficients of the sparse representation of the given image block and $a_1$, $a_2$ are any positive parameters; or
    (b) a linear combination or multiplication of two or more of norm-0, norm-1 and norm-2 or a higher level norm; or
    (c) a function of a reconstruction error ($\|X_{norm}'-D\alpha\|_{l2}$), including the reciprocal of the square of the reconstruction error ($1/\|X'_{norm}-D\alpha\|_{l2}^2$); or
    (d) a corner response metric including a Harris or a Laplacian corner-ness measure.

5. The system of claim 2, wherein after performing non-maxima suppression, the processing unit is further configured to optionally apply sub-pixel estimation of detected key-points, wherein sub-pixel estimation comprises:
    for a given key-point after performing non-max suppression, determining a row co-ordinate and a column co-ordinate of the key-point;
    fitting strength measures of the key-point and its row neighbor key-points, determined before non-max suppression, into a first fitting model performed in a local coordinate system of the key-point;
    estimating the parameters of the first fitting model;
    determining a sub-pixel row co-ordinate by solving a derivative equation of the first fitting model;
    converting the determined sub-pixel row co-ordinate into the co-ordinate system of the current pyramid level of the detected key-points;
    fitting strength measures the key-point and its column neighbor key-points, determined before non-max suppression, into a second fitting model performed in the local co-ordinate system of the key-point;
    estimating the parameters of the second fitting model;
    determining a sub-pixel column co-ordinate by solving a derivative equation of the second fitting model; and
    converting the determined sub-pixel column co-ordinate into the co-ordinate system of the current pyramid level of the detected key-points.

6. The system of claim 5, wherein the processor is further configured to generate a plurality of scaled image representations from either the at least one input image or a magnified version of the at least one input image,
    wherein the plurality of scaled image representations form an image pyramid, and wherein the at least one input image, or the magnified version of the at least one input image, comprises a base image of the image pyramid; and wherein the method of key-point detection is applied separately to each scaled image representation in the plurality of scaled image representations, and wherein when applying the key-point detection method to each scaled image representation, the sparse representation of the image block is determined using an extended dictionary ED, wherein the extended dictionary ED is a combination of the dictionary D and multiple rotated versions of atoms of the dictionary D, and wherein the processing unit is configured to generate the extended dictionary ED by:

converting each atom vector in the dictionary D into an atom block;

applying a circular mask to each atom block to generate a plurality of circularly masked atom blocks;

rotating each circularly masked atom block to generate a plurality of rotated versions of the circularly masked atoms blocks, each circularly masked atom block being rotated by an angle $$i\beta = \frac{i * 360}{v},$$

wherein v is a positive integer expressing the number of the rotated versions of the circular masked atom block, β is a step angle of rotation, and i is an integer representing the version of rotation, wherein each circularly masked atom blocks is rotated by i=0 to (v−1) times to generate v rotated versions of the circularly masked atom block;

converting (i) the circularly masked atom blocks and (ii) the rotated versions of the circularly masked atom blocks, into masked atom vectors;

optionally, after converting into masked atom vectors, removing elements in the masked atom vectors that are outside the circular mask;

applying the normalization technique to elements inside the mask of the masked atom vector, wherein elements outside the mask remain as zeros after applying the normalization technique if the elements outside are not removed; and combining the masked atom vectors to generate the extended dictionary ED.

7. The system of claim 6, wherein determining the sparse representation of a given image block comprises:

applying a circular mask to the image block;

converting the given image block into a vector;

optionally, removing corresponding elements of the vector outside the mask;

normalizing the vector, wherein elements inside the circular mask are normalized and elements outside the circular mask are made zero if not removed; and determining the sparse representation of the vector using the extended dictionary ED.

8. The system of claim 7, wherein the processing unit is configured to determine the sparse representation of a given image block according to $$\alpha = \operatorname{argmin}\left(\frac{1}{2}\left\|Y'_{norm} - ED\alpha\right\|_{l2}^{2} + \lambda_1\|\alpha\|_{l1} + \frac{\lambda_2}{2}\|\alpha\|_{l2}^{2}\right),$$

where α is the sparse representation of the image block, ED is the extended dictionary of sparse coding, $\lambda_1$ is a norm-1 regularization parameter, $\lambda_2$ is a norm-2 regularization parameter and $Y_{norm}'$ is a circularly masked normalized vector of the given image block.

9. The system of claim 7, wherein the processing unit is further configured to:

if sub-pixel estimation is applied to each detected key-point in each image scale representation, convert the sub-pixel position of each detected key-point into of the corresponding position in the base image coordinate system, otherwise, if sub-pixel estimation is not applied to detected key points, then convert a position of each detected key-point in the base image coordinate system; and generate a list of detected key-points across all image scale representations, wherein the list of detected key-points is expressed in base image coordinate system; and optionally, identify one or more subsets of key-points, from the list of detected key-points, which have overlap ratios larger than a pre-determined overlap ratio, and suppress key-points, in each of the one or more subsets of key-points, which have strength measures which are not higher compared to strength measures for other key-points in the subsets of key-points.

10. The system of claim 1, wherein the processing unit is configured to determine the sparse representation of a given image block by:

converting the given image block into a vector;

normalizing the vector; and determining the sparse representation of the vector using the dictionary D.

11. The system of claim 10, wherein the processing unit is configured to determine the sparse representation of the given image block according to $\alpha = \operatorname{argmin}(\|X_{norm}'-D\alpha\|_{l2} + \lambda\|\alpha\|_{l0})$, $\alpha = \operatorname{argmin}(\|X_{norm}'-D\alpha\|_{l2} + \lambda\|\alpha\|_{l1})$, $\alpha = \operatorname{argmin}(\|X_{norm}'-D\alpha\|_{l2} + \lambda\|\alpha\|_{l1} + \frac{1}{2}\lambda_2\|\alpha\|_{l2}^2)$, $\alpha = \operatorname{argmin}(\frac{1}{2}\|X_{norm}'-D\alpha\|_{l2}^2 + \lambda_1\|\alpha\|_{l1} + \frac{1}{2}\lambda_2\|\alpha\|_{l2}^2)$, $\alpha = \operatorname{argmin}(\frac{1}{2}\|X_{norm}'-D\alpha\|_{l2}^2 + \lambda\|\alpha\|_{l0})$, or $\alpha = \operatorname{argmin}(\frac{1}{2}\|X_{norm}'-D\alpha\|_{l2}^2 + \lambda\|\alpha\|_{l1})$, where α is the sparse representation of the image block, D is a dictionary of sparse coding, $\lambda, \lambda_1, \lambda_2$ are regularization parameters, and $X_{norm}'$ is a normalized vector of the given image block.

12. The system of claim 10 wherein the processing unit is configured to:

normalize the given image block by applying a normalization technique comprising one of zero mean-unit amplitude normalization, zero mean-unit variance normalization, and a min-max normalization; and optionally, normalize the dictionary D using the normalization technique prior to determining the sparse representation.

13. The system of claim 1, wherein prior to determining the sparse representations of the image blocks, when the at least one image is a grayscale image the processing unit is configured to filter the grayscale image and determine the sparse representations of the image blocks of the filtered grayscale image.

14. The system of claim 1, wherein prior to determining the sparse representations of the image blocks, when the at least one image is a color image with multi-channel data, the processing unit is configured to either: (a) convert the color image into a grayscale image, filter the grayscale image and then determine the sparse representations of the image blocks of the filtered grayscale image or (b) filter each channel of the at least one image, combine the filtered channels into one grayscale image and then determine the sparse representations of the image blocks of the filtered grayscale image.

15. A method for detecting key-points in at least one input image, wherein the method is performed using a processing unit and the method comprises:
- obtaining at least one input image from interface hardware;
- dividing the at least one input image into a plurality of image blocks;
- determining sparse representations of the image blocks using a dictionary D;
- determining at least one measure for the sparse representation of each image block;
- determining key-points for which the at least one measure for each of the image blocks falls within a specified range, wherein the specified range is one of a limited range or an unlimited range;
- retaining only the determined key-points with the at least one measure that is a local maxima in a sliding window when performing non-maxima suppression and identifying these retained key-points as detected key-points; and,
- storing the detected key-points in the memory unit.

16. The method of claim 15, wherein the at least one measure includes a complexity measure and a strength measure and the processing unit is configured to determine the at least one measure the sparse representations of each image block by:
- determining the complexity measure of the image block by applying a first function to coefficients of the sparse representation of the image block;
- detecting a key-point when the image block's measures is within upper and lower limits; and
- determining the strength measure of the detected key-point by applying a second function to coefficients of the sparse representation of the image blocks having the detected key-points, and wherein the complexity measure CM is determined by applying the first function to the non-zero components of the sparse representation of the image block or a vectorized image block to determine the image block having the detected key-point.

17. The method of claim 16, wherein when the at least one image is a multi-channel image, the processing unit is configured to, for a given image block, calculate a separate measure for each channel of the given image block and then combine the separate measures to obtain a final measure for the given image block, wherein the separate and final measures are one of a complexity measure and a strength measure, and
wherein the combination of the separate measures includes a linear combination or a multiplication of the separate measures.

18. The method of claim 16, wherein the strength measure SM is determined according to:
(a) $SM=\|\alpha\|_{l0}*\|\alpha\|_{l1}$ or $SM=a_1\|\alpha\|_{l0}+a_2\|\alpha\|_{l1}$ where $\|\alpha\|_{l0}$ is the total number of non-zero components in the sparse representation of the given image block and $\|\alpha\|_{l1}$ is norm-1 of the coefficients of the sparse representation of the given image block and $a_1$, $a_2$ are any positive parameters; or
(b) a linear combination or multiplication of two or more of norm-0, norm-1 and norm-2 or a higher level norm; or
(c) a function of a reconstruction error ($\|X_{norm}'-D\alpha\|_{l2}$), including the reciprocal of the square of the reconstruction error ($1/\|X_{norm}'-D\alpha\|_{l2}^2$); or
(d) a corner response metric including a Harris or a Laplacian corner-ness measure.

19. The method of claim 16, wherein after performing non-maxima suppression, the method optionally further comprises applying sub-pixel estimation of detected key-points, wherein sub-pixel estimation comprises:
- for a given key-point after performing non-max suppression, determining a row co-ordinate and a column co-ordinate of the key-point;
- fitting strength measures of the key-point and its row neighbor key-points, determined before non-max suppression, into a first fitting model performed in a local coordinate system of the key-point;
- estimating the parameters of the first fitting model;
- determining a sub-pixel row co-ordinate by solving a derivative equation of the first fitting model;
- converting the determined sub-pixel row co-ordinate into the co-ordinate system of the image block the current pyramid level of the detected key-points;
- fitting strength measures the key-point and its column neighbor key-points, determined before non-max suppression, into a second fitting model performed in the local co-ordinate system of the key-point;
- estimating the parameters of the second fitting model;
- determining a sub-pixel column co-ordinate by solving a derivative equation of the second fitting model; and
- converting the determined sub-pixel column co-ordinate into the co-ordinate system of the current pyramid level of the detected key-points.

20. The method of claim 19, further comprising generating a plurality of scaled image representations from either the at least one input image or a magnified version of the at least one input image,
wherein the plurality of scaled image representations form an image pyramid, and wherein the at least one input image, or the magnified version of the at least one input image, comprises a base image of the image pyramid, and
wherein the method of key-point detection is applied separately to each scaled image representation in the plurality of scaled image representations, and
wherein when applying the key-point detection method to each scaled image representation, the sparse representation of the image block is determined using an extended dictionary ED, wherein the extended dictionary ED is a combination of the dictionary D and multiple rotated versions of atoms of the dictionary D, and
wherein the method further comprises generating the extended dictionary ED by:
- converting each atom vector in the dictionary D into an atom block;
- applying a circular mask to each atom block to generate a plurality of circularly masked atom blocks;
- rotating each circularly masked atom block to generate a plurality of rotated versions of the circularly masked atoms blocks, each circularly masked atom block being rotated by an angle $$i\beta = \frac{i*360}{v},$$

wherein v is a positive integer expressing the number of the rotated versions of the circular masked atom block, β is a step angle of rotation, and i is an integer representing the version of rotation, wherein each circularly masked atom blocks is rotated by i=0 to (v−1) times to generate v rotated versions of the circularly masked atom block;
  converting (i) the circularly masked atom blocks and (ii) the rotated versions of the circularly masked atom blocks, into masked atom vectors;
  optionally, after converting into masked atom vectors, removing elements in the masked atom vectors that are outside the circular mask;
  applying the normalization technique to elements inside the mask of the masked atom vector, wherein elements outside the mask remain as zeros after applying the normalization technique if the elements outside are not removed; and
  combining the masked atom vectors to generate the extended dictionary ED.

21. The method of claim 20, wherein determining the sparse representation of a given image block comprises:
  applying a circular mask to the image block;
  converting the given image block into a vector;
  optionally, removing corresponding elements of the vector outside the mask;
  normalizing the vector, wherein elements inside the circular mask are normalized and elements outside the circular mask are made zero if not removed; and
  determining the sparse representation of the vector using the extended dictionary ED.

22. The method of claim 21, wherein the method further comprises determining the sparse representation of a given image block according to $$\alpha = \mathrm{argmin}\left(\frac{1}{2}\left\|Y'_{norm} - ED\alpha\right\|^2_{l2} + \lambda_1\|\alpha\|_{l1} + \frac{\lambda_2}{2}\|\alpha\|^2_{l2}\right),$$

where α is the sparse representation of the image block, ED is the extended dictionary of sparse coding, $\lambda_1$ is a norm-1 regularization parameter, $\lambda_2$ is a norm-2 regularization parameter and $Y_{norm}'$ is a circularly masked normalized vector of the given image block.

23. The method of claim 21, the method further comprises:
  wherein if sub-pixel estimation is applied to detected key point, then converting the sub-pixel position of each detected key-point into the corresponding position in the base image coordinate system, and generating a list of detected key-points across all image scale representations, wherein the list of detected key-points is expressed in the base image coordinate system;
  otherwise, if sub-pixel estimation is not applied to detected key points, then converting a position of each detected key-point into the base image coordinate system, then generating a list of detected key-points across all image scale representations, wherein the list of detected key-points is expressed in the base image coordinate system; and
  optionally, identifying one or more subsets of key-points, from the list of detected key-points, which have overlap ratios larger than a pre-determined overlap ratio; and suppressing key-points, in each of the one or more subsets of key-points, which have strength measures which are not higher compared to strength measures for other key-points in the subsets of key-points.

24. The method of claim 15, wherein the method further comprises determining the sparse representation of a given image block by:
  converting the given image block into a vector;
  normalizing the vector; and
  determining the sparse representation of the vector using the dictionary D.

25. The method of claim 24, wherein the method further comprises determining the sparse representation of the given image block according to $\alpha=\mathrm{argmin}(\|X_{norm}'-D\alpha\|_{l2}+\lambda\|\alpha\|_{l0})$, $\alpha=\mathrm{argmin}(\|X_{norm}'-D\alpha\|_{l2}+\lambda\|\alpha\|_{l1})$, $\alpha=\mathrm{argmin}(\|X_{norm}'-D\alpha\|_{l2}+\lambda_1\|\alpha\|_{l1}+\frac{1}{2}\lambda_2\|\alpha\|_{l2}^2)$, $\alpha=\mathrm{argmin}(\frac{1}{2}\|X_{norm}'-D\alpha\|_{l2}^2+\lambda_1\|\alpha\|_{l1}+\frac{1}{2}\lambda_2\|\alpha\|_{l2}^2)$, $\alpha=\mathrm{argmin}(\frac{1}{2}\|X_{norm}'-D\alpha\|_{l2}^2+\lambda\|\alpha\|_{l0})$, or $\alpha=\mathrm{argmin}(\frac{1}{2}\|X_{norm}'-D\alpha\|_{l2}^2+\lambda\|\alpha\|_{l1})$, where α is the sparse representation of the image block, D is a dictionary of sparse coding, $\lambda, \lambda_1, \lambda_2$ are regularization parameters, and $X_{norm}'$ is a normalized vector of the given image block.

26. The method of claim 24, wherein the method further comprises:
  normalizing the given image block by applying a normalization technique comprising one of zero mean-unit amplitude normalization, zero mean-unit variance normalization, and a min-max normalization; and
  optionally, normalizing the dictionary D using the normalization technique prior to determining the sparse representation.

27. The method of claim 15, wherein prior to determining the sparse representations of the image blocks, when the at least one image is a grayscale image, the method further comprises filtering the grayscale image and determine the sparse representations of the image blocks of the filtered grayscale image.

28. The method of claim 15, wherein prior to determining the sparse representations of the image blocks, when the at least one image is a color image with multi-channel data, the method further comprises either: (a) converting the color image into a grayscale image, filtering the grayscale image and then determining the sparse representations of the image blocks of the filtered grayscale image or (b) filtering each channel of the at least one image, combining the filtered channels into one grayscale image and then determining the sparse representations of the image blocks of the filtered grayscale image.

29. A non-transitory computer readable medium storing computer program code that when executed by a processing unit causes the processing unit to perform a method for detecting key-points in at least one input image, wherein the method comprises:
  dividing the at least one input image into a plurality of image blocks;
  determining sparse representations of the image blocks using a dictionary D;
  determining at least one measure for the sparse representation of each image block;
  determining key-points for which the at least one measure for each of the image blocks falls within a specified range, wherein the specified range is one of a limited range or an unlimited range;
  retain only the determined key-points with the at least one measure that is retain a local maxima in a sliding window when performing non-maxima suppression and identifying these retained key-points as detected key-points; and,
  storing the detected key-points in the memory unit.

30. The non-transitory computer readable medium of claim 29, wherein the at least one measure includes a complexity measure and a strength measure, and the method comprises:

converting the given image block into a vector;
normalizing the vector; and
determining the at least one measure for the sparse representations of each image block by:
determining the complexity measure of the image block by applying a first function to coefficients of the sparse representation of the image block;
detecting a key-point when the image block's measure is within upper and lower limits; and
determining the strength measure of the detected key-point by applying a second function to coefficients of the sparse representation of the image blocks having the detected key-points;
wherein the method optionally further comprises:
after performing non-maxima suppression, applying sub-pixel estimation of detected key-points, wherein sub-pixel estimation comprises:
for a given key-point after performing non-max suppression, determining a row co-ordinate and a column co-ordinate of the key-point;
fitting strength measures of the key-point and its row neighbor key-points, determined before non-max suppression, into a first fitting model performed in a local coordinate system of the key-point;
estimating the parameters of the first fitting model;
determining a sub-pixel row co-ordinate by solving a derivative equation of the first fitting model;
converting the determined sub-pixel row co-ordinate into the co-ordinate system of the current pyramid level of the detected key-points;
fitting strength measures the key-point and its column neighbor key-points, determined before non-max suppression, into a second fitting model performed in the local co-ordinate system of the key-point;
estimating the parameters of the second fitting model;
determining a sub-pixel column co-ordinate by solving a derivative equation of the second fitting model; and
converting the determined sub-pixel column co-ordinate into the co-ordinate system of the current pyramid level of the detected key-points; and
wherein the method optionally further comprises at least one of:
(a) generating a plurality of scaled image representations from either the at least one input image or a magnified version of the at least one input image,
wherein the plurality of scaled image representations form an image pyramid, and wherein the at least one input image, or the magnified version of the at least one input image, comprises a base image of the image pyramid, and
wherein the method of key-point detection is applied separately to each scaled image representation in the plurality of scaled image representations,
wherein if sub-pixel estimation is applied to detected key points, then the method further comprises converting the sub-pixel position of each detected key-point into the corresponding position in the base image coordinate system, and generating a list of detected key-points across all image scale representations, wherein the list of detected key-points is expressed in the base image coordinate system,
otherwise, if sub-pixel estimation is not applied to detected key points, then the method further comprises converting a position of each detected key-point into the base image coordinate system, then generating a list of detected key-points across all image scale representations, wherein the list of detected key-points is expressed in the base image coordinate system; and
optionally, the method further comprises identifying one or more subsets of key-points, from the list of detected key-points, which have overlap ratios larger than a pre-determined overlap ratio; and suppressing key-points, in each of the one or more subsets of key-points, which have strength measures which are not higher compared to strength measures for other key-points in the subsets of key-points; and
(b) Applying the key-point detection method to one or more of the input image, magnified version of the input image, and the scaled image representations, the sparse representation of the image block is determined using an extended dictionary ED, wherein the extended dictionary ED is a combination of the dictionary D and multiple rotated versions of atoms of the dictionary D, wherein determining the sparse representation of a given image block using the extended dictionary ED comprises:
applying a circular mask to the image block;
converting the given image block into a vector;
optionally, removing corresponding elements of the vector outside the mask;
normalizing the vector, wherein elements inside the circular mask are normalized and elements outside the circular mask are made zero if not removed; and
determining the sparse representation of the vector using the extended dictionary, and
wherein generating the extended dictionary ED comprises:
converting each atom vector in the dictionary D into an atom block;
applying a circular mask to each atom block to generate a plurality of circularly masked atom blocks;
rotating each circularly masked atom block to generate a plurality of rotated versions of the circularly masked atoms blocks;
converting (i) the circularly masked atom blocks and (ii) the rotated versions of the circularly masked atom blocks, into masked atom vectors;
optionally, after converting into masked atom vectors, removing elements in the masked atom vectors that are outside the circular mask;
optionally, applying the normalization technique to elements inside the mask of the masked atom vector, wherein elements outside the mask remain as zeros after applying the normalization technique if the elements outside are not removed; and
combining the masked atom vectors to generate the extended dictionary ED.

* * * * *

UNITED STATES PATENT AND TRADEMARK OFFICE
CERTIFICATE OF CORRECTION

PATENT NO. : 11,189,020 B2
APPLICATION NO. : 16/783934
DATED : November 30, 2021
INVENTOR(S) : Thanh Phuoc Hong and Ling Guan It is certified that error appears in the above-identified patent and that said Letters Patent is hereby corrected as shown below:

In the Claims

Claim 4, Column 54, Line 26, "...($\|X_{norm}' - D\alpha\|_{l2}$)..." should read -- ($\|X'_{norm} - D\alpha\|_{l2}$) --.

Claim 4, Column 54, Line 28, "...($1/\|X'_{norm} - D\alpha\|_{l2}^2$)..." should read -- $(1/\|X'_{norm} - D\alpha\|_{l2}^2)$ --.

Claim 8, Column 56, Line 1, "...parameter and $Y_{norm}'$ is..." should read -- parameter and $Y'_{norm}$ is --.

Claim 11, Column 56, Lines 34-38, "...$\alpha=\text{argmin}(\|X_{norm}'-D\alpha\|_{l2}+\lambda\|\alpha\|_{l0})$, $\alpha=\text{argmin}(\|X_{norm}'-D\alpha\|_{l2}+\lambda\|\alpha\|_{l1})$, $\alpha=\text{argmin}(\|X_{norm}'-D\alpha\|_{l2}+\lambda\|\alpha\|_{l1}+^1/_2\lambda_2\|\alpha\|_{l2}^2)$, $\alpha=\text{argmin}(^1/_2\|X_{norm}'-D\alpha\|_{l2}^2+\lambda_1\|\alpha\|_{l1}+^1/_2\lambda_2\|\alpha\|_{l2}^2)$, $\alpha=\text{argmin}(^1/_2\|X_{norm}'-D\alpha\|_{l2}+\lambda\|\alpha\|_{l0})$, or $\alpha=\text{argmin}(^1/_2\|X_{norm}'-D\alpha\|_{l2}^2+\lambda\|\alpha\|_{l1})$..." should read -- $\alpha = \text{argmin}(\|X'_{norm} - D\alpha\|_{l2} + \lambda\|\alpha\|_{l0})$, $\alpha = \text{argmin}(\|X'_{norm} - D\alpha\|_{l2} + \lambda\|\alpha\|_{l1})$, $\alpha = \text{argmin}(\|X'_{norm} - D\alpha\|_{l2} + \lambda_1\|\alpha\|_{l1} + \frac{1}{2}\lambda_2\|\alpha\|_{l2}^2)$, $\alpha = \text{argmin}(\frac{1}{2}\|X'_{norm} - D\alpha\|_{l2}^2 + \lambda_1\|\alpha\|_{l1} + \frac{1}{2}\lambda_2\|\alpha\|_{l2}^2)$, $\alpha = \text{argmin}(\frac{1}{2}\|X'_{norm} - D\alpha\|_{l2}^2 + \lambda\|\alpha\|_{l0})$, or $\alpha = \text{argmin}(\frac{1}{2}\|X'_{norm} - D\alpha\|_{l2}^2 + \lambda\|\alpha\|_{l1})$ --.

Claim 11, Column 56, Line 41, "...and $X_{norm}'$ is a normalized..." should read -- and $X'_{norm}$ is a normalized --.

Claim 18, Column 57, Line 63, "...($\|X_{norm}' - D\alpha\|_{l2}$)..." should read -- ($\|X'_{norm} - D\alpha\|_{l2}$) --.

Claim 18, Column 57, Line 65, "...($1/\|X_{norm}' - D\alpha\|_{l2}^2$)..." should read -- $(1/\|X'_{norm} - D\alpha\|_{l2}^2)$ --.

Claim 22, Column 59, Line 34, "...$\alpha = \text{argmin}\left(\frac{1}{2}\|Y'_{norm} - ED\alpha\|_{l2}^2 + \lambda_1\|\alpha\|_{l1} + \frac{\lambda_2}{2}\|\alpha\|_{l2}^2\right)$..." should read -- $\alpha = argmin(\frac{1}{2}\|Y'_{norm} - ED\alpha\|_{l2}^2 + \lambda_1\|\alpha\|_{l1} + \frac{\lambda_2}{2}\|\alpha\|_{l2}^2)$ --.

Signed and Sealed this
Thirteenth Day of December, 2022

Katherine Kelly Vidal
*Director of the United States Patent and Trademark Office*

CERTIFICATE OF CORRECTION (continued)
U.S. Pat. No. 11,189,020 B2

Claim 25, Column 60, Lines 7-11, "...$\alpha=\text{argmin}(\|X_{norm}'-D\alpha\|_{l2}+\lambda\|\alpha\|_{l0})$, $\alpha=\text{argmin}(\|X_{norm}'-D\alpha\|_{l2}+\lambda\|\alpha\|_{l1})$, $\alpha=\text{argmin}(\|X_{norm}'-D\alpha\|_{l2}+\lambda_1\|\alpha\|_{l1}+{}^1/_2\lambda_2\|\alpha\|_{l2}{}^2)$, $\alpha=\text{argmin}({}^1/_2\|X_{norm}'-D\alpha\|_{l2}{}^2+\lambda_1\|\alpha\|_{l1}+{}^1/_2\lambda_2\|\alpha\|_{l2}{}^2)$, $\alpha=\text{argmin}({}^1/_2\|X_{norm}'-D\alpha\|_{l2}+\lambda\|\alpha\|_{l0})$, or $\alpha=\text{argmin}({}^1/_2\|X_{norm}'-D\alpha\|_{l2}{}^2+\lambda\|\alpha\|_{l1})$..."

should read -- $\boldsymbol{\alpha} = \text{argmin}(\|\boldsymbol{X'_{norm}} - \boldsymbol{D\alpha}\|_{l2} + \lambda\|\boldsymbol{\alpha}\|_{l0})$, $\boldsymbol{\alpha} = \text{argmin}(\|\boldsymbol{X'_{norm}} - \boldsymbol{D\alpha}\|_{l2} + \lambda\|\boldsymbol{\alpha}\|_{l1})$, $\boldsymbol{\alpha} = \text{argmin}(\|\boldsymbol{X'_{norm}} - \boldsymbol{D\alpha}\|_{l2} + \lambda_1\|\boldsymbol{\alpha}\|_{l1} + \frac{1}{2}\lambda_2\|\boldsymbol{\alpha}\|_{l2}^2)$, $\boldsymbol{\alpha} = \text{argmin}(\frac{1}{2}\|\boldsymbol{X'_{norm}} - \boldsymbol{D\alpha}\|_{l2}^2 + \lambda_1\|\boldsymbol{\alpha}\|_{l1} + \frac{1}{2}\lambda_2\|\boldsymbol{\alpha}\|_{l2}^2)$, $\boldsymbol{\alpha} = \text{argmin}(\frac{1}{2}\|\boldsymbol{X'_{norm}} - \boldsymbol{D\alpha}\|_{l2}^2 + \lambda\|\boldsymbol{\alpha}\|_{l0})$, or $\boldsymbol{\alpha} = \text{argmin}(\frac{1}{2}\|\boldsymbol{X'_{norm}} - \boldsymbol{D\alpha}\|_{l2}^2 + \lambda\|\boldsymbol{\alpha}\|_{l1})$ --.

Claim 25, Column 60, Line 14, "...$X_{norm}'$ is a normalized..." should read -- $X'_{norm}$ is a normalized --.